Jan. 19, 1954

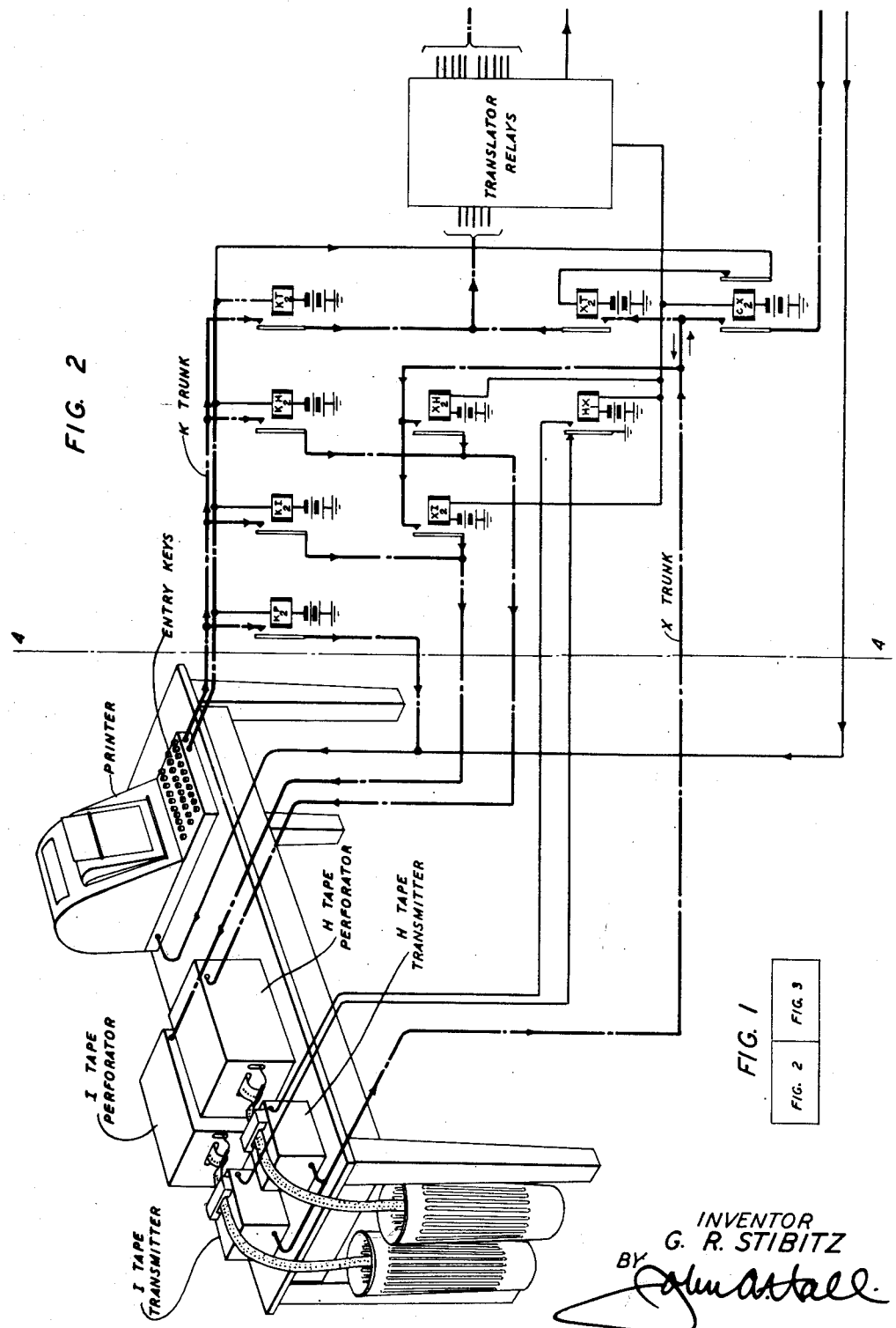

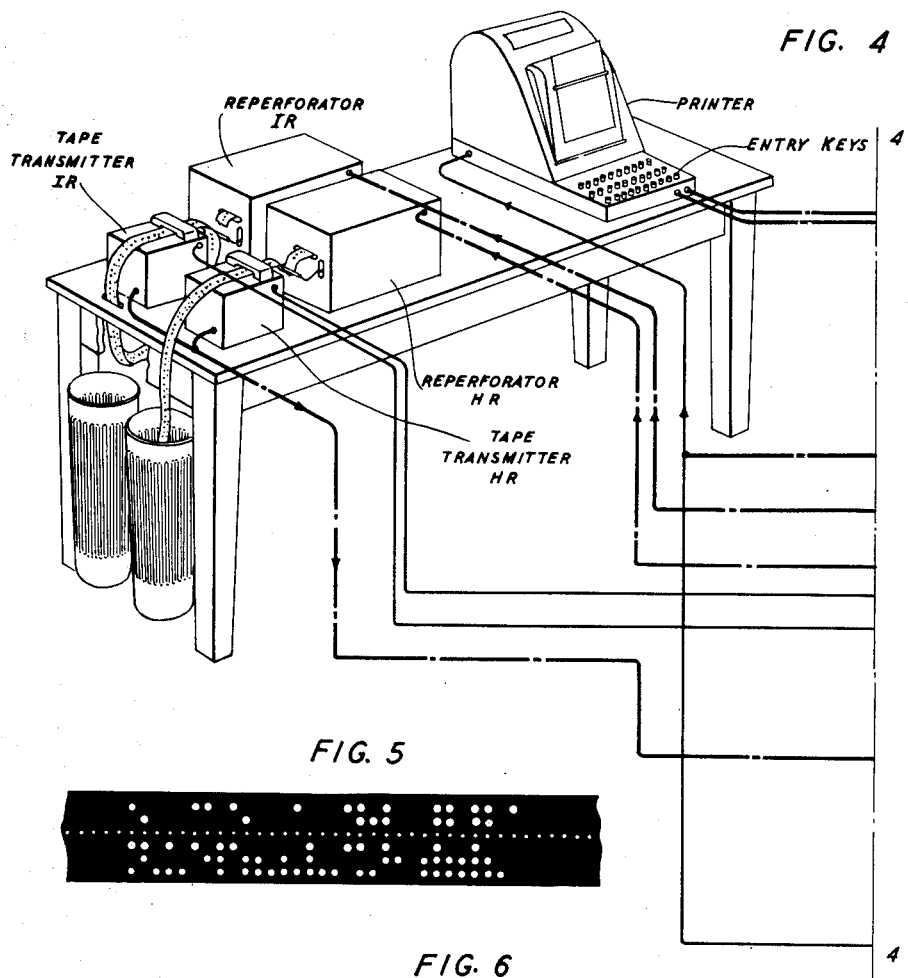

G. R. STIBITZ 2,666,579

AUTOMATIC CALCULATOR

Filed Dec. 26, 1944

INVENTOR
G. R. STIBITZ
BY *William F. Simpson*

ATTORNEY

Jan. 19, 1954  G. R. STIBITZ  2,666,579
AUTOMATIC CALCULATOR
Filed Dec. 26, 1944  31 Sheets-Sheet 5

INVENTOR
G. R. STIBITZ
BY
ATTORNEY

Jan. 19, 1954  G. R. STIBITZ  2,666,579
AUTOMATIC CALCULATOR
Filed Dec. 26, 1944  31 Sheets-Sheet 6

INVENTOR
G. R. STIBITZ
BY
ATTORNEY

Jan. 19, 1954  G. R. STIBITZ  2,666,579
AUTOMATIC CALCULATOR
Filed Dec. 26, 1944  31 Sheets-Sheet 7
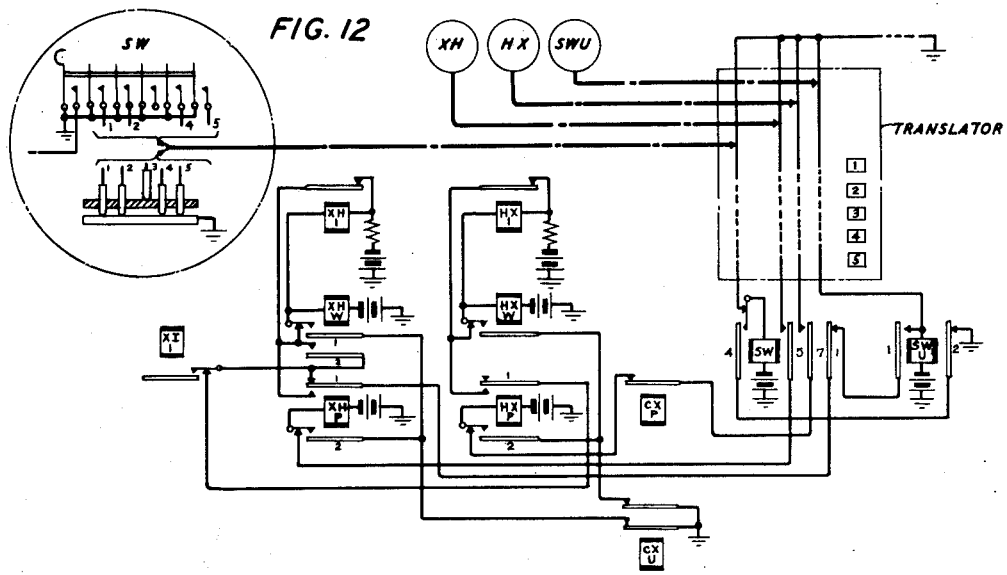
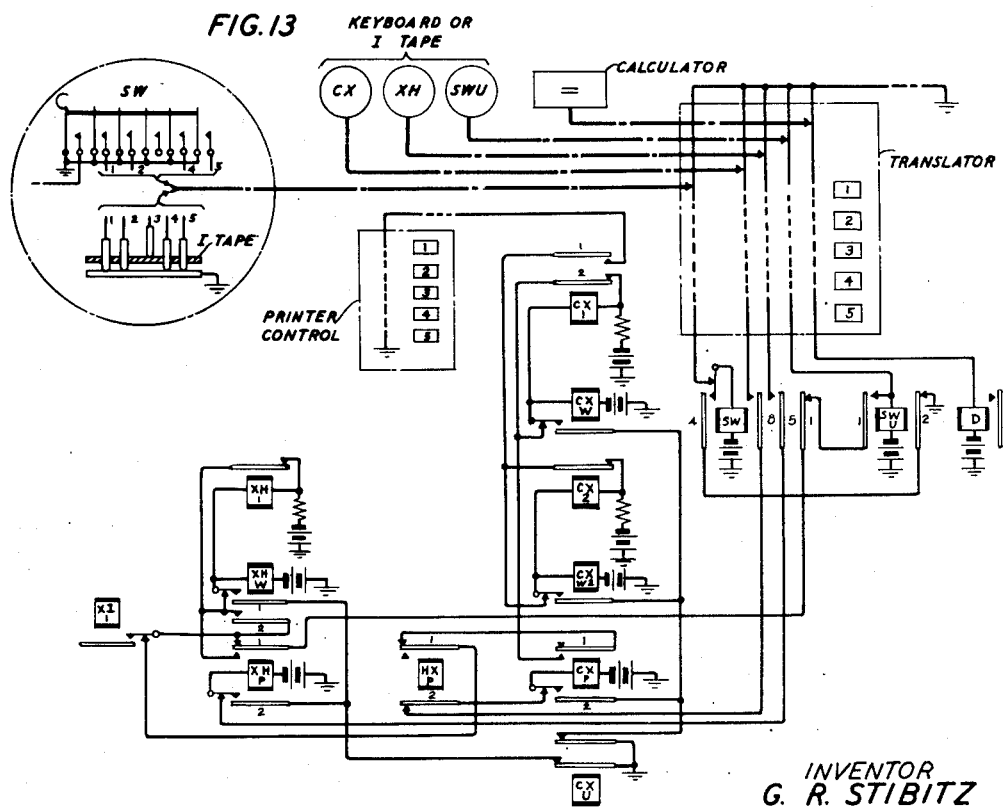
INVENTOR
G. R. STIBITZ
BY
ATTORNEY Jan. 19, 1954    G. R. STIBITZ    2,666,579
AUTOMATIC CALCULATOR Filed Dec. 26, 1944    31 Sheets-Sheet 8

```
 +.01317647 +02129412   +0.01317647 +0.02129412
 +.30000000 +20000000 X +.10000000 +00000000 = +0.04317647 +0.04129412

-.00086975 +00369328  -0.00086975 +0.00369328
 +.30000000 +20000000 X +.04317647 +04129412 = +0.00382436†+0.02471681

-.00034928 +00030641  -0.00034928 +0.00030641
 +.30000000 +20000000 X +.00382436 +02471681 = -0.00414533 +0.00848632†

-.00004986 +00001118  -0.00004986 +0.00001118
 +.30000000 +20000000 X -.00414533 +00848632 = -0.00299072 +0.00172801

+.01317647 +02129412  +0.01317647 +0.02129412
 +.40000000 +20000000 X +.10000000 +00000000 = +0.05317647 +0.04129412

-.00086975 +00369328  -0.00086975 +0.00369328
 +.40000000 +20000000 X +.05317647 +04129412 = +0.01214201 +0.03084622

-.00034928 +00030641  -0.00034928 +0.00030641
 +.40000000 +20000000 X +.01214201 +03084622 = -0.00166172 +0.01507330

-.00004986 +00001118  -0.00004986 +0.00001118
 +.40000000 +20000000 X -.00166172 +01507330 = -0.00372920†+0.00570815†

+.01317647 +02129412  +0.01317647 +0.02129412
 +.50000000 +20000000 X +.10000000 +00000000 = +0.06317647 +0.04129412

-.00086975 +00369328  -0.00086975 +0.00369328
 +.50000000 +20000000 X +.06317647 +04129412 = +0.02245966 +0.03697563

-.00034928 +00030641  -0.00034928 +0.00030641
 +.50000000 +20000000 X +.02245966 +03697563 = +0.00348542 +0.02328615†

-.00004986 +00001118  -0.00004986 +0.00001118
 +.50000000 +20000000 X +.00348542 +02328615 = -0.00296438 +0.01235133†

+.01317647 +02129412  +0.01317647 +0.02129412
 +.60000000 +20000000 X +.10000000 +00000000 = +0.07317647 +0.04129412

-.00086975 +00369328  -0.00086975 +0.00369328
 +.60000000 +20000000 X +.07317647 +04129412 = +0.03477730†+0.04310504†

-.00034928 +00030641  -0.00034928 +0.00030641
 +.60000000 +20000000 X +.03477730 +04310504 = +0.01189609 +0.03312489

-.00004986 +00001118  -0.00004986 +0.00001118
 +.60000000 +20000000 X +.01189609 +03312489 = +0.00046281†+0.02226533

+.01317647 +02129412  +0.01317647 +0.02129412
 +.70000000 +20000000 X +.10000000 +00000000 = +0.08317647 +0.04129412

-.00086975 +00369328  -0.00086975 +0.00369328
 +.70000000 +20000000 X +.08317647 +04129412 = +0.04909495†+0.04923445†

-.00034928 +00030641  -0.00034928 +0.00030641
 +.70000000 +20000000 X +.04909495 +04923445 = +0.02417029†+0.04458951†

-.00004986 +00001118  -0.00004986 +0.00001118
 +.70000000 +20000000 X +.02417029 +04458951 = +0.00795144 +0.03605789†
```

INVENTOR
G. R. STIBITZ
BY 
ATTORNEY

Jan. 19, 1954  G. R. STIBITZ  2,666,579
AUTOMATIC CALCULATOR
Filed Dec. 26, 1944  31 Sheets-Sheet 9

FIG. 15

| FIG. 16 ENTRY KEYS | FIG. 17 ENTRY KEYS PRINTER SIGNALS | FIG. 18 SWITCHING RELAYS | FIG. 19 | FIG. 20 TRANSLATOR RELAYS | FIG. 21 | FIG. 28 ENTRY FACTOR F | FIG. 29 REGISTERS FACTOR G | FIG. 30 AND PROGRESS CCT. FACTOR D | FIG. 31 FACTOR E |
|---|---|---|---|---|---|---|---|---|---|
| | FIG. 22 TAPE PERFORATORS AND TRANSMITTERS | FIG. 23 SWITCHING RELAYS | FIG. 24 | FIG. 25 | FIG. 26 FUNCTION RELAYS | FIG. 32 MULTIPLIER DIGIT SWITCH PROGRESS CCT. COUNTING RELAYS | FIG. 33 COLUMN SHIFT SWITCH AND SUMMING RELAYS REAL | FIG. 34 IMAGINARY $F^2 + G^2$ REGISTER FACTOR SHIFT | |
| | | | | | FIG. 27 PRINTER CONTROL | FIG. 35 PRINTING CROSSBAR SWITCH AND PROGRESS CCT. | FIG. 36 | FIG. 37 MASTER CONTROL CCT. | |

INVENTOR
G. R. STIBITZ
BY
[signature]
ATTORNEY

Jan. 19, 1954  G. R. STIBITZ  2,666,579
AUTOMATIC CALCULATOR
Filed Dec. 26, 1944  31 Sheets-Sheet 10

INVENTOR
G. R. STIBITZ
BY
ATTORNEY

Jan. 19, 1954          G. R. STIBITZ          2,666,579
                    AUTOMATIC CALCULATOR
Filed Dec. 26, 1944                         31 Sheets-Sheet 12

INVENTOR
G. R. STIBITZ
BY
ATTORNEY

Jan. 19, 1954

G. R. STIBITZ 2,666,579

AUTOMATIC CALCULATOR

Filed Dec. 26, 1944

INVENTOR
G. R. STIBITZ
BY
ATTORNEY

Jan. 19, 1954

G. R. STIBITZ
AUTOMATIC CALCULATOR 2,666,579

Filed Dec. 26, 1944

INVENTOR
G. R. STIBITZ
BY John A. Hall
ATTORNEY

Jan. 19, 1954          G. R. STIBITZ          2,666,579
AUTOMATIC CALCULATOR
Filed Dec. 26, 1944          31 Sheets-Sheet 16

INVENTOR
G. R. STIBITZ
BY
ATTORNEY

Jan. 19, 1954   G. R. STIBITZ   2,666,579
AUTOMATIC CALCULATOR
Filed Dec. 26, 1944   31 Sheets-Sheet 18

INVENTOR
G. R. STIBITZ
BY
ATTORNEY

Jan. 19, 1954

G. R. STIBITZ 2,666,579

AUTOMATIC CALCULATOR

Filed Dec. 26, 1944

INVENTOR
G. R. STIBITZ
BY
ATTORNEY

Jan. 19, 1954    G. R. STIBITZ    2,666,579
AUTOMATIC CALCULATOR
Filed Dec. 26, 1944    31 Sheets-Sheet 20

INVENTOR
G. R. STIBITZ
BY
ATTORNEY

Jan. 19, 1954 G. R. STIBITZ 2,666,579
AUTOMATIC CALCULATOR
Filed Dec. 26, 1944 31 Sheets-Sheet 21

INVENTOR
G. R. STIBITZ
BY John A. Hall
ATTORNEY

Jan. 19, 1954 — G. R. STIBITZ — 2,666,579
AUTOMATIC CALCULATOR
Filed Dec. 26, 1944 — 31 Sheets-Sheet 22

INVENTOR
G. R. STIBITZ
BY John A. Hall
ATTORNEY

Jan. 19, 1954  G. R. STIBITZ  2,666,579
AUTOMATIC CALCULATOR
Filed Dec. 26, 1944  31 Sheets-Sheet 24

INVENTOR
G. R. STIBITZ
BY
John A Hall
ATTORNEY

Jan. 19, 1954

G. R. STIBITZ 2,666,579

AUTOMATIC CALCULATOR

Filed Dec. 26, 1944

INVENTOR
G. R. STIBITZ
BY
ATTORNEY

Jan. 19, 1954

G. R. STIBITZ 2,666,579

AUTOMATIC CALCULATOR

Filed Dec. 26, 1944

INVENTOR
G. R. STIBITZ
BY
ATTORNEY

Jan. 19, 1954

G. R. STIBITZ 2,666,579

AUTOMATIC CALCULATOR

Filed Dec. 26, 1944

INVENTOR
G. R. STIBITZ
BY
John Attall
ATTORNEY

Jan. 19, 1954     G. R. STIBITZ     2,666,579
AUTOMATIC CALCULATOR

Filed Dec. 26, 1944     31 Sheets-Sheet 29

INVENTOR
G. R. STIBITZ
BY
ATTORNEY

Jan. 19, 1954  G. R. STIBITZ  2,666,579
AUTOMATIC CALCULATOR
Filed Dec. 26, 1944  31 Sheets-Sheet 30

INVENTOR
G. R. STIBITZ
BY
ATTORNEY

Jan. 19, 1954   G. R. STIBITZ   2,666,579
AUTOMATIC CALCULATOR
Filed Dec. 26, 1944   31 Sheets-Sheet 31

INVENTOR
G. R. STIBITZ
BY
ATTORNEY

Patented Jan. 19, 1954

2,666,579

UNITED STATES PATENT OFFICE 2,666,579

AUTOMATIC CALCULATOR

George R. Stibitz, Boonton, N. J., assignor to Bell Telephone Laboratories, Incorporated, New York, N. Y., a corporation of New York Application December 26, 1944, Serial No. 569,867

13 Claims. (Cl. 235—61.6)

This invention relates to calculating methods and apparatus and particularly to systems of electrical control whereby various mathematical operations may be carried out under control of instructional data entered in a calculating device together with and at the same time as the mathematical value data is entered.

An object of the invention is to provide a calculating device in which partial results are calculated, stored and later employed as factors in further calculations whereby an extended calculation requiring a large number of separate steps may be undertaken without the necessity for constant supervision and manipulation of the device or repeated manual entry of newly calculated partial results.

Another object of the invention is to provide a calculating device in which instructional data may be entered and which may be stored in a form so that it may be used repeatedly, each time in connection with a new set or list of mathematical value data.

In accordance with the above objects a device is provided in which a polynomial expression capable of algebraic transformation into a plurality of similar operations may be evaluated. Operating instructions and mathematical data may be entered in the device for a single or for a plurality of such evaluations and thereafter the device may be left to automatic operation unattended for an indefinite period.

In its preferred embodiment the device is operated under control of a pair of indexing means, one of which may be called a master index and in which the instructional data is recorded and the other of which may be called a factor data index and in which preliminary factor data, partial results and the final results are recorded. These indices will act as controls, the master index preparing the calculating device for a particular pattern of operation and controlling the entry of factor data in the device as it is required.

In its preferred embodiment the device is operated under control of indexing means in the form of tapes which provide peculiarly convenient forms of record, particularly in the case of the master control tape wherein the instructional data recorded therein has to be used repeatedly. In this case the ends of the tape are joined to form an endless loop, an arrangement which has many practical advantages over other mechanical arrangements for shifting from the end of the record after one complete operation to the beginning of the record before the next operation.

Again, in its preferred embodiment the device of the present invention employs as indexing means, the conventional form of tape used in the printing telegraph art, punched in the same manner and using similar codes, in some cases identical codes.

The device in general consists of a combination with a calculating device of control means whereby instructional data and mathematical factor data may be recorded in the form of control tapes and which thereafter will control the calculating device over an indefinite period so that tables of mathematical data may be calculated and recorded automatically.

The device in a preferred embodiment is constructed of conventional elements taken from the communication arts including a printing telegraph page printer, tape perforators, tape transmitters and a calculator constructed of switches used conventionally in telegraph and telephone arts and electrical relays from the various telecommunication arts.

In its illustrative embodiment the device is one employing as a calculator the complex computer forming the subject-matter of my application Serial No. 564,853, filed November 23, 1944 as a continuation of my application Serial No. 389,321 filed April 19, 1941.

In outward appearance the operator's station includes a keyboard having some thirty keys, a page printer which records the factors entered, the partial results and the final result, a pair of perforators and a corresponding pair of tape transmitters. The remainder of the apparatus including the calculating means takes the form of apparatus mounted on racks in the conventional manner and this may be located at any convenient place near or at some distance from the operator's station.

A feature of the invention is a device in which a set of general instructions and a series of specific instructions may be entered and which thereafter will operate automatically under the said instructions through a series of cycles, carrying out the general instructions completely for each said cycle, the number of said cycles being equal to the number of specific instructions in said series of specific instructions. Thus the general instructions may be the instructional data and known coefficients of a polynomial expression representing what is known as a function of an unknown and the specific instructions may be a series of trial values of the unknown. These instructions being recorded on suitable recording media the device may be started and will thereafter function automatically over an indefinite period until all the instructions entered therein are fully carried out.

Another feature of the invention is a calculating device arranged to compute tables of algebraic polynomial expressions or general functions of a real or complex variable, expressible in power series expansions, by automatically feeding back into the device partial solutions at intermediate stages of the calculation.

Another feature of the invention is a calculating device capable of operating under indexed control having a predetermined control index and a separate calculated control index, the first determining when it shall give up control temporarily to the second and automatic means for adding to intermediate calculated results recorded on the second of said indices a signal for causing the first to take back control from the second. Stated in specific form this means that where the instructional index issues an instruction to bring the mathematical factor index into operation the end of each mathematical factor will be followed by a specific instructional index which will act as a signal to again shift the control.

The drawings consist of thirty-one sheets having thirty-eight figures as follows:

Fig. 1 is a block diagram showing how Figs. 2 and 3 may be placed to form a complete flow chart;

Fig. 2 is a flow chart of that portion of the present disclosure which constitutes the novel part of the present invention. To the left of the broken line 44 there is an outline perspective view of the apparatus at the operator's station and in this portion as well as in the portion to the right of this broken line there is a schematic circuit diagram showing by means of arrowheads the direction of the flow of information in the form of electrical pulses and circuit closures;

Fig. 4 is a circuit and perspective view similar to that to the left of line 44 in Fig. 2 and which may be substituted therefor in order to illustrate the employment of a master tape in the form of an endless loop;

Fig. 5 is a representation of the tapes used showing the type of perforations conventionally employed in the printing telegraph art;

Fig. 6 is a top view of the keyboard showing the key designations;

Fig. 12 is a schematic circuit diagram showing in simple form the circuits affected by the transmission of the codes SW XH HX SWU;

Fig. 13 is a similar schematic circuit diagram showing the circuit changes brought about through the transmission of the codes

Figure 14:
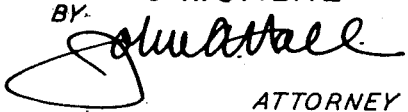
Figure 16:
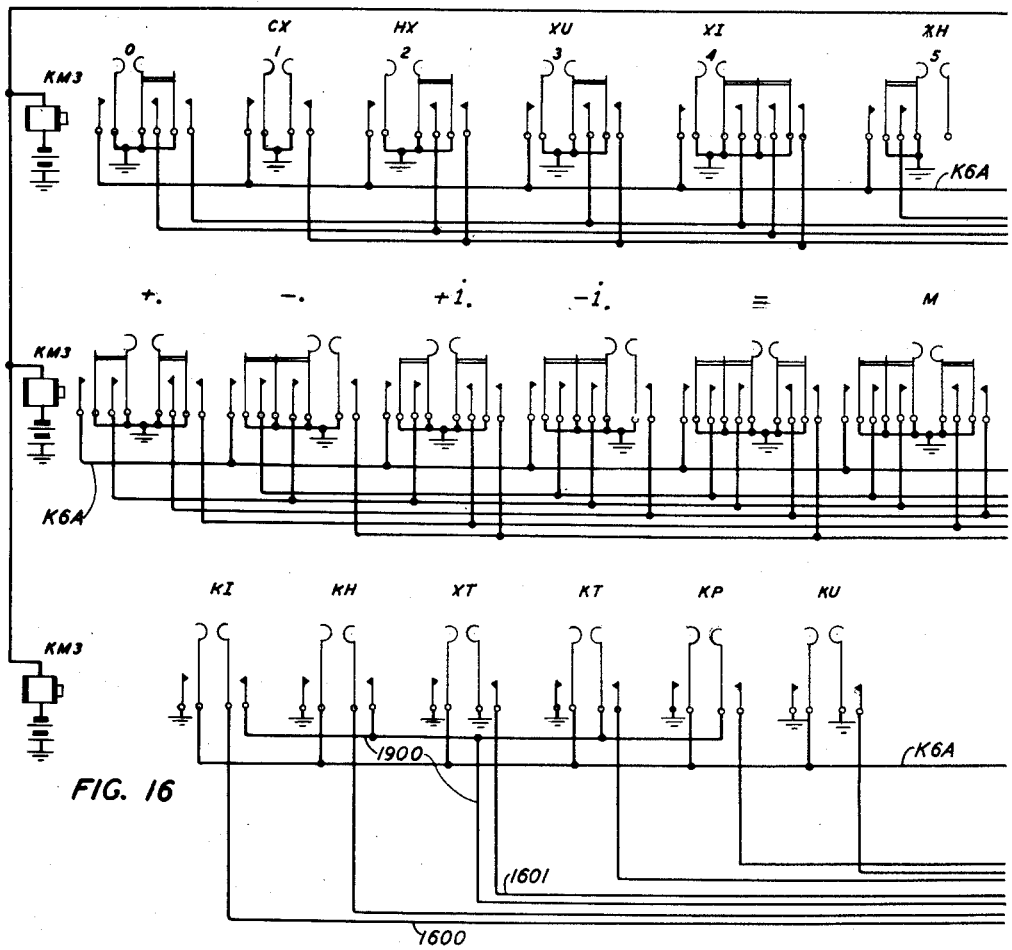
Figure 38:
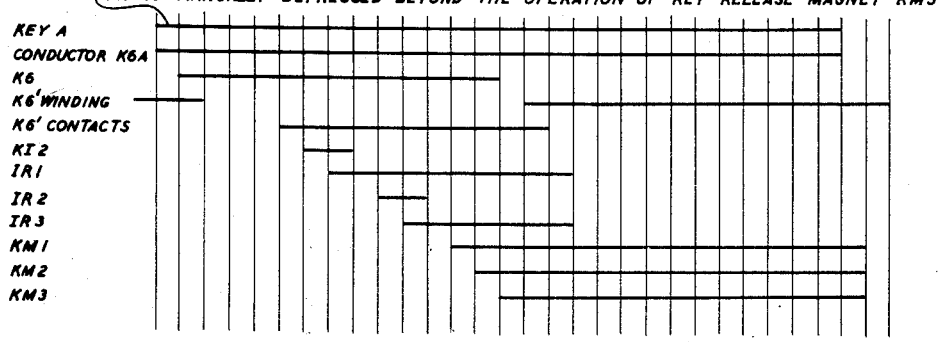
Figure 17:
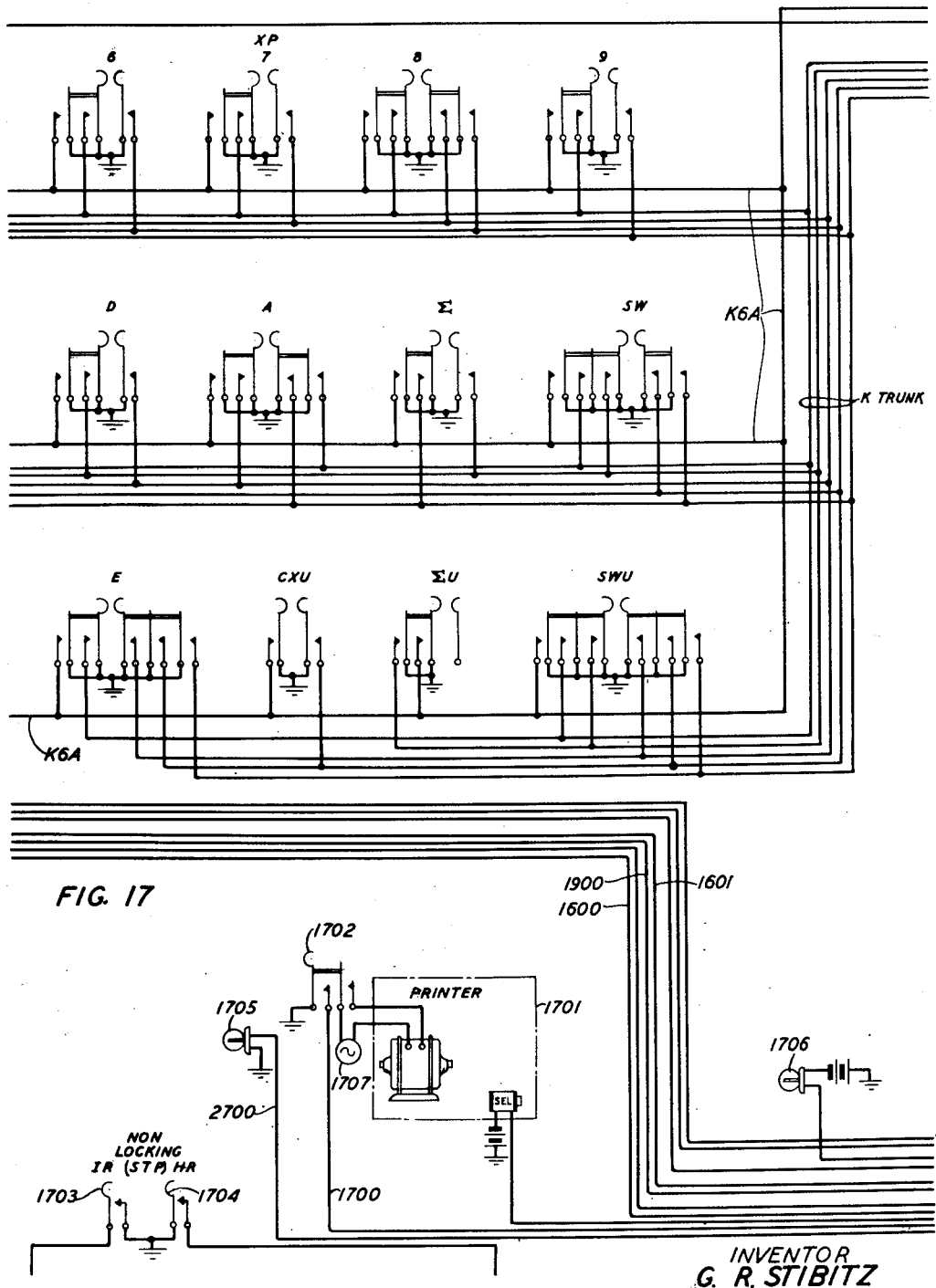
Figure 20:
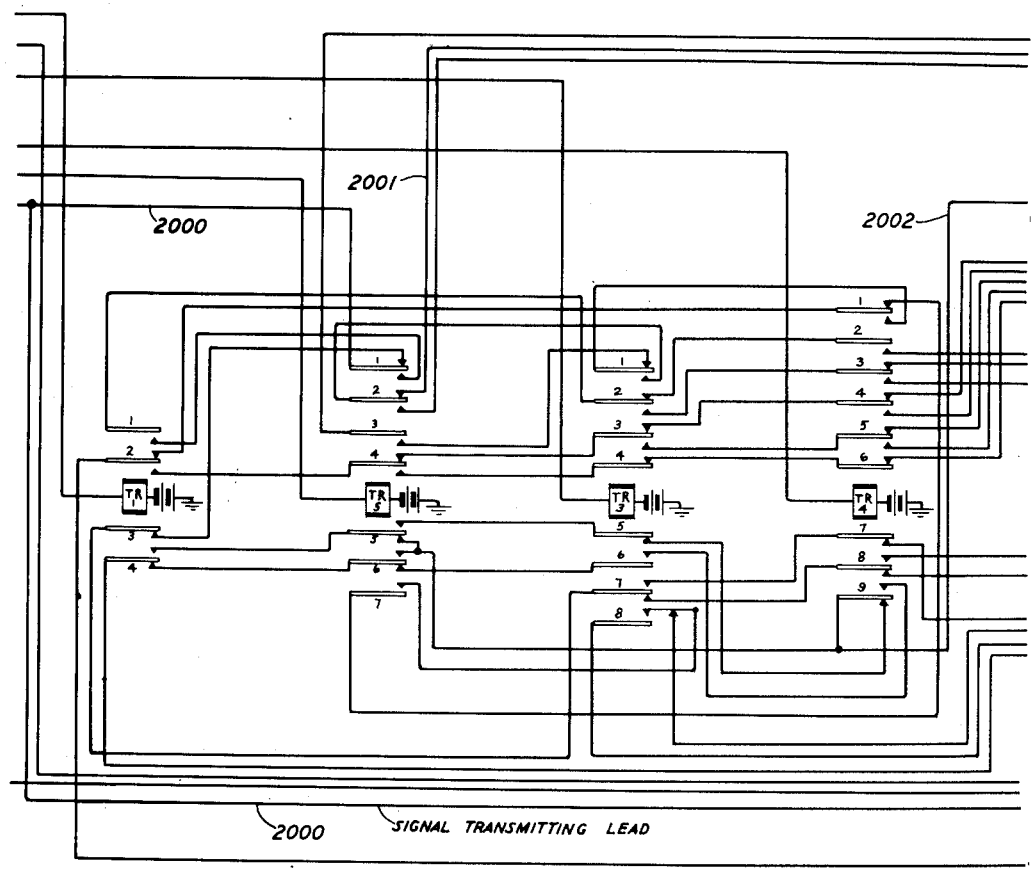
Figure 21:
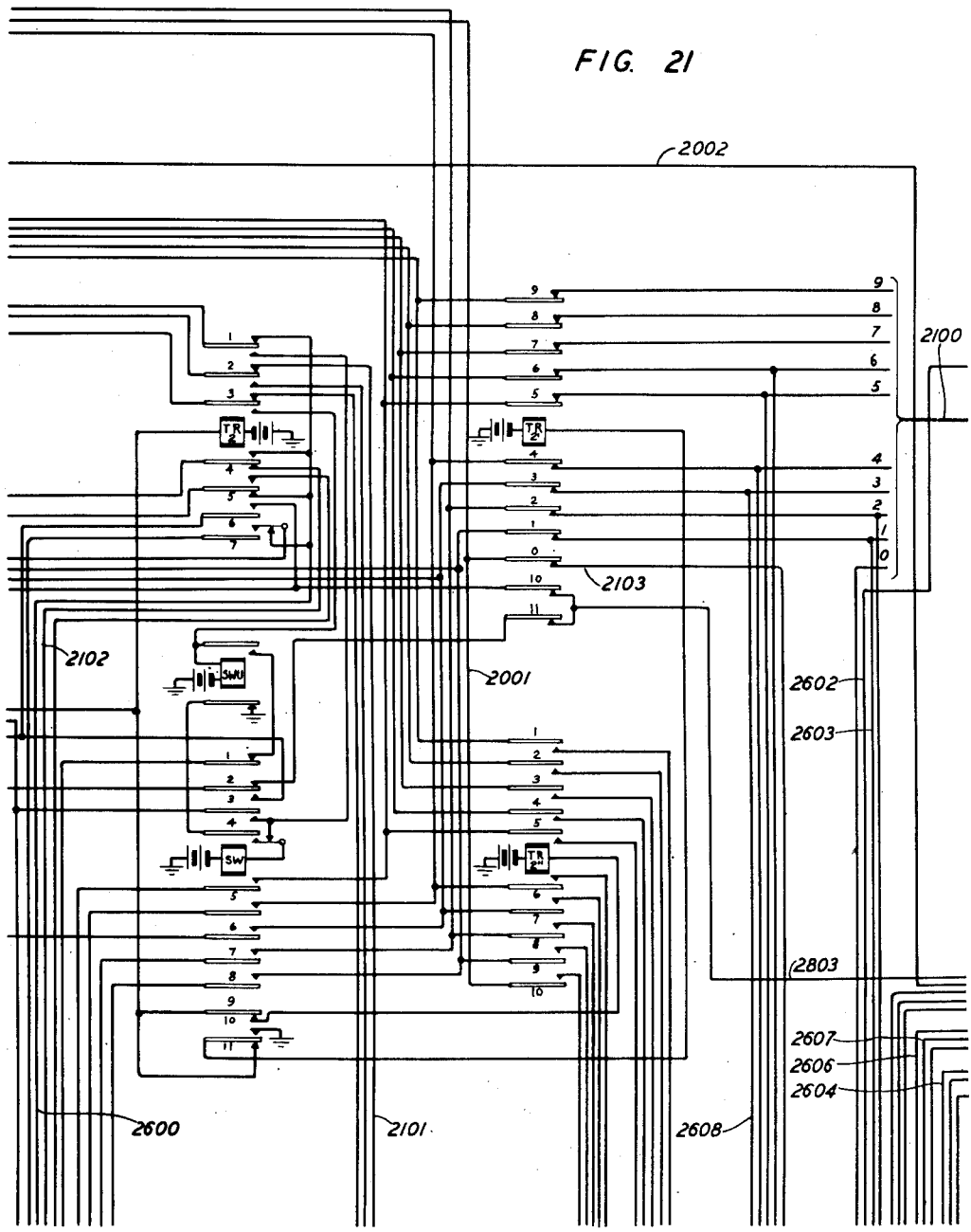
Figure 22:
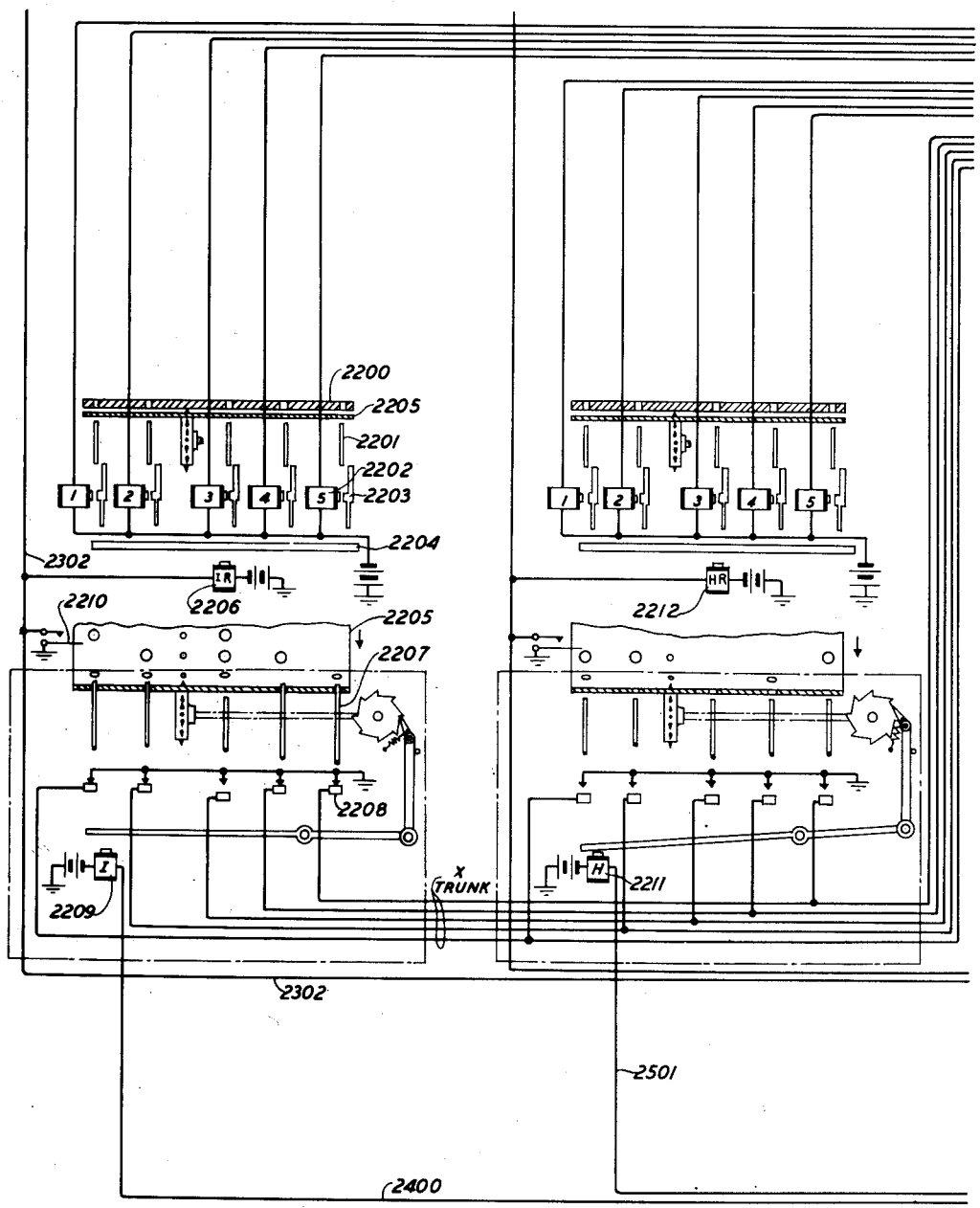
Figure 23:
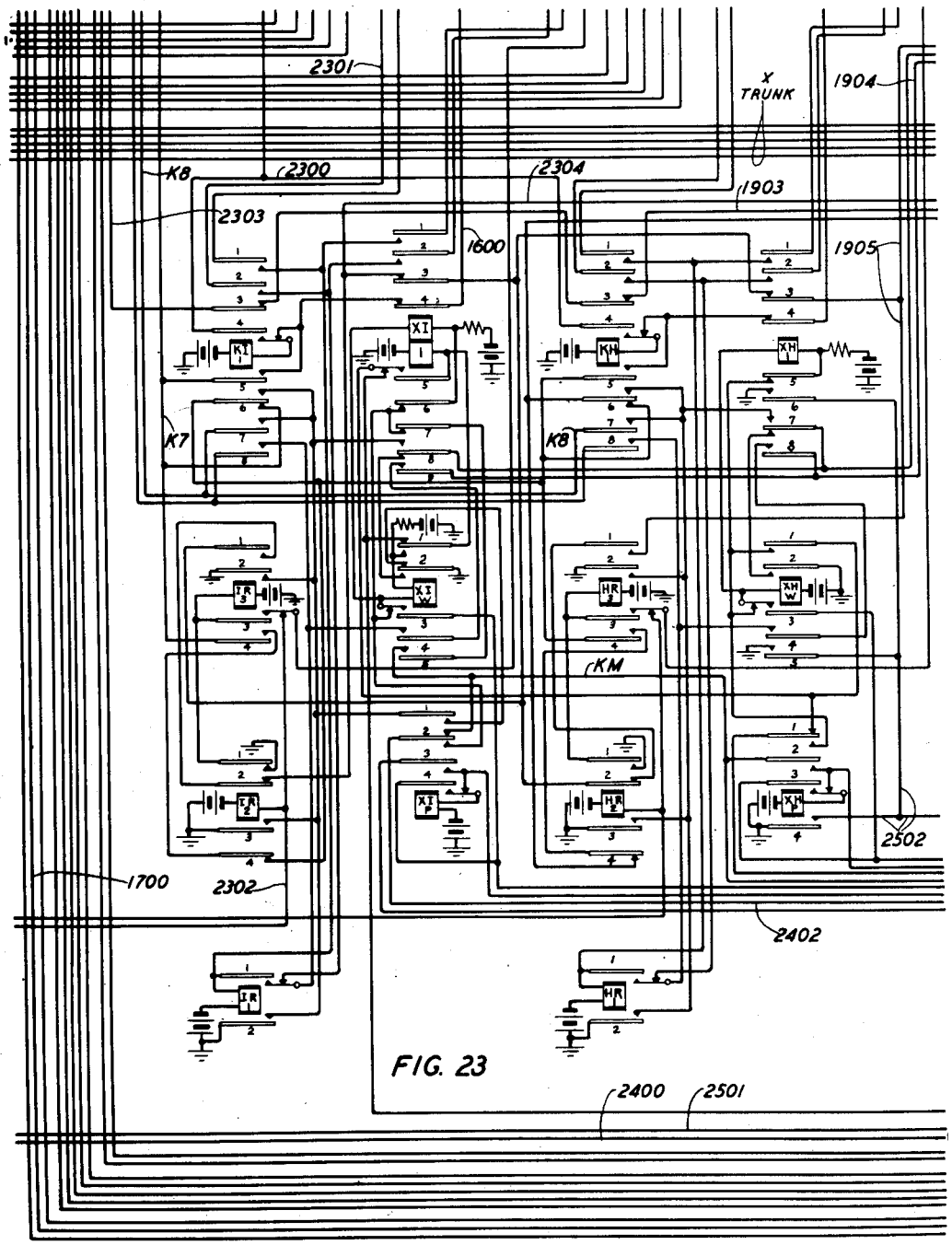
Figure 24:
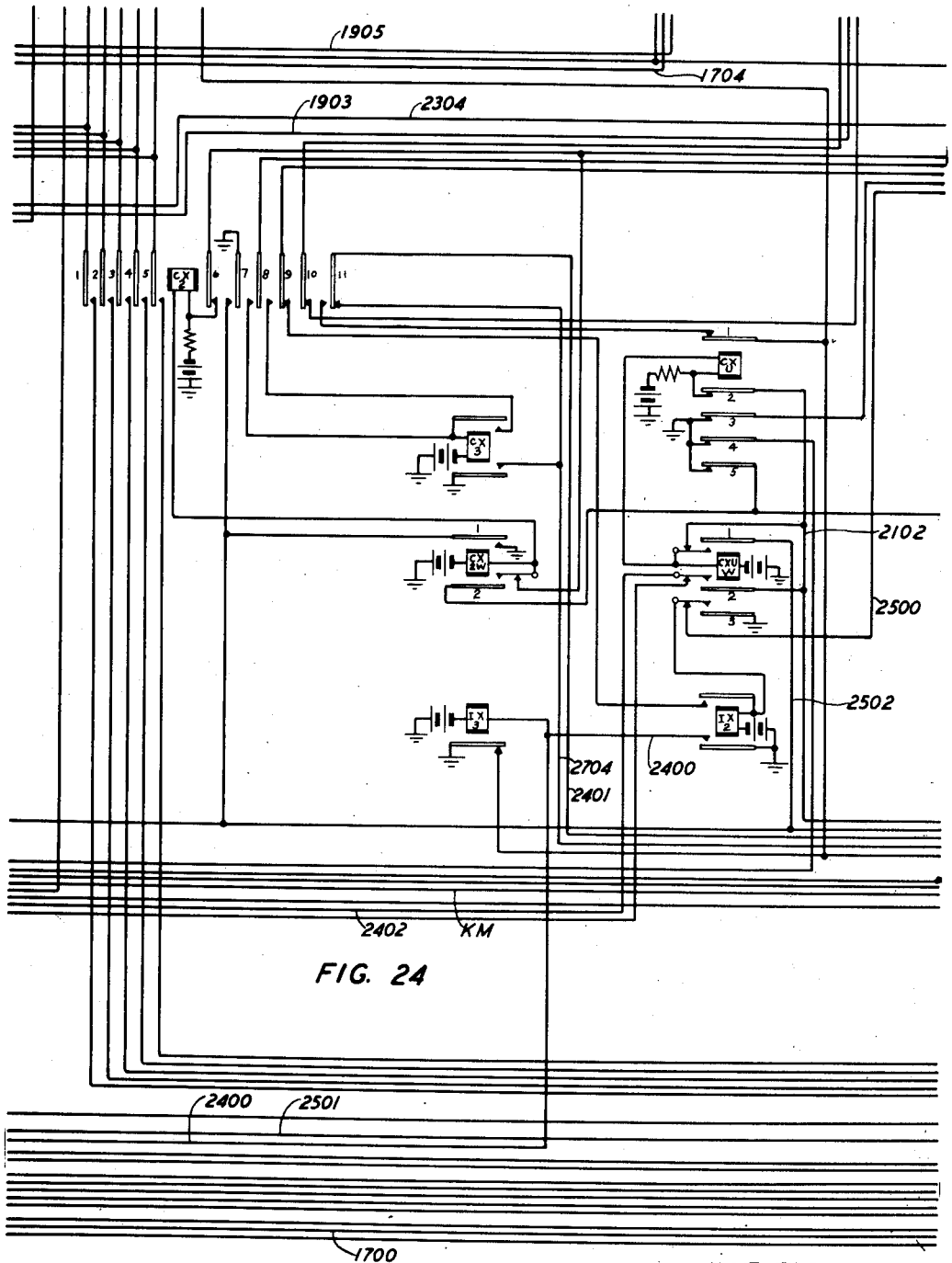
Figure 25:
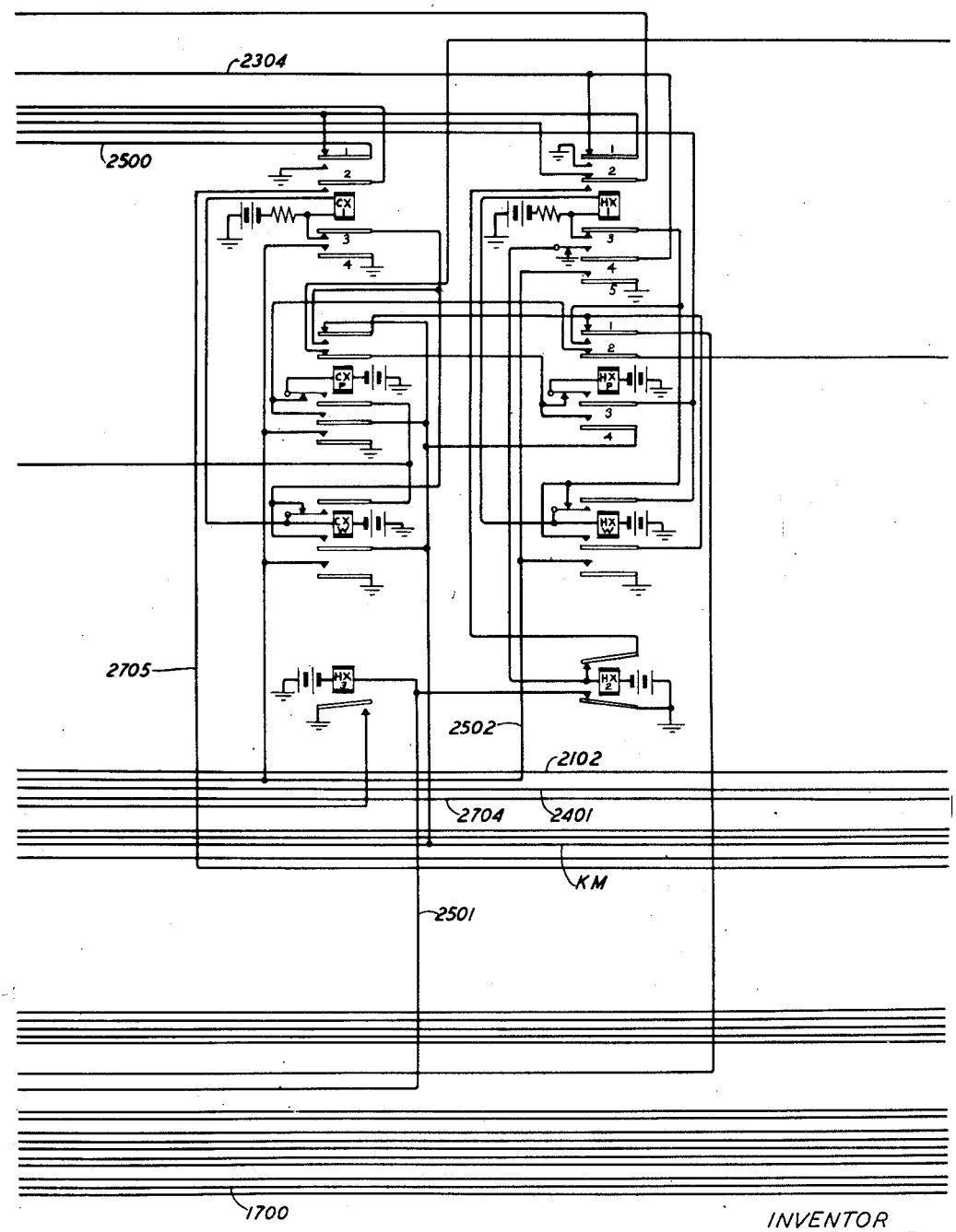
Figure 26:
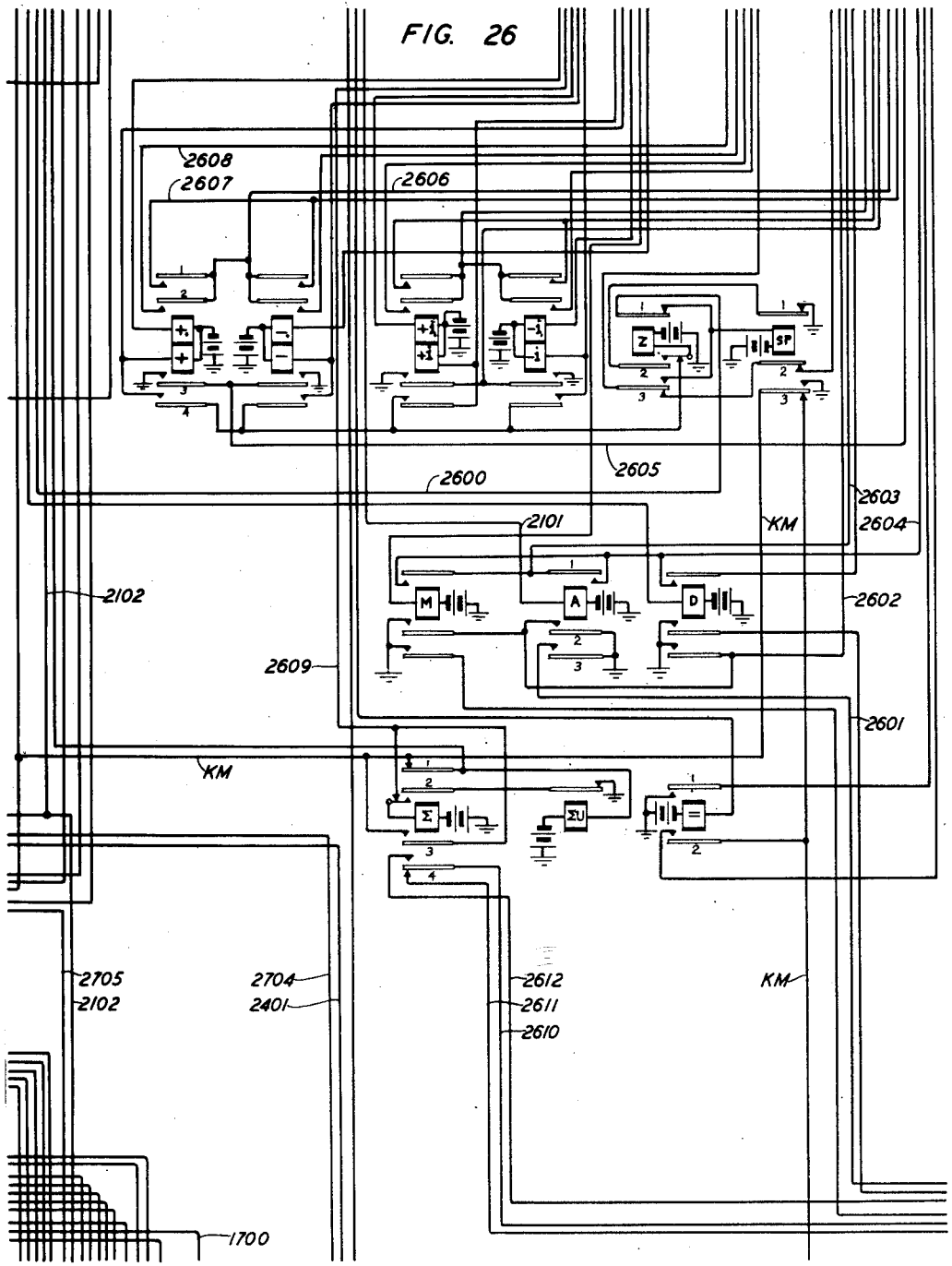
Figure 27:
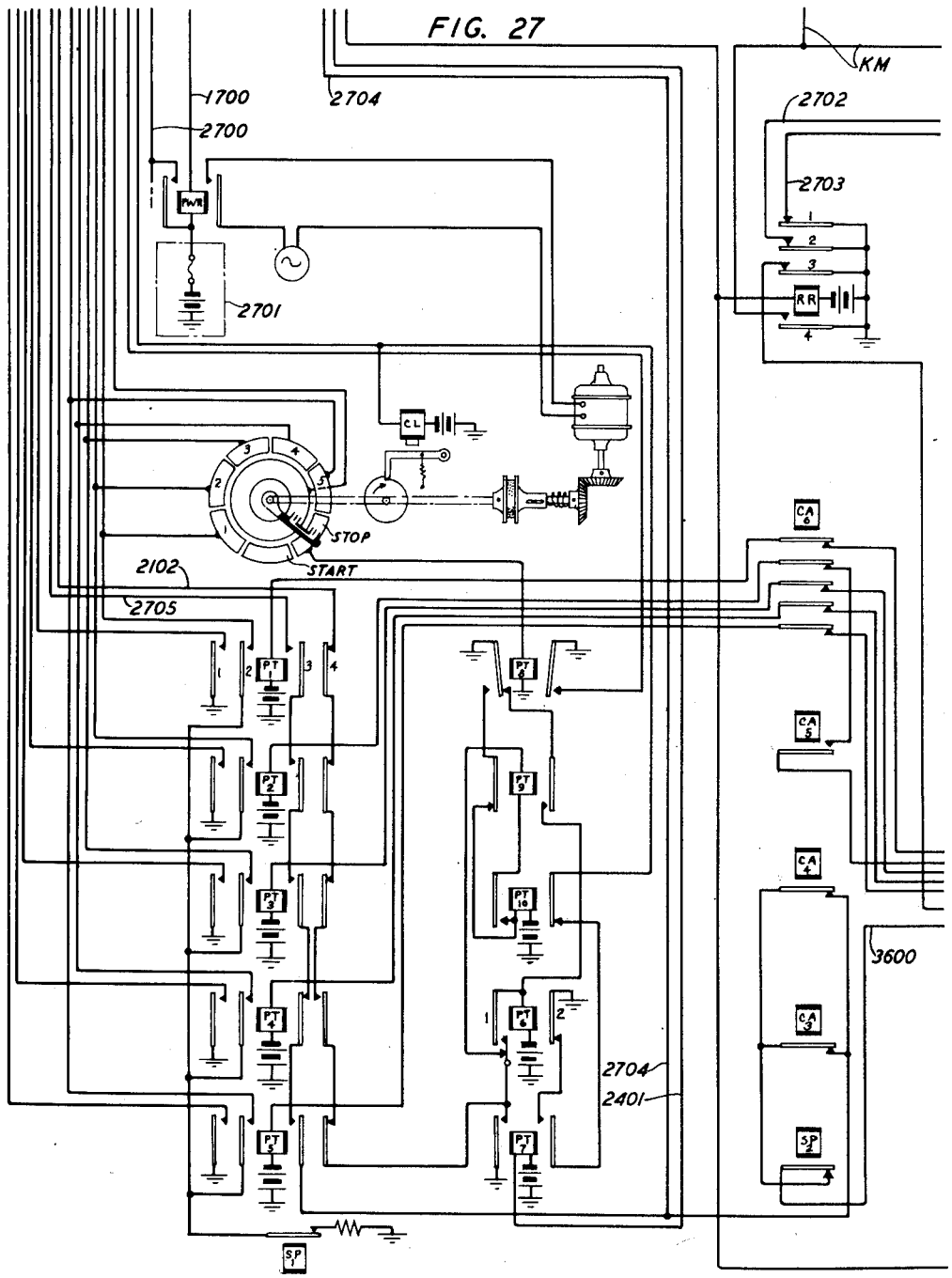
Figure 32:
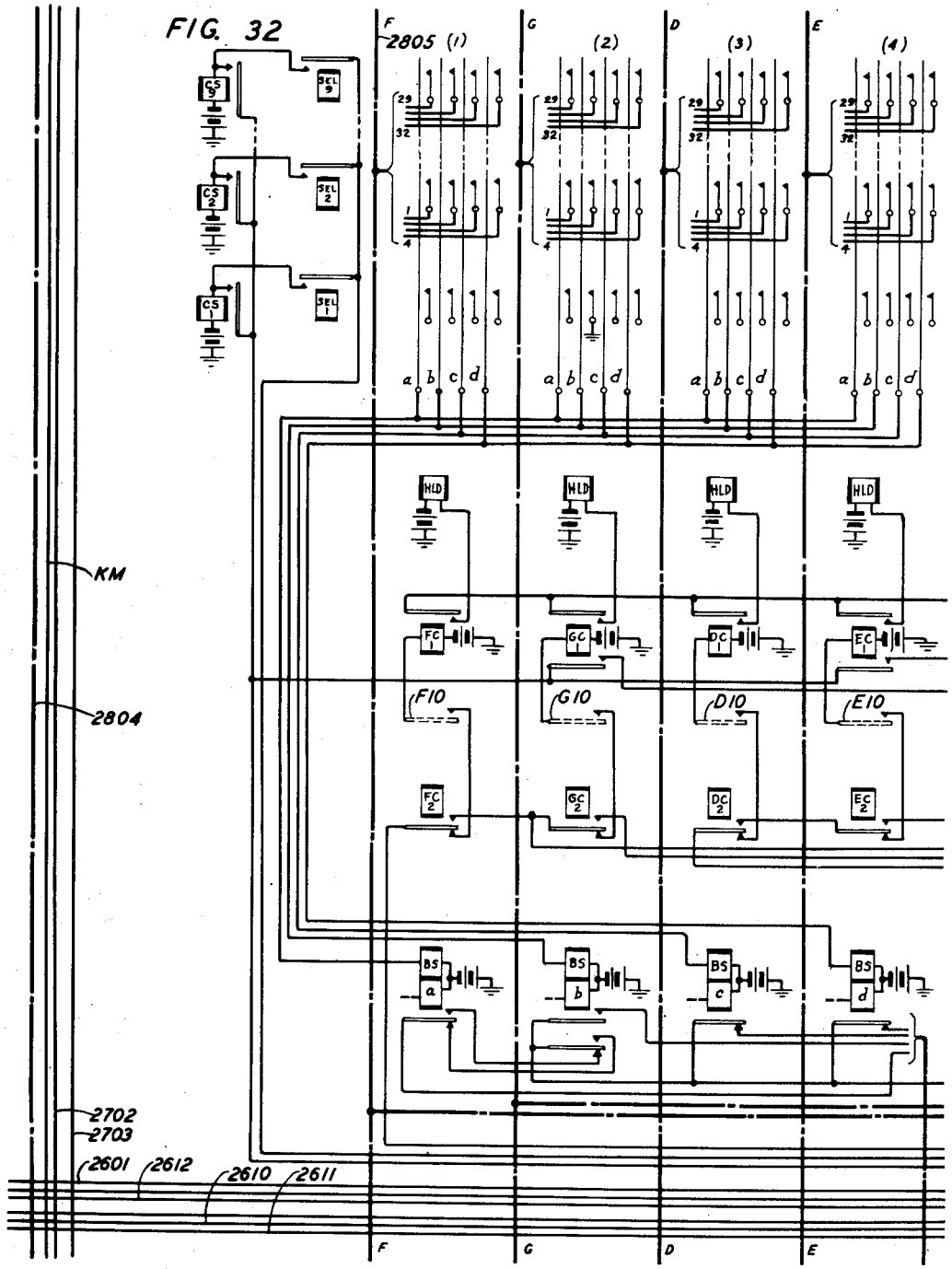
Figure 33:
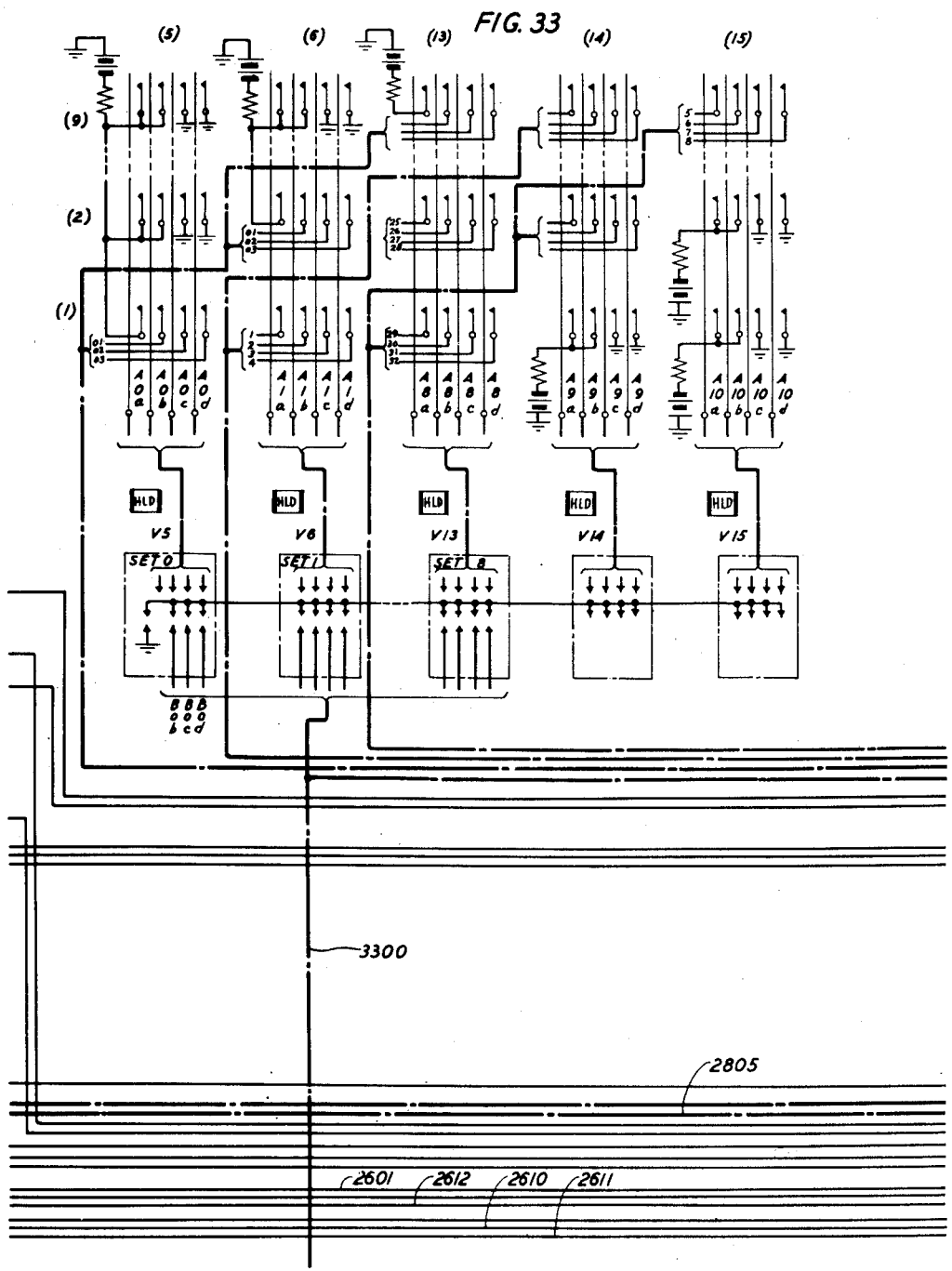
Figure 34:
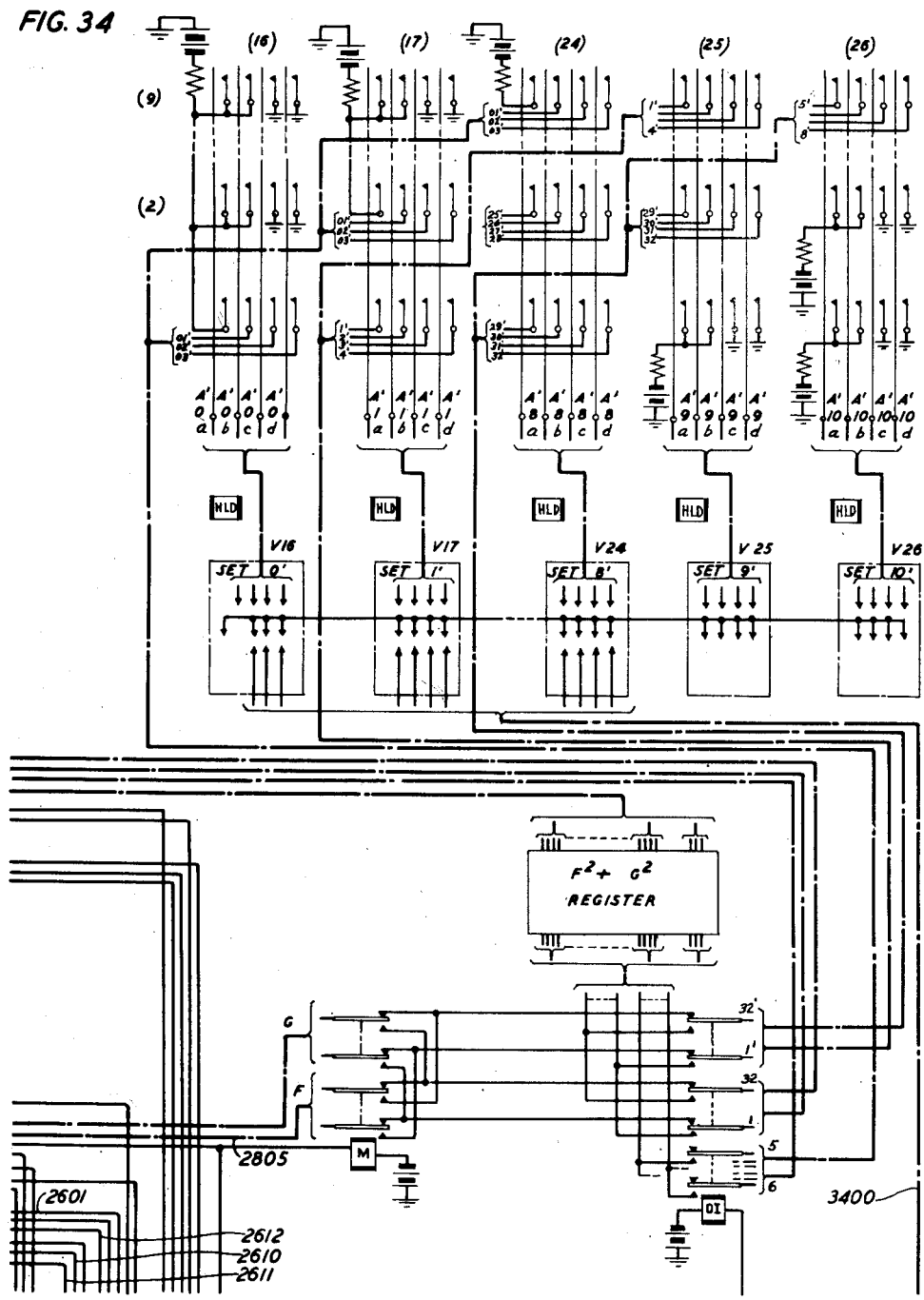
Figure 35:
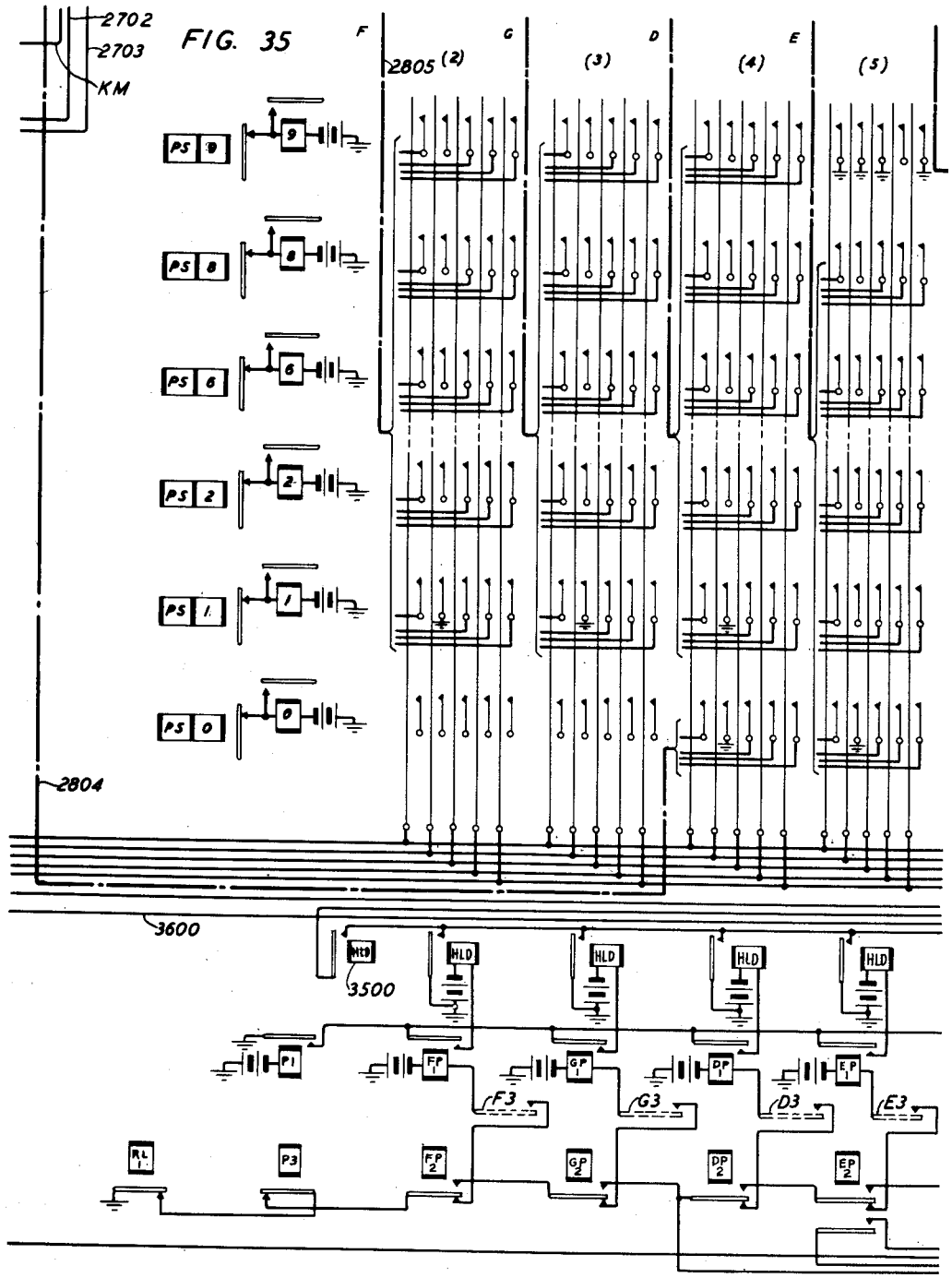
Figure 36:
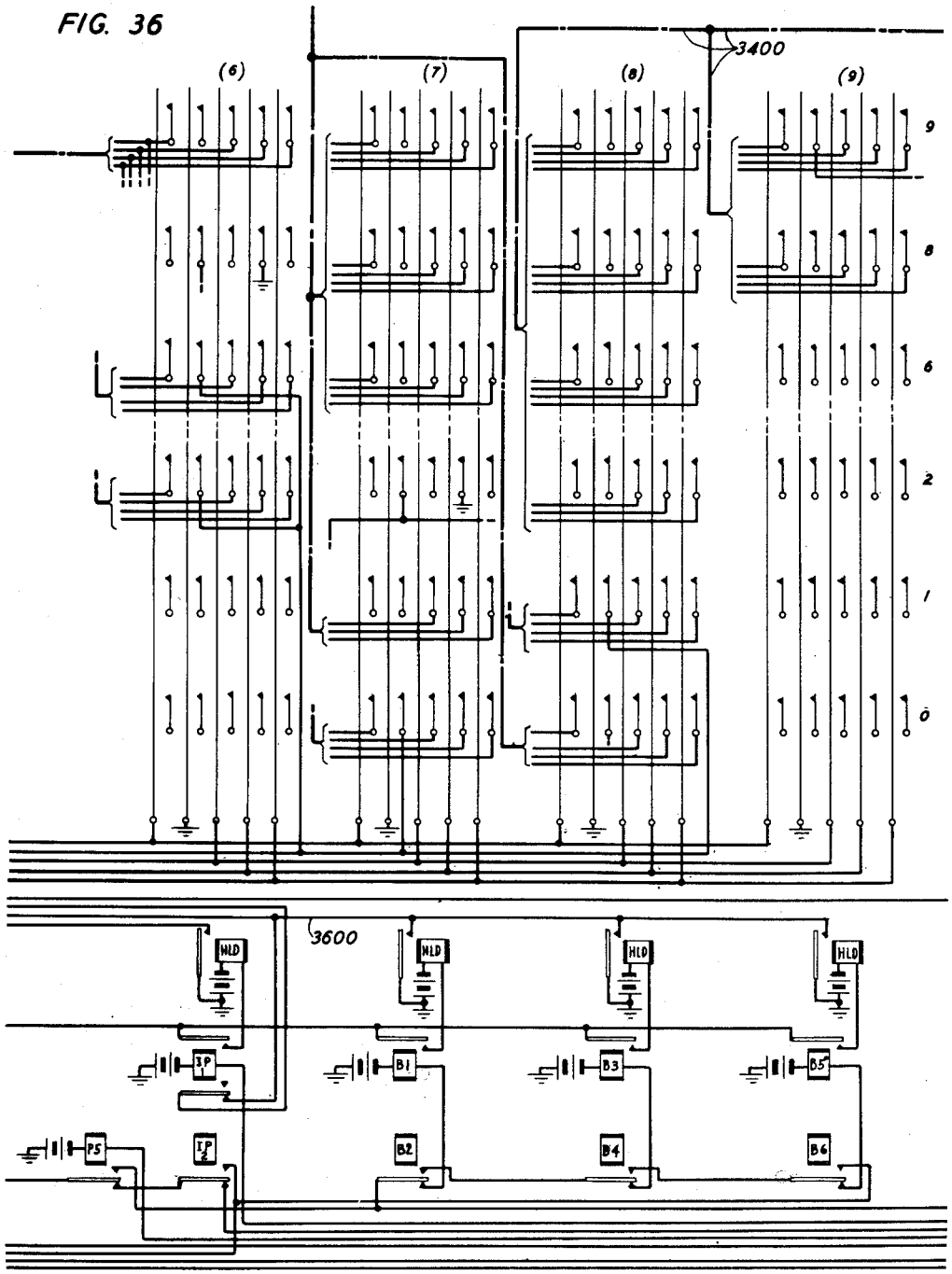
Figure 37:
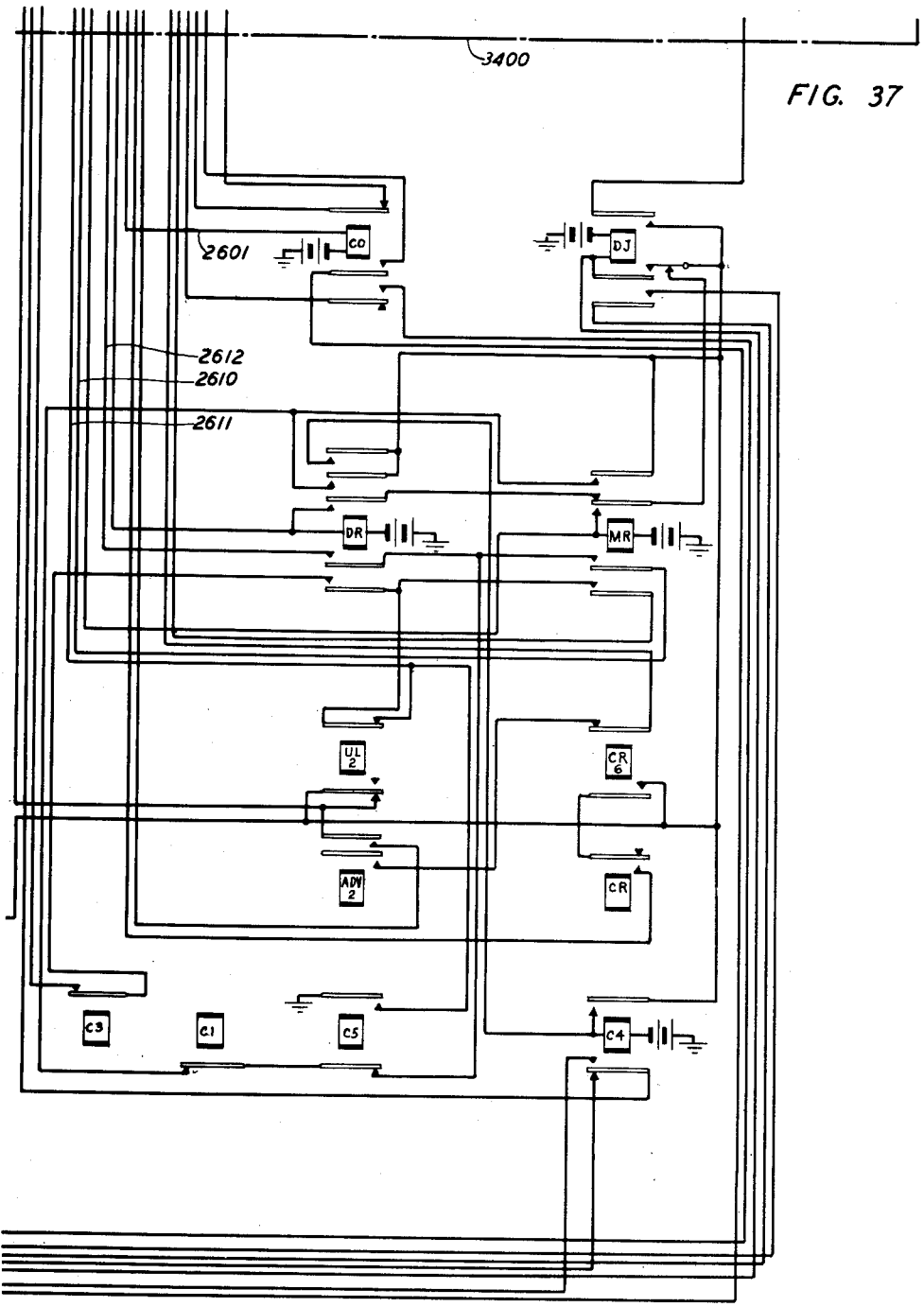

SW CX XH SWU =;

Fig. 14 is a reproduction of a page printed by the printer and showing the calculation of five values corresponding to five different values of the unknown;

Fig. 15 is a block diagram showing how the remaining twenty-two figures may be placed to provide a complete circuit diagram illustrating the invention, Figs. 16 to 27, inclusive, containing the new circuits herein provided and Figs. 28 to 37, inclusive, being a sufficiently detailed circuit of my previously filed application disclosing a calculator arranged to make calculations in the mathematician's complex numbers;

Figs. 16 and 17 show the circuits for the keyset;

Fig. 17 shows, in addition, the printer, the master control keys and the signal lamps;

Figs. 18, 19, 23, 24 and 25 show the various switching relays responsive either to the keys or to the tape transmitters;

Figs. 20 and 21 show the circuits of the translator relays;

Fig. 22 shows the two perforators and the two tape transmitters;

Fig. 26 shows certain function relays for response to instructional codes transmitted through the translator;

Fig. 27 shows the printer operating circuit replacing a similar circuit forming part of the complex computer, the present circuit involving a slight modification of the original consisting essentially of the addition of a translating function;

Figs. 28, 29, 30 and 31 show the entry registers and the progress circuit therefor of the complex computer;

Fig. 32 shows the multipler digit switches, the progress circuit therefor and the counting relays operated thereby, of the complex computer;

Fig. 33 shows the real column shift switch of the complex computer;

Fig. 34 shows the imaginary column shift switch, an indication of the $F^2+G^2$ register, and the factor entry shifting means of the complex computer;

Figs. 35 and 36 show the printing cross bar switch and the progress circuit therefor of the complex computer;

Fig. 37 shows a sufficient portion of the master control relays to indicate the operation of the complex computer; and Fig. 38 is a time sequence chart to show the cycle of operations taking place upon the depression of a coded key.

*The apparatus*

The apparatus used in constructing the device of the present invention is mostly standard communication apparatus, details of which may be found in the following references.

The printing telegraph receiver is shown in Patent 2,247,408, A. H. Reiber, July 1, 1941, and in the Bell Laboratories Record, volume 17, No. 2, pages 53 to 59, October 1938 and No. 8, pages 257 to 259, April 1939.

The transmitter distributor is disclosed in Patents 1,311,915, P. M. Rainey, August 5, 1919; 2,154,952, E. F. Watson, April 18, 1939; 2,055,567, E. F. Watson, September 29, 1936, and in the Bell Laboratories Record, vol. 17, No. 2, pages 53 to 59, October 1938.

The keyboard is generally of the type shown in Patent 1,378,950 to A. D. Hargan, May 24, 1921.

The cross bar switch is shown in Patents 1,953,503, April 2, 1934, 2,021,329, November 19, 1935 and 2,040,334, May 12, 1936, all issued to J. N. Reynolds.

The relays are shown in the following patents: 1,156,671, E. B. Craft, October 12, 1915; 1,633,576, C. H. Franks, June 28, 1927; 1,652,489, E. D. Mead, December 13, 1927; 1,652,490, D. D. Miller, December 13, 1927; 1,652,491, D. D. Miller, December 13, 1927; 2,178,656, P. W. Swenson, November 7, 1939; 2,323,961, F. A. Zupa, July 13, 1943.

A tape transmitter showing the essential elements and arrangement of the parts used herein may be found in Patent 1,298,440, G. R. Benjamin, March 25, 1919.

A perforator showing the general type of construction of a device such as that used herein is disclosed in Patent 2,252,852, Hoover, August 19, 1941.

A taut tape switch is shown in Patent 1,174,236, A. F. Dixon, March 7, 1916.

Other apparatus is of conventional design.

The theory of calculation

The object of the present invention is to provide a calculating device which will solve mathematical problems involving a large plurality of operations and particularly where partial solutions are reentered into the device as factors in subsequent operations. More specifically the object is to prepare the device to carry out a large plurality of operations automatically.

In the applications of mathematics to engineering, many problems must be left unsolved from an engineering viewpoint because of the cost involved in the routine and tedious computations of the numerous solutions desired. The difficulty, simply expressed, is that the value of the results is often outweighed by the effort required in their calculation. This condition is particularly true when a required function is a polynomial expression, or a more general function of a real or complex variable, developed into a power series involving a large number of terms. This point may be illustrated by reference to an article entitled "Mutual impedance of long grounded wires when the conductivity of the earth varies exponentially with depth" prepared by Marion C. Gray and published in Physics, volume 4, No. 2, February 1933. For practical purposes the expression (16) therein may be expressed as $$Z_{12} = P_0 + b'P_1 + b'^2 P_2 + b'^3 P_3 \ldots$$

wherein $P_0$, $P_1$, $P_2$, etc. and $b'$ may be complex numbers.

The device of the present invention is disclosed in a form to evaluate a polynomial expression such as:

$$\varphi(x) = a_n + a_{(n-1)}x + a_{(n-2)}x^2 \ldots a_1 x^{(n-1)} + a_0 x^n$$

The coefficients $a_0$ to $a_n$ are known and may be real or complex numbers, expressed as proper decimal fractions. The unknown $x$ may likewise be a real or a complex number expressed as a decimal fraction.

The evaluation of such a polynomial by a calculating device may be received algebraically into a number of similar operations equal to the highest power of the unknown to which it is wished to carry the calculation. Each operation will be in the form $$\varphi_j = a_j + x \varphi_{(j-1)}$$

where $j$ represents any of the whole numbers 1 to $n$ and where $\varphi_0 = a_0$.

Thus $\varphi_1 = a_1 + xa_0$ represents the initial calculation performed and whereby the value of $\varphi_1$ is derived and held for use as a factor in the next calculating step. This is $$\varphi_2 = a_2 + x\varphi_1$$

Likewise the following calculation becomes $$\varphi_3 = a_3 + x\varphi_2$$

and eventually the final calculation becomes $$\varphi_n = a_n + x\varphi_{n-1}$$

A simple algebraic operation will show that this is the full equivalent of $$\varphi_n = a_n + a_{(n-1)}x \ldots a_1 x^{(n-1)} + a_0 x^n$$

Thus the calculation resolves itself into a series of steps each involving first the entry and accumulation of a value representing a coefficient and then the addition to this of the product of the unknown and the last previously calculated result. If it is desired to calculate the numerical value of such a polynomial expression for a single value of the unknown such calculation may be performed step by step either manually or automatically. The list of coefficient being known the solution may be approached in a series of steps as outlined above. In the preferred embodiment of the invention herein disclosed a means is provided for entering the coefficients on one media and the various values of the unknown on another so that under control of instructional indicia also entered of the first said media the various values of the coefficients and the unknown may be entered into the calculator in accordance with a predetermined pattern. The partial results as calculated are also entered in the second of said media for reentry into the calculator under the predetermined pattern.

In accordance with the example chosen to illustrate the invention two tapes such as those commonly used in the printing telegraph art are employed. One of these tapes is perforated in permutation combinations to control the operation of the calculator, to enter therein the known coefficients and to cause the entry therein of predetermined values of the unknown and the partial calculated results.

Still more specifically a master tape is prepared by perforation of indicia which will 1st—Enter into the calculator the value of the coefficient $a_1$.

2nd—Place the calculator in condition to hold such entered value for the purpose of adding to it the result of the next operation.

3rd—Place the calculator in condition to multiply the factors next entered and add the result thereof to the value accumulated.

4th—Transmit instructions to cause the value of the unknown to be entered into the calculator from an auxiliary tape and at the same time to reperforate the value of the unknown in the said auxiliary tape.

5th—Transmit instructions to cause the value of the initial coefficient $a_0$ to be entered into the calculator without reperforating the auxiliary tape.

6th—Transmit instructions for the partial result representing $\varphi_1$ to be perforated in the auxiliary tape when such result is determined.

7th—Transmit instructions to place the calculator in non-cumulative condition so that when this cycle is repeated the value of $a_2$ next to be entered will not be added to the value of $\varphi_1$ last previously calculated.

8th—Repeat this cycle as many times as there are known coefficients to be used.

Thus the master tape will automatically cause the entry into the calculator of the values as follows:

$$(a_1+x.a_0)\ (a_2+x.\varphi_1)\ (a_3+x.\varphi_2)\ \text{etc.}$$

the result of each calculating operation becoming a partial results as $$a_1+x.a_0=\varphi_1$$
$$a_2+x.\varphi_1=\varphi_2$$
$$a_3+x.\varphi_2=\varphi_3$$

and so on.

The complete series of perforations in the master tape may be repeated a number of times equal to the number of values of the unknown which it is desired to use or the master tape may have this complete set of operational and numerical value indicia perforated only once (or several times to prevent undue wear) and then formed into an endless tape so that the complete cycle may be repeated indefinitely.

The auxiliary tape initially has only the values of the unknown and the initial coefficient perforated therein as $x$, $a_0$. Then during the operation of the device the values $x\,\varphi_1\,x\,\varphi_2\,x\,\varphi_3$, etc. will be automatically perforated therein. If a whole series of the unknown are to be used then the values $$x_1 a_0\ x_2 a_0\ x_3 a_0\ x_4 a_0$$

and so on are perforated in the tape leaving blank space enough between each such group for the automatic perforation therein of the repeated values of the unknown alternated by the partial calculated results. At the end of the operation the auxiliary tape would be perforated as follows:

$$x_1 a_0 x_1 \varphi_{1_1} x_1 \varphi_{2_1} x_1 \varphi_{3_1}\quad x_2 a_0 x_2 \varphi_{1_2} x_2 \varphi_{2_2} x_2 \varphi_{3_2}\ \text{etc.}$$

When, as illustrated, the complex computer of my previously filed application is employed as the calculator of the present invention, the values entered and the partial and final results calculated are fully recorded by the printer. The same problem may be solved on a purely manual basis and without the use of these master and auxiliary tapes. However, where long tables of values are to be derived it is of great advantage to prepare these tapes and to then set the device in automatic operation with the assurance that the printer will produce a record containing the desired tabulation of values. Fig. 14 is a reproduction of a page prepared by the printer giving in the right-hand column a tubulation of partial and final results for five solutions based on the values $(+3+i2)$, $(+4+i2)$, $(+5+i2)$, $(+6+i2)$ and $(+7+i2)$ of the unknown, every fourth value being a final value.

The device may also be operated on a semiautomatic basis by preparing a master tape in the form of either a continuous loop or a tape having the same succession of perforations repeated therein for the total number of times such pattern has to be repeated and then perforating the auxiliary tape with only the first value of the unknown and the initial coefficient. Then when a complete calculation has been made a signal will be displayed whereupon a new value of the unknown and the initial coefficient may be perforated in the auxiliary tape and the apparatus started on another cycle of operations. This would require the attendance of the operator and may be preferred under some circumstances.

*General operation*

Figure 3:
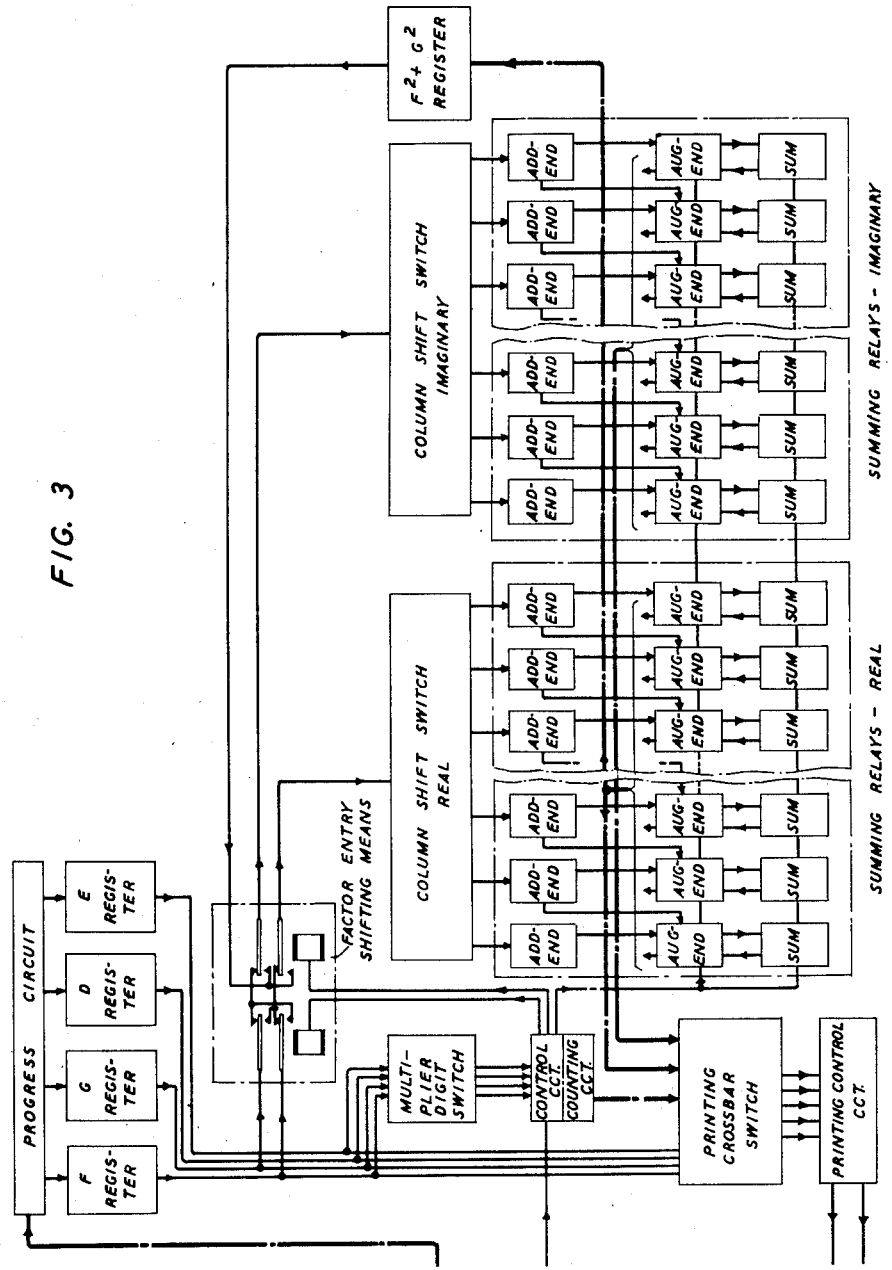
Fig. 3 is a schematic circuit diagram of the calculator shown and described in my previously filed application hereinabove mentioned.

The general operation of the device may be understood from the schematics of Figs. 2, 3 and 4. These are in the form of a flow chart. In Fig. 2 the operator's station is shown as a table on which are mounted the printer, the key-set, the two perforators and the two tape transmitters. The lines leading to and from these components as indicated by the arrowheads also form a schematic circuit diagram. Fig. 2 shows the apparatus arranged for manual or semiautomatic operation and Fig. 4 shows the same apparatus arranged for semiautomatic or full automatic operation with the master tape formed in an endless loop.

The keyboard consists of thirty keys arranged to be mechanically locked in operated position and magnetically released so that after a key has been depressed it will remain in that position until its function is completed when an answerback or satisfaction signal will operate a magnet to release it. In actual operation the operator will receive no impression of a sticking key for in fact the completion of the function is so fast that before the finger can be removed the key will be released. Fig. 6 shows the designation of the various keys. Six of these keys are known as the non-coded keys and will directly operate such relays as KP2, KI2, KH2 and KT2. The remainder of the keys operate through a translator and are known as the coded keys.

When it is desired to prepare a pair of tapes so that the device may later be set in automatic operation the operator will first depress the KI key which will result in the operation of relay KI2. This extends the K trunk or manual trunk (consisting of the five code conductors) to the I tape perforator so that the I tape may be perforated. At the same time the key KP may be operated in order to connect the keys directly to the printer for monitoring purposes so that each character perforated in the tape will be printed and the operator may see that his manipulation of the keyboard is correct. After the I tape has been completed the relays KP2 and KI2 may be released by an operation of the KU key which unlocks such relays.

When the operator has completed the preparation of the master tape, he will depress the KH key in order to operate the KH2 relay which connects the K trunk from the key-set to the H tape perforator whereby the H tape may be prepared in like manner to the I tape.

The two tapes having been prepared and adjusted, if necessary, in their respective transmitters at the beginning of their perforations the device is set into automatic operation by the actuation of the XT key. This results in the operation of relay XT2 thereby connecting the X (automatic) trunk to the translator. The I tape transmitter being normally in condition for operation will immediately start to transmit. It is usual to have the I tape placed in this transmitter so that the first few codes encountered will be blanks, that is, only the sprocket hole will be perforated therein so that none of the five code conductors of the X trunk will be grounded. The translator will respond to this condition by operating the SP relay which in operating will cause the transmitter to step along to the next code combination. Thus through the mutually controlled circuits responsive to the transmitter and the SP relay, the transmitter will automatically advance to the first code combination perforated in the I tape representing an operational instruction. It will be more fully explained hereinafter in illustration of a specific example of calculation that the first code to be transmitted will be that for A, an operational instruction equivalent to the depression of the key C in the complex computer. This causes the calculator to be conditioned to receive the first two factors (the real and the imaginary components of a complex number) and by multiplying them by one to store this value in the accumulator. These two factors (constituting the coefficient $a_1$) are then entered into the calculator by the operation of the I tape transmitter and as they are so entered will be printed by the printer. Next the I tape transmitter will transmit operational instructions to place the calculator in condition to add to the value now held in the accumulator the result of the next calculation. This is now characterized by the transmission of M by the I tape transmitter as a problem in multiplication. The multiplicand will be the two factors (a real and an imaginary component) constituting the value of the unknown $x_1$. Therefore the I tape transmitter will now transmit a series of four codes, SW, XH, HX and SWU which will cause the operation of relays XH2 and HX2. The relay XH2 will extend the automatic trunk X to the H tape perforator and the relay HX2 will render the H tape transmitter operative. The codes SW and SWU are for the purpose of rendering the translator responsive to the codes XH and HX instead of the numerical values 5 and 2 since XH and 5 for instance are on the same key. This is analogous to the operation of the Figures key on the printing telegraph keyboard so that upper case or certain figures may be printed instead of the character forming the principal designation of the key. The code SWU is equivalent in this respect to the operation of the Letters key which returns the keyboard to its normal use. In the present case it will be realized that following the operation of the HX2 and XH2 relays the H tape will be rendered active and since it will send numerical codes the translator circuit must be returned to normal so as to avoid mutilation of any of the signals. Therefore this group of codes SW, XH, HX, SWU must end with the code SWU before the I tape relinquishes control and hands it over to the H tape.

Now the two factors comprising the unknown $x_1$ are transmitted from the H tape to the translator and thence entered in the calculator and at the same time are perforated anew in the H tape, beyond or behind the perforations therein representing the initial coefficient $a_0$. At the end of this operation a code CXU is encountered in the H tape and this operates to release the relays HX2 and XH2 so that control is now relinquished by the H tape and shifted back to the I tape. With relay XH2 released the signals transmitted over the X trunk are not recorded in the H tape.

At this point the calculator has entered therein the F and G factors (the real and the imaginary components) of the unknown $x_1$. It is now necessary to enter the value of the initial coefficient $a_0$ which will consist of the factors D and E to start the calculator in action. Consequently the codes SW, HX, SWU are now transmitted by the I tape to cause the H tape transmitter to take up control and to transmit the two factors constituting this initial coefficient $a_0$. This will be followed by the code CXU which as before will return control to the I tape.

The I tape now transmits the codes for SW CX XH—SWU and will result in the operation of relays CX2 and HX2 and the entry of the equal sign in the calculator. The relay CXU connects the output of the calculator to the X trunk and the relay HX2 extends this trunk to the H tape perforator. The equal sign starts the calculator into operation providing the last factor entered therein contained less than eight digits (in which case calculation has already started). Now both the I tape transmitter and the H tape transmitter are disabled and further action awaits the publication of the result of the calculation by the calculator. In a problem in multiplication the = sign is printed and this when it is transmitted by the calculator acts as a signal to the H tape perforator to make a record of the solution which at the same time will be printed. The solution is regularly followed by the codes for carriage return and line feed and since the CR signal is the same as the CXU signal, the CX2 and HX2 relays will be released and the I tape transmitter will again go into operation. Lastly the code for ΣU will be transmitted and this by releasing the Σ relay will condition the calculator to clear the accumulator so that the next calculation will stand by itself and not be added to any previously stored values.

The calculated result just perforated in the H tape constitutes the value $\phi_1$ so that the H tape is now in a position to next transmit the values $x_1$ and $\varphi_0$.

Further operation is a repetition of the operation just described. These have constituted the calculations represented by the following $$a_1+x_1a_0=\phi_1$$

The following calculations will then be made in the same manner $$a_2+x_1\phi_1=\phi_2$$
$$a_3+x_1\phi_2=\phi_3$$

and so on for as many terms of the polynomial as it is desired to make the calculation, the last value obtained being the significant result.

Now if it is desired to have a plurality of such calculations made the values $x_2a_0$, $x_3a_0$, $x_4a_0$ and so forth will have been perforated in the H tape at proper intervals and the corresponding results will be calculated and recorded by the printer.

Fig. 14 shows a page printed by the printer comprising the complete calculation of five results using by way of example five values of the unknown.

Now it is to be noted that the calculator here chosen to be shown as an example is the complex computer of my previously filed application. This invention, however, is not limited to the use of this particular device but any other calculator may be employed. Nor is the invention limited to calculation in complex numbers. Calculation in real numbers alone may be accomplished on the present device by the simple expedient of writing 5, for instance, as $5+i_0$ though if the device is to be employed for other calculations where no complex numbers are involved it would be more expedient to use a simpler calculator than that represented by Fig. 3.

The general operation of the calculator may be followed from the schematic circuit diagram and flow chart of Fig. 3. This is exactly the same as that shown in my previously filed application with the exception that the keyboard there is replaced by the translator (of Fig. 2) here. The present translator is a device for translating coded signals from the keys and the tape transmitters of Figs. 2 and 4 into the same sort of signals as those transmitted from the keys of the original complex computer. The problem to be solved by the calculator is entered into the factor registers through the translator in response to either the operation of the presently shown keys or either of the two tape transmitters. The translator operates through the progress circuit to register the factor values in the F, G, D and E registers. Each of these registers transmits the values registered therein in code to the printing cross bar switch which by certain auxiliary circuits, here designated the printing control circuit, controls the printer to record the problem as it is being registered in the factor registers. Certain of the signals also affect the control circuit so that the different operations called for by the different algebraic operations will be performed in the proper sequence.

The values registered in the F, G, D and E registers likewise appear in code in the multiplier digit switch and variously, under control of the factor entry shifting means, the values registered in the F and G registers and certain derived values ($F^2+G^2$) appear in the real and the imaginary column shift switches. The heart of the calculator is in the summing means comprising generally of a set of augend relays, a set of addend relays and a set of summing relays. All calculation is reduced to a series of summing operations in which the addend relays are operated in accordance with the values entered in the column shift switches and the values expressed by these addend relays are added to the values accumulated and expressed by the augend relays, the sum being registered on the sum relays. At the completion of this summing operation the sum now registered on the sum relays is translated and transferred to the augend relays (which act as an accumulator) ready for a new summing operation. The final results of any calculation are transferred to the printing cross bar switch whereupon the printer is operated to record the sum, the product, the quotient or the remainder as the case may be.

It has been said above that all calculations are reduced to a series of summing operations and while this is true, a better picture may be given by saying that all calculations are the result of a counted number of summing operations. Thus the multiplication of two numbers is the addition of one of the numbers to a gradually accumulating value a counted number of times, the count being controlled by the other number. Even in addition a first number is added to a second number which has been accumulated by counting this operation one time.

An important feature of the calculator is the counting circuit set in accordance with the values registered on the multiplier digit switches. This counting circuit is used in every calculating operation since it is the means which controls the cycle of operations of the summing relays.

It will be seen that the calculator consists of the combination of computing means and control means for shifting factors for entry into the calculating means whereby a large number of separate calculations are automatically made according to a predetermined sequence and a predetermined pattern, the final result being a gradually accumulated value derived from a great number of simple summing operations. The control circuit is in effect a steering means for it controls the sequence and the pattern of operations, operating the factor entry shifting means at the proper times so that the addend relays are fed the proper values in the proper sequence.

Sequence of operations—multiplication

As soon as the first three factors (of eight digits each) are properly entered on the F, G and D registers and while the E factor is being registered or even if it is not registered, the computing control circuit directs the multiplication of the factor F by the factor D in the real summing relays and the multiplication of the factor G by the factor D in the imaginary relays. As it will appear hereinafter, as the digits of the various factors are entered on the F, G, D and E entry registers, these values simultaneously appear on the Multiplying Digit Selector Switches and on the Printing Switch. The digits of the F factor also appear on the Real Column Shift Switch and the digits of the G factor appear on the Imaginary Column Shift Switch. Each digit and each algebraic symbol registered on the Entry Switches as it simultaneously appears on the Printing Switch is printed on the Printer before the Operator.

When the registration of the D factor is completed so that its appearance in the Multiplying Digit Selector is complete then the values registered in the Column Shift Switches are added together the number of times indicated by the values registered in the D multiplier switch. The sequence of this operation is to first add to zero (or to any value which may have been left in the augend relays) the value registered in the lowest level of the Column Shift Switch, repeatedly the number of times indicated by the first digit of the D factor. At the completion of this operation, in a manner to be more fully described hereinafter, the value registered in the next higher level of the Column Shift Switch is added, to the now accumulating values in the augend relays, repeatedly the number of times indicated by the next digit of the D factor.

When the F factor and the G factor have been thus completely multiplied by the D factor then the connections between the Real Column Shift Switch and the F Entry Register and the Imaginary Coumn Shift Switch and the G Entry Register are reversed so that the Real Column Shift Switch will now have a record of the values of factor G and the Imaginary Column Shift will now have a record of the values of factor F. When this reversal has been made the record of the factor E (if it has been completely registered by now or if not as soon as it has been so registered) is employed as a multiplier. Thereupon the accumulation in the augend relays is changed step by step until the factors G and F are now completely multiplied by the factor E. This completes the calculation.

Thereupon the record registered on the augend relays is transferred to the printing switch and the solution of the problem is printed before the operator.

Sequence of operations—division

In the operations of division the calculating operations begin earlier than in the operations of multiplication since the first value to be determined is the sum of the squares of the values of F and G. Therefore, as soon as the F and G factors are both completely registered the F factor will appear on both the F multiplier vertical of the Multiplying Digit Selector Switch and on the Real Column Shift Switch. Any accumulation on the real augend relays is automatically removed so that the value of $F^2$ will not be mutilated. Thereupon F is multiplied by F as before. When this has been completed the F factor is removed from the Real Column Shift Switch and the value of G is placed thereon. Now with the value of G also appearing on the Multiplying Digit Switch, the multiplication of G by itself proceeds step by step and the record on the augend relays is gradually increased. At the end of this operation the values of $F^2+G^2$ on the augend relays is transferred to a special set of storage relays for use at a later stage. The augend relays are cleared and returned to a zero reading in preparation for the determination of the real factor $FD+GE$.

Now the same operations as heretofore carried out in the problem of multiplication are repeated until the real augend relays have the value of $FD+GE$ and the imaginary augend relays have the value of $-GD+FE$.

Thereafter the value of $F^2+G^2$ is transferred to the Real Column Shift Switch and subtracted (its complement is added) step by step from the value on the augend relays until this value is exhausted. As each digit of the quotient is thus determined it is transmitted to the Printing Switch and such value is printed. No other record of the digits of the quotient is made.

When the eight digits of the real factor of the quotient have been determined then the value of $(F^2+G^2)$ which also appears in the Imaginary Column Shift Switch is used to diminish the value of the imaginary factor now recorded in the augend relays and the digits of the quotient are determined and recorded by the printer one by one.

In both multiplication and division, when the last digit of the product or the quotient has been printed the apparatus is released and the record on the F, G, D and E Entry Switches as well as elsewhere is thus automatically erased.

With the Σ relay normal each problem will be solved separately. With the Σ relay operated the final result of a problem in multiplication will be left recorded on the augend relays and another problem in multiplication, addition or subtraction will be solved and the result added thereto. A quotient cannot be determined and added to a previous accumulation for reasons stated hereinbefore.

*Sequence of operations—addition or subtraction*

Addition and subtraction will both be treated under one heading since the operations are exactly the same. In addition the signs of the factors are recorded as they appear in the problem but in subtraction the signs of the subtrahend are reversed.

The operation consists in first depressing the key A (for cumulative) and then entering the F and G factors (as heretofore) followed by the equal sign. The actual operation then is one of multiplication—as $$(F+iG) \times (1+i0) = F+iG$$

The complex number $(F+iG)$ entered is thereby multiplied by one and stored in the augend relays.

Thereafter the number to be added is entered in the same manner so that it in turn is multiplied by one and then added to the value stored in the augend relays—the result that is printed being the sum (or the remainder) desired to be found. As many numbers as desired may thus be added together.

*Code representation of numbers*

The code representation of numbers and operational instructions within the calculator will not be explained in detail here since it is treated comprehensively in my previously fild application and is of no particular interest here.

However the codes used herein should be noted. These are of two varieties, one, the five place permutation codes used to operate the translator from the keys and from the tape transmitters and two, the five place codes transmitted from the printing cross bar switch to operate the printer and the H tape perforator. The codes in each case are the same, that is, they may be represented by + and — symbols representing in one case grounded and non-grounded wires respectively and in another case what in the printing telegraph art are spoken of as mark and space signals respectively. These codes are shown in the following table and represent the codes sent from the keys, the codes sent from the tape transmitters and the codes sent from the printing cross bar switch to the printer and to the perforator. The codes for operating the printer are sent in the form of sequential impulses, and the codes sent from the printing switch to the perforator, from the tape transmitters and from the keys are in the form of the simultaneous grounding of one or more of the five conductors of the manual or the automatic trunks. All however may be represented in the same manner, as follows:

TABLE 1

| Codes transmitted from— | | Codes | | | | | Codes transmitted from calculator |
|---|---|---|---|---|---|---|---|
| Keyboard and master tape | Aux. tape | | | | | | |
| 0 | 0 | − | − | + | + | − | 0 |
| 1−CX | 1 | − | − | − | − | + | 1 |
| 2−HX | 2 | − | − | − | + | + | 2 |
| 3−XU | 3 | − | − | + | − | + | 3 |
| 4−XI | 4 | − | − | + | + | + | 4 |
| 5−XH | 5 | + | − | − | − | − | 5 |
| 6 | 6 | + | − | − | + | − | 6 |
| 7 | 7 | + | − | + | − | − | 7 |
| 8 | 8 | + | − | + | + | − | 8 |
| 9 | 9 | + | − | − | − | + | 9 |
| +. | +. | − | + | + | + | − | |
| −. | −. | − | + | − | − | + | |
| +i. | +i. | − | + | − | + | + | |
| −i. | −i. | − | + | + | − | + | + |
| | +. | − | + | + | − | − | − |
| | −. | − | + | + | + | + | +i |
| | +i | − | + | + | + | + | −i |
| | −i | − | + | − | − | − | = |
| = | | + | + | + | − | − | X |
| M | | + | + | − | − | + | Y |
| D | | + | + | − | + | − | . |
| A | | + | + | − | + | + | |
| SW | | + | + | + | + | − | |
| SWU | | + | + | + | − | + | + |
| Σ | | − | + | − | + | + | L/P |
| ΣU | | − | + | − | − | − | CR |
| CXU | CXU | − | − | − | + | − | SP |
| | SP | − | − | + | − | − | |
| E | Step | + | − | + | + | + | |
| | | − | − | − | − | − | |

Fig. 5 shows a part of the master tape actually perforated with the codes detailed hereinafter and which may be checked by means of the codes given in Table 1. The places are counted from the top downward, the first and second places being above the line of the smaller sprocket holes and the third, fourth and fifth places being below this line. This is a tape perforated in the manner common in the printing telegraph art.

Fig. 6 shows the arrangement of the keys. The top row contains the numerical keys 0 to 9, inclusive. The second row contains the mathematical signs +. —. +*i*. —*i*. and =. It also contains three keys marked M, D and A standing for multiply, divide and add, respectively.

Next there is a key marked Σ which transmits an instruction through the translator which will put the calculator in condition so that the result of any calculation will be held in the augend relays and to which the result of another calculation will be added. Directly below this key in a third row is a key marked ΣU whose function is to unlock the condition established by the Σ key. The last key in the second row is marked SW meaning switching whose function it is to cause a change in the translator circuit so that when certain of the numerical keys are depressed they will cause a different action. For instance, the numerical key 1 is also marked CX. The function of this key after the key SW has been operated is to prepare for the operation of the CX2 relay which will connect the output of the calculator to the X trunk. Similarly numerical key 2 is also marked HX and this when depressed after the operation of the SW key will cause the operation of relay HX1 which, as indicated in Fig. 2, will switch the transmitters so that the H tape transmitter becomes operative in place of the normally operative I tape transmitter. The numerical key 3 is marked XU and the function of this is to unlock any of the relays affecting the X trunk thereby clearing the X trunk from connection to the I tape perforator and the translator. The numerical key 4 is marked XI and its function is to connect the X trunk to the I tape perforator. The numerical key 5 is marked XH and its function is to connect the H tape perforator to the X trunk.

Below the SW key there is in the third row a key marked SWU. The function of this key is to unlock the relay SW and restore the numerical keys to their normal function. The third key from the right in the lower row is marked CXU and the function of this key is to disconnect the output of the calculator from the X trunk. The fourth key from the right in the lower row is marked E for error. This key when depressed will operate the main release relay in the calculator and restore all of the circuits to normal.

The other six keys in the lower row are known as the uncoded keys. Their function is to operate corresponding relays directly. Counting from the left, the first key marked KI will operate the KI relay to connect the K trunk to the I tape perforator so that the perforator may be operated directly by the key-set. Likewise the next key marked KH will connect the key-set through the K trunk to the H tape perforator. The key marked XT will connect the X trunk to the translator and start the automatic operation of the device. The key marked KT will connect the K trunk to the translator so that the device may be operated on a purely manual basis from the keyboard. The key marked KP connects the K trunk to the printer so that the printer may be directly operated from the keyboard. This is useful as hereinbefore indicated for monitoring purposes so that the printer may be used while perforating a tape to make a record of the keys depressed. The key KU operates the KU relay which controls the master ground to the circuit of Figs. 16 to 26 thus returning this circuit to normal. By the operation of this key these circuits may be restored without affecting any of the registrations established within the calculator.

Figure 7:
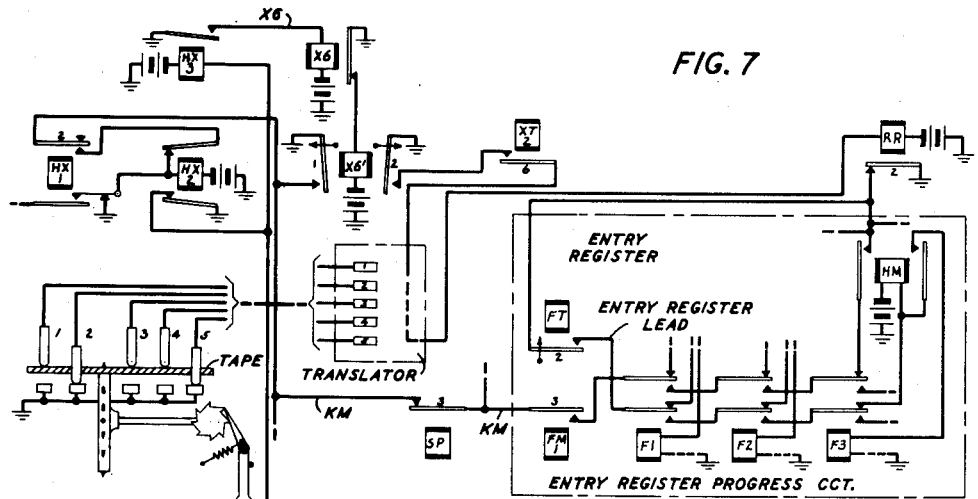
Fig. 7 is a schematic circuit diagram showing the automatic operation of the tape transmitter through the return of an answer-back signal after the operation of some apparatus in response to a transmitter operation.

Fig. 7 is a schematic circuit diagram to illustrate and explain the automatic action of the transmitters. Each such transmitter is provided with a set of five sensing fingers which will normally push through perforations in the tape or be prevented from doing so to set up a code combination of operated translator relays. Normally, therefore, when the translator is not in use these fingers are drawn away from the tape by the operation of the magnet controlled by the relay HX2. When in a manner to be described hereinafter the H tape transmitter is to be placed in operation the relay HX2 will be released. Prior to relay HX2 being released relay X6 is in released position so that its companion relay X6' is operated. With relay HX2 operated the H transmitter magnet 2211 is also operated which holds the tape sensing fingers retracted and out of contact with the tape. When it is desired to employ the H transmitter to control the computer, relay HX1 is operated which interrupts the holding circuit for maintaining relay HX2 operated. Relay HX1 in operating transfers the winding of relay HX2 to a stepping circuit so that relay HX2 releases and in turn releases a stepping magnet of the H transmitter 2211 allowing this magnet to release and in turn release the sensing fingers so that they will sense the perforations in the tape. When a perforation in the tape is positioned in the path of one of these fingers the corresponding contact is closed. When the perforation in the tape is not so positioned the corresponding contact remains open. When it is desired to advance the tape the relay HX2 is operated which in turn causes the magnet 2211 of the H transmitter to be reoperated. The operation of this magnet causes the tape sensing pins or fingers to be withdrawn from the tape and the tape advanced. The withdrawal of these fingers from the tape causes the previously closed contacts controlled by them to open and when the circuits have advanced a locking circuit for relay HX2 is interrupted thus allowing this relay to release and again permit the sensing fingers to sense the next row of perforations in the tape. The above operation then continues so long as it is desired to employ the H transmitter to enter numbers into the calculator. When it is desired to interrupt the operation of the H transmitter, relay HX1 is released which relay completes an obvious circuit for the operation of relay HX2. Relay HX2 in turn causes magnet 2211 of the H transmitter to be maintained operated, thus maintaining the H transmitter inactive with sensing pins retracted from the tape and the contacts controlled by these pins are held open.

Figure 8:
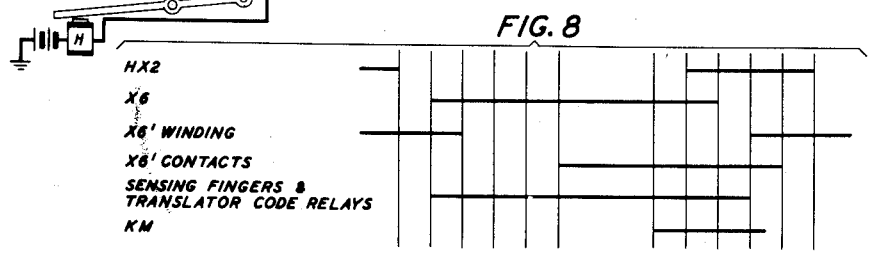
Fig. 8 is a time sequence chart showing the operation of the circuit of Fig. 7 and explaining the function of a time delay circuit used therein.

Fig. 8 is a time sequence chart which will help to make this action clear. Thus the chart shows the release of relay HX2 being followed a short interval thereafter by the energization of relay X6 and practically simultaneously therewith by the selection of the entry register lead. A short interval after the energization of relay X6 the winding of relay X6' is opened and X6' is free to retract its armatures. However, this relay is arranged to be slow to release and fast to operate so there is a slight delay after the opening of the winding of relay X6' and the closing of its back contacts, this delay being provided to make sure that the translator relays have been properly operated and to insure that when the ground is applied to the selected entry register lead it will be applied to such a lead which has been firmly established. Now the circuit conditions established will be maintained until an answer-back or satisfaction signal is received over the KM lead. Thus time is given for the proper operation of the entry register for it is not until a proper operation therein has taken place that a ground will appear on lead KM. Thus a ground on the entry register lead will be chained through the armatures and front contacts of the previously operated progress relays F1 and F2, by way of example, and finally cause the operation of a hold magnet HM. Magnet HM extends the ground for its own operation to the progress relay F3 but since this relay has a ground connection it will not operate at present. Magnet HM also places a ground on lead KM which now causes the operation of relay HX2. This in a short interval will operate and lock to the release relay X6' contacts so that relay HX2 may be held operated until the action caused by this operation has been assured. Thus as a result of the answer-back signal over lead KM the entry register lead is opened and now magnet KM is left in a circuit in series with relay F3 so that at this point relay F3 operates and magnet HM is maintained operated. The operation of relay F3 terminates the answer-back signal over lead KM. Shortly after the contacts of X6' have again become operated and barring the closure of some other circuit for maintaining HX2 operated, this relay will release and thus initiate a new cycle of operations. Throughout the detailed description it will be noted that there are several ways in which the answer-back signal may be applied to the KM lead.

Figure 9:
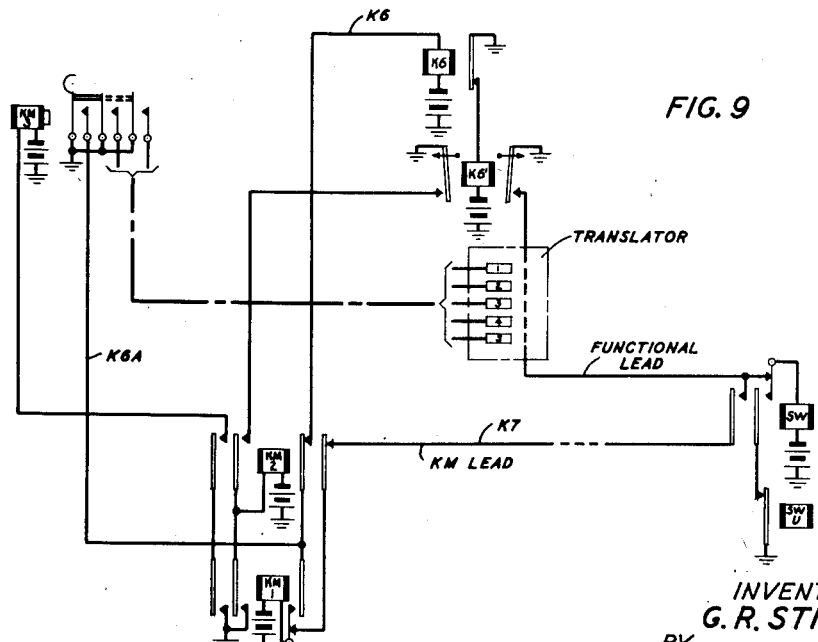
Fig. 9 is a schematic circuit diagram similar to that of Fig. 7, showing a similar mode and sequence of operations after a coded key of Fig. 6 has been operated.

Another example of this operation may be seen by consideration of the operations of the key release circuit shown in Fig. 9. Here when any one of the coded keys is operated the lead K6A is grounded and this grounding is extended through a back contact of relay KM2 to the winding of relay K6. Relay K6 operates and releases relay K6' which places a ground on the lead to the translator. However, relay K6' is slow to release so that this ground cannot become effective until the translator relays have been firmly operated by the operated coded key. Thereafter and whether the lead outgoing from the translator is an entry register lead or some functional lead such as that to operate relay SW nothing else will happen until the answer-back signal is applied to the KM lead here also designated KT. When this occurs as through the operation of relay SW, relay KM1 is operated and locks to the ground provided by the operated key over lead K6A. Relay KM2 operates from relay KM1 and locks to the released contact of relay K6'. At the same time a circuit is established through the contacts of relay KM1 and relay KM2 to operate the key release magnet KM3. This releases the key and restores the circuit to normal condition leaving the operated relay SW locked to a back contact of its continuation relay SWU.

Figure 10:
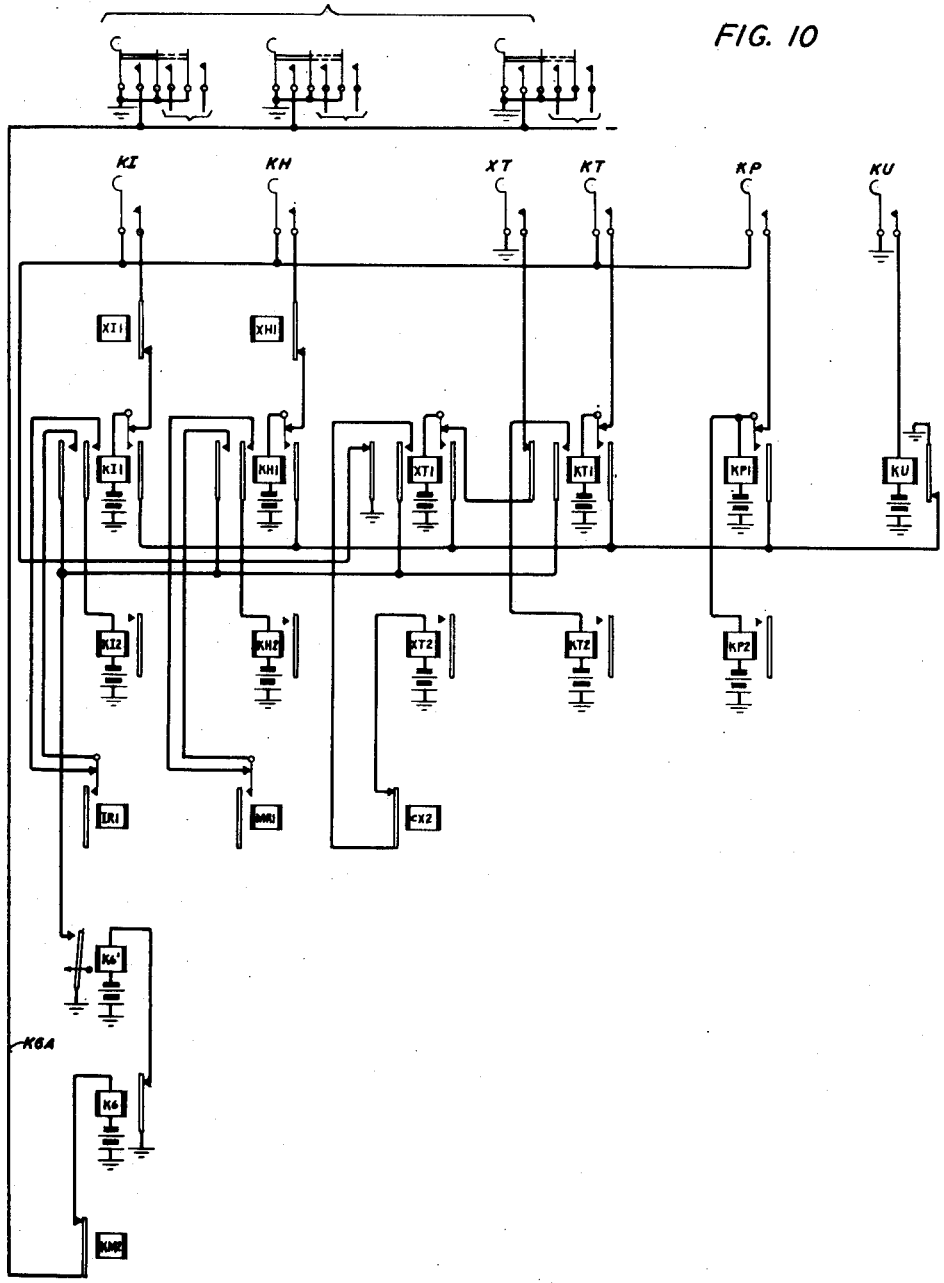
Fig. 10 is a schematic circuit diagram showing the functions of certain uncoded keys in the group of Fig. 6 and indicating the operation of the coded keys.

Fig. 10 is a schematic circuit diagram indicating the manner in which the uncoded keys operate. This figure is provided to make the operation of certain relays easily understood without the necessity for tracing through complicated circuits.

Thus key KI in operating extends a circuit from a back contact controlled by relay XT1 through a back contact controlled by relay XI1 to a continuity contact controlled by the relay KI1. Relay KI1 will operate and lock to a master ground controlled by the relay KU providing that neither one of the relays XI1 nor XT1 is operated at this time. Similarly, key KH will control the relay KH1 providing the interlocking circuit relays XH1 and XT1 are in normal condition. The key XT operates through a back contact controlled by relay KT1 to cause the operation of relay XT1. It will thus appear that if the relay KT1 is operated the relay XT1 cannot become operated. The relay KT1 is operated directly from the key KT over the ground circuit provided by the relay XT1 so that here again the KT key will be ineffective to operate relay KT1 if the relay XT1 is in operation. This interlocking circuit is provided so that the translator cannot be connected simultaneously to the K and X trunks.

The relay KP1 is operated by the relay KP provided the relay XT1 is normal. All of these relays lock to the master ground provided by the relay KU so that when the key KU is operated the relay KU will respond and release any one of the relays locked thereto.

Figure 11:
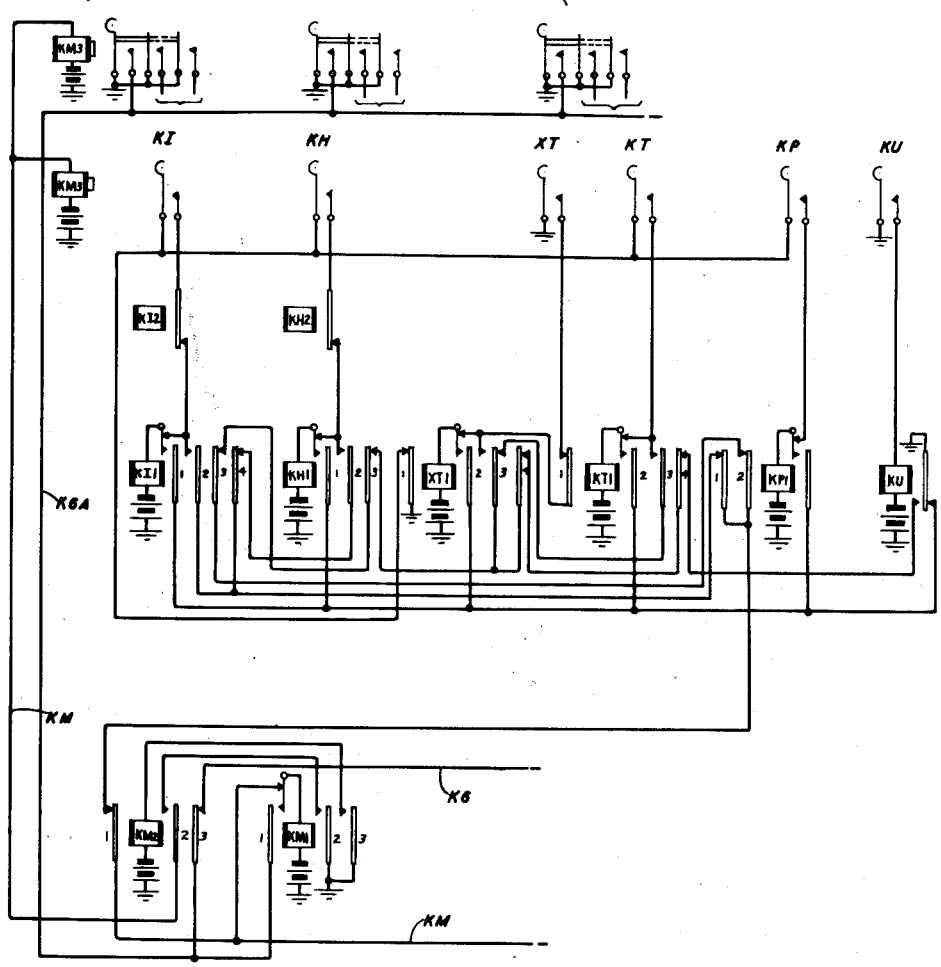
Fig. 11 is a schematic circuit diagram similar to that of Fig. 10 but showing the answer-back or satisfaction signaling means whereby the keys are released as soon as their function is completed.

Each one of the relays designated with a 1 such as KI1 is in the nature of a preparation, the actual function being carried out by a companion relay having the numeral 2, such as relay KI2. Thus after relay KI1 has been operated by the key KI the relay KI2 is included in a circuit controlled by the left-hand contacts of relay KI1 and extending to the back contact of the slow release relay K6'. In Fig. 11 it will be shown that the relay K6' will be released after the operation of any one of the uncoded keys so that upon the operation of relay KI1 a ground will be momentarily established to the winding of relay KI2 at the same time that the KM lead is operated to release the depressed key. The relay KI2 it will be noted is in an interlocking circuit controlled by relay IR1. Likewise relay KH2 is in an interlocking circuit controlled by relay MR1 and relay XT2 is in an interlocking circuit controlled by relay CX2.

Fig. 11 indicates the manner in which the uncoded and coded keys are released through the application of a ground to the KM lead. Thus key KH when operated causes the operation of relay KI1. The ground extended to the winding of relay KI1 through the operation of this relay will now be extended over the front contact and armature of relay KI1, the back contact and armature 1 of relay KP1, the back contact and armature 1 of relay KM2, the normal contacts and armature 1 of relay KM1 to the winding of relay KM1. Relay KM1 causes the operation of relay KM2 and at the same time establishes a circuit from ground and armature of relay KM1, from contact and armature 2 of relay KM2 to lead KM thereby operating the key release magnets KM3.

In like manner when any one of the coded keys is operated ground is placed on the lead K6A and as indicated in Fig. 10 will extend through a back contact of relay KM2 to relay K6 thereby operating this relay and releasing the relay K6'. Relay K6' as indicated also in Fig. 9 will operate through the translator to render the code set up by this coded key effective when the answer-back signal is sent over lead KM. The relay KM1 is operated and thus the extension of this lead to the key release magnet KM3 is grounded.

It may be noted that when the uncoded key KU is depressed the circuit for the operation of the key release magnet KM3 depends upon a chain extending through the contacts of relays controlled by all the other uncoded keys. This is to insure that the operation of the KU relay has been effective in releasing all these other relays to normal. Thus when key KU is operating and the master ground relay KU has responded, the ground at its back contact causes the release of all the other relays such as KI1, KH1, XT1, KT1 and KP1. Thereupon a circuit is established from ground, the armature and front contact of relay KU, the back contact and armature 4 of relay KT1, the back contact and armature 4 of relay XT1, the back contact and armature 3 of relay KH1, the back contact and armature 3 of relay KI1, the back contact and armature 2 of relay KP1 and thence through the back contact and armature of relay KM2 to operate relay KM1 resulting finally in the application of ground to the KM lead extending to the key release magnets KM3.

Fig. 12 is a schematic circuit diagram intended to render the operation of the complete circuit clearer. This circuit illustrates the circuit changes brought about by the transmission of the codes SW, XH, HX and SWU in sequence from the I tape or from the key-set. At the left and within the large circle is indicated a key marked SW and below it the sensing fingers of a transmitter with the fingers 1, 2, 4 and 5 extending through the tape and the finger 3 being prevented from movement in that direction by the tape. This indicates that either the key or a tape transmitter may send into the translator the code SW. This code will set up the five translator relays and place a ground on the conductor leading to the relay SW. This relay will thereupon be operated.

Next the code XH will be sent. Here the means for sending this code is indicated by a small circle having the designation XH drawn therein and represents the same sort of arrangement as that for sending the code SW. Therefore at this time a ground will be applied through the proper operation of the translator to a conductor leading to the front contact and armature 5 of relay SW thence extending to the XHP (P for preparation) relay. This relay XHP is now operated. In like manner the code HX is now sent and this places a ground on the conductor extending through the front contact and armature 7 of relay SW thence over the armature and back contact of relay CXP to the winding of relay HXP whereby relay HXP becomes operated if relay CXP is in normal condition. Thereafter the code SWU is transmitted and this operating through the translator causes the operation of relay SWU. Relay SWU now through the movement of its armature 2 opens the holding ground for relay SW and causes this relay to release. Thereupon the ground extending from the translator to the winding of relay SWU is extended over the front contact and armature 1 of relay SWU, the back contact and armature 1 of relay SW, the armature 1 and front contact of relay XHP, the normal contacts of armature 3 of relay XHW, the winding of relay XHW to ground. This ground is also extended through the armature and back contact of relay XH1 so that relay XH1 is held short-circuited as long as the ground is applied to the winding of relay SWU. The ground extended over the armature 1 and front contact of relay XHP is now also extended over the front contact and armature 2 of relay XHW, the normal contacts of relay XI1, the armature 1 and front contact of relay HXP to the winding of relay HXW. Thus relays XHW and HXW (W for waiting) are both operated and both locked to ground supplied through the back contacts of relays CXU. Now in a manner hereinbefore noted the operation of relay SWU will be followed by the operation of the key release magnet or the transmitter release relay and the ground extended to the winding of relay SWU will be removed. Thereupon the short circuit about the windings of relays HX1 and XH1 will be removed and these relays will become operated in parallel with their companion waiting relays.

It will appear hereinafter that the code combination SW, XH, HX and SWU is one frequently used and transmitted from the master tape. This particular combination is designed to cause the connection of the H tape perforator to the X trunk and the H tape transmitter also to the X trunk for the purpose of transmitting a numerical factor previously perforated in the H tape to the calculator and at the same time perforating this same numerical value again in the H tape. Thus these code combinations sent by the I tape will cause the operation of the relays as above described and become fully effective upon the release of the I tape sensing fingers from the code SWU to render the I tape transmitter thereafter ineffective and the H tape transmitter effective until some further instruction has been received. This further instruction will come from the H tape at the end of its numerical transmission.

Fig. 13 is a similar schematic circuit diagram and shows the circuit changes which take place upon the transmission of the codes SW, CX, XH, SWU from the I tape and later the transmission of the code for = from the calculator. In the manner now familiar the code SW will operate the relay SW thereupon the code CX through armature 8 of relay SW will extend the ground through armature 2 of relay HXP to operate relay CXP. Following this through armature 5 of relay SW a circuit will be established to operate relay XHP. Now upon the transmission of the code SWU relay SWU will operate and by releasing relay SW will extend the ground over the back contact of armature 1 of relay SW to armature 1 of relay XHP causing the operation of the waiting relay XHW. This ground will also be extended over the front contact and armature 2 of relay XHW, the contacts controlled by relay XI1, the armature 1 and back contact of relay HXP, the armature 1 and front contact or relay CXP to cause the operation of relay CXW. The operation of relay SWU causes the sending of the answer-back or satisfaction signal which will result in the release of the key SWU or the transmitter sending this code combination whereupon ground for the operation of SWU will be released and this ground, in the manner hereinbefore described, will allow the operation of relay XH1 and relay CX1. If this series of code combinations has been sent by the I tape then the I tape transmitter will be taken out of service by the operation of relay CX1 in the manner to be more fully described hereinafter and the circuit will await the sending of the code for = by the calculator. It will appear hereinafter that this combination of codes is transmitted immediately following the entry in the calculator of a problem in multiplication. Actually the calculator may be in process of operation during the sending of these codes but it cannot complete its calculation before these four codes have been transmitted and have become effective. It will appear that shortly after the operations just described, the calculator will reach that point in its operation where the code for = is transmitted. Thereupon a ground will be extended as indicated in Fig. 13 from the printer control circuit and thence over the front contact and armature 1 of relay CX1 to cause the operation of CXW2. As this code completes its function then the short circuit about the winding of relay CX2 will be removed and relay CX2 will operate. At this time therefore the output of the calculator will be connected to the X trunk so that the next series of codes sent to the printer will also be perforated in the H tape.

Fig. 14 is a reproduction of a page produced by the printer. It will hereinafter appear that none of the figures in what may generally be termed the first four columns are perforated in the tapes but only those figures following the = sign and appearing in the fifth and the sixth columns. The printer therefore reproduces the entry of the problem but only causes the perforation in the tape of the final result. The actual figures in this Fig. 14 will be more fully explained hereinafter.

By way of example:

In order to illustrate the use of the present invention by a concrete example we may consider a solution of the hypergeometric series usually denoted $F(a, b; c, z)$. This may be written as $$1 + \frac{a \cdot b}{1 \cdot c} z + \frac{a(a+1)b(b+1)}{1 \cdot 2 \cdot c(c+1)} z^2 + \frac{a(a+1)(a+2)b(b+1)(b+2)}{1 \cdot 2 \cdot 3 c(c+1)(c+2)} z^3 \ldots$$

$a$, $b$, $c$ and $z$ may be complex numbers and the series may be written as $$a_0 + a_1 z + a_2 z^2 + a_3 z^3$$

where $$\alpha_0 = 1$$

$$\alpha_1 = \frac{a \cdot b}{c}$$

$$\alpha_2 = \alpha_1 \frac{(a+1)(b+1)}{2(c+1)}$$

$$\alpha_3 = \alpha_2 \frac{(a+2)(b+2)}{3(c+2)}$$

$$\alpha_4 = \alpha_3 \frac{(a+3)(b+3)}{4(c+3)}$$

As an illustrative example let us assume the following values:

$a = 2 + i3$    $b = 4 + i5$    $c = 6 + i7$
$a+1 = 3 + i3$    $b+1 = 5 + i5$    $c+1 = 7 + i7$
$a+2 = 4 + i3$    $b+2 = 6 + i5$    $c+2 = 8 + i7$
$a+3 = 5 + i3$    $b+3 = 7 + i5$    $c+3 = 9 + i7$

Calculation will show the coefficients to be as follows:

$a_0 = 1$
$a_1 = +1.31764709 + i2.12941189$
$a_2 = -0.86974999 + i3.69327999$
$a_3 = -3.49279060 + i3.06406779$
$a_4 = -4.98641440 + i1.11757200$

By way of example the first four terms of this series may then be calculated for values of $z$ from $z = 0 + i2$ to $9 + i2$ and the following table of values derived:

$0 + i2 -\ \ 35.372 - i\ 31.181$
$1 + i2 -\ \ 44.746 - i\ 67.414$
$2 + i2 -\ 166.799 - i\ 19.685$
$3 + i2 -\ 299.072 + i\ 172.801$
$4 + i2 -\ 372.920 + i\ 750.815$
$5 + i2 -\ 296.438 + i1235.133$
$6 + i2 +\ \ 46.281 + i2226.533$
$7 + i2 +\ 795.144 + i3605.789$
$8 + i2 + 2114.052 + i5433.682$
$9 + i2 + 4190.917 + i7770.984$

The calculation of five of these values is shown in Fig. 14, the results being the fourth, eighth, twelfth, sixteenth and twentieth values in the two right-hand columns of figures.

In order to prepare the device for making this calculation a master tape and an auxiliary tape are perforated and then the device is set into automatic operation.

The complete sequence of key operations for preparing the two tapes is as follows. For a complete explanation this is detailed in four columns, the first giving the operation number as counted by the operator, the second giving the designation of the key which is depressed, the third giving the designation of the code perforated in the tape and the last giving a short explanation of the function (that is the effect which such perforated code will produce when the tape is used in automatic calculation).

The preparation of the I tape may be preceded by the operation of the stepping key which operates the IR trip magnet to cause the I tape to issue from its perforator with only the sprocket holes punched. When the operator deems a sufficient length of tape thus prepared the STP key will be released and the following keys depressed in order:

| Operation number | Key depressed | Code perforated | Function |
|---|---|---|---|
| 1 | KI | | Causes operation of relay KI2 resulting in connection of I tape perforator to key set. |
| 2 | A | A | Equivalent to depression of key C of complex computer which conditions the calculator to accumulate a real and an imaginary component on the augend relays. This and the operations to and including operation number 20 enters the coefficient $\alpha_1$ into the calculator. |
| 3 | +. | +. | |
| 4 | 0 | 0 | |
| 5 | 1 | 1 | |
| 6 | 3 | 3 | |
| 7 | 1 | 1 | |
| 8 | 7 | 7 | |
| 9 | 6 | 6 | |
| 10 | 4 | 4 | |
| 11 | 7 | 7 | |
| 12 | +i. | +i. | |
| 13 | 0 | 0 | |
| 14 | 2 | 2 | |
| 15 | 1 | 1 | |
| 16 | 2 | 2 | |
| 17 | 9 | 9 | |
| 18 | 4 | 4 | |
| 19 | 1 | 1 | |
| 20 | 2 | 2 | |
| 21 | = | = | This operation is not actually necessary when 8 numerical keys have been depressed following the +i. (or the -i.) key for the purpose of starting the calculation but is useful at this point to stop the movement of the I tape transmitter. |
| 22 | Σ | Σ | Equivalent to operation of key NC of complex computer. Instructs device to add the result of the next calculation to the values now accumulated therein (namely the coefficient $\alpha_1$). |
| 23 | M | M | Operates the MR relay in the calculator to arrange the circuits for a problem in multiplication. |
| 24 | SW | SW | Operates the switching relay SW to prepare for a switching operation. |
| 25 | XH | XH | Operates relay XHP to prepare for the operation of relay XH2 which will connect the H tape perforator to the X trunk so that what is thereafter transmitted over the X trunk will be perforated in the H tape as well as transmitted to the calculator. |
| 26 | HX | HX | Operates relay HXP to prepare for the operation of relay HX2 which will substitute the H tape transmitter for the normally operative I tape transmitter. |
| 27 | SWU | SWU | Switching unlock. This operates relay SWU which unlocks relay SW which on release closes circuit for the waiting relays XHW and HXW. Upon release of relay SWU (or the fingers of the I tape transmitter under automatic operation) relays XH2 and HX2 operate to copy on the H tape the codes which will now be transmitted from the H tape. |

| Operation number | Key depressed | Code perforated | Function |
|---|---|---|---|
| 28 | SW | SW | Operates the switching relay SW, as before. |
| 29 | HX | HX | Operates relay HXP to prepare for the operation of relay HX2 which will substitute the H tape transmitter for the normally operative I tape transmitter. |
| 30 | SWU | SWU | Completes operation of relay HX2 by releasing relay SW. The release of relay SW also insures that the numerical codes now to be transmitted from the H tape will not be converted into operational signals. |
| 31 | SW | SW | Operates switching relay SW. |
| 32 | CX | CX | Operates relay CXP to prepare for operation of relay CX1 which in turn will watch for a predetermined signal from the calculator to place the H tape perforator under control of the calculator. |
| 33 | XH | XH | Operates relay XHP to prepare for operation of relay XH2 to place H tape perforator under control of X trunk. |
| 34 | = | = | The equal sign now signals the calculator to fill in the full 8 places of the last factor and proceed with the calculation) of X times $\alpha_0$ and the addition of this product to the value $\alpha_1$ now in the accumulator). |
| 35 | SWU | SWU | Releases relay SW and completes operation of relays CX1 and XH2. Upon the operation of relay CX1 the I tape transmitter is disabled so that transmission from the I tape cannot be resumed until the calculator output is disconnected from the X trunk. When the calculator has completely recorded the 4 factors F, G, D and E the code for (=) is transmitted and this results in operation of relay CX2 which connects output of calculator to X trunk so that the result as transmitted may be perforated in H tape. Relay XT2 is released during this operation to prevent the calculator output from reaching the translator relays. |
| 36 | ΣU | ΣU | This causes the unlocking of the Σ relay and is equivalent to operating the NC key of the complex computer to the position where the entry of a new problem will wipe out any accumulation heretofore made. |
| 37 | A | A | Operations 37 through and including operation 70 follow the same pattern as operations 2 to 36 inclusive with the exception that a new value (38 to 55 inclusive) representing coefficient $\alpha_2$ is substituted for the value (3 to 20 inclusive) representing coefficient $\alpha_1$. |
| 38 | −. | −. | |
| 39 | 0 | 0 | |
| 40 | 0 | 0 | |
| 41 | 0 | 0 | |
| 42 | 8 | 8 | |
| 43 | 6 | 6 | |
| 44 | 9 | 9 | |
| 45 | 7 | 7 | |
| 46 | 5 | 5 | |
| 47 | +i. | +i. | |
| 48 | 0 | 0 | |
| 49 | 0 | 0 | |
| 50 | 3 | 3 | |
| 51 | 6 | 6 | |
| 52 | 9 | 9 | |
| 53 | 3 | 3 | |
| 54 | 2 | 2 | |
| 55 | 8 | 8 | |
| 56 | = | = | |
| 57 | Σ | Σ | |
| 58 | M | M | |
| 59 | SW | SW | |
| 60 | XH | XH | |
| 61 | HX | HX | |
| 62 | SWU | SWU | |
| 63 | SW | SW | |
| 64 | HX | HX | |
| 65 | SWU | SWU | |
| 66 | SW | SW | |
| 67 | CX | CX | |
| 68 | XH | XH | |
| 69 | SWU | SWU | |
| 70 | ΣU | ΣU | |
| 71 | A | A | Operations 71 through and including operation 104 follow the same pattern as operations 2 to 36 inclusive with the exception that a new value (72 to 89 inclusive) representing coefficient $\alpha_3$ is substituted for the value (3 to 20 inclusive) representing coefficient $\alpha_1$. |
| 72 | −. | −. | |
| 73 | 0 | 0 | |
| 74 | 0 | 0 | |
| 75 | 0 | 0 | |
| 76 | 3 | 3 | |
| 77 | 4 | 4 | |
| 78 | 9 | 9 | |
| 79 | 2 | 2 | |
| 80 | 8 | 8 | |
| 81 | +i. | +i. | |

NOTE.—It is not necessary for the operator to record = on operation 69 since the output of the calculator always contains a full 8 digits (22A to 29A inclusive).

| Operation number | Key depressed | Code perforated | Function |
|---|---|---|---|
| 82 | 0 | 0 | |
| 83 | 0 | 0 | |
| 84 | 0 | 0 | |
| 85 | 3 | 3 | |
| 86 | 0 | 0 | |
| 87 | 6 | 6 | |
| 88 | 4 | 4 | |
| 89 | I | I | |
| 90 | = | = | |
| 91 | Σ | Σ | |
| 92 | M | M | |
| 93 | SW | SW | |
| 94 | XH | XH | |
| 95 | HX | HX | |
| 96 | SWU | SWU | |
| 97 | SW | SW | |
| 98 | HX | HX | |
| 99 | SWU | SWU | |
| 100 | SW | SW | |
| 101 | CX | CX | |
| 102 | XH | XH | |
| 103 | SWU | SWU | |
| 104 | ΣU | ΣU | Operations 105 through and including 136 follow the same pattern as operations 2 to 36, inclusive with the exception that a new value (105 to 123, inclusive) representing coefficient $\alpha_4$ is substituted for the value (3 to 20, inclusive) representing coefficient $\alpha_1$. |
| 105 | A | A | |
| 106 | −. | −. | |
| 107 | 0 | 0 | |
| 108 | 0 | 0 | |
| 109 | 0 | 0 | |
| 110 | 0 | 0 | |
| 111 | 4 | 4 | |
| 112 | 9 | 9 | |
| 113 | 8 | 8 | |
| 114 | 6 | 6 | |
| 115 | +i. | +i. | |
| 116 | 0 | 0 | |
| 117 | 0 | 0 | |
| 118 | 0 | 0 | |
| 119 | 0 | 0 | |
| 120 | 1 | 1 | |
| 121 | 1 | 1 | |
| 122 | 1 | 1 | |
| 123 | 8 | 8 | |
| 124 | = | = | |
| 125 | Σ | Σ | |
| 126 | M | M | |
| 127 | SW | SW | |
| 128 | HX | HX | Following this point it is not necessary to operate key XH since the value of the argument need not again be perforated in the H tape. |
| 129 | SWU | SWU | |
| 130 | SW | SW | |
| 131 | HX | HX | |
| 132 | SWU | SWU | |
| 133 | SW | SW | |
| 134 | CX | CX | Following this point it is not necessary to operate key XH since the final calculation need not be perforated in the H tape. |
| 135 | SWU | SWU | |
| 136 | ΣU | ΣU | |
| 137 | KU | | This unlocks the K12 relay and thereby breaks the connection between the manual keyboard and the I tape perforator. |

It may now be noted that the I tape has been completely perforated and may be formed into a closed loop running through the I tape transmitter alone. Alternately the I tape, now in the I tape transmitter with a number of steps to be taken before the code for operation 2 is encountered may be used to copy itself several times by the following operations.

| Operation number | Key depressed | Code perforated | Function |
|---|---|---|---|
| 136* | XU | XU | This releases I tape perforator from X trunk and operates signal EC. |
| 137* | KU | | |
| 138* | KT | | This connects K trunk to translator. |
| 139* | SW | | This operates relay SW. |
| 140* | XI | | This causes operation of relay XIP. On release of key XI relay XI1 is operated so that all the signals transmitted by the I tape transmitter are copied in the I tape by the I tape perforator, thus preparing a new master tape for a new evaluation of the polynomial with a new value of the argument. When the signal EC appears the operator may then perforate a new value of the unknown in the H tape and then repeat operations 133* to 138* inclusive. |
| 141* | KU | | Releases relay KT2. |
| 142* | XT | | |

Let it be assumed that the I tape is to be made into an endless loop. Operation 130 therefore ends the preparation of the I tape.

At this point the operator depresses the ST (stepping) key to cause the IR trip magnet to operate. This will cause the I tape to issue from the I tape perforator with only the sprocket perforations cut therein. When a sufficient measure of I tape is thus prepared the pressure on the ST key is released and the tape is now ready to be perforated again or to have its ends joined to form an endless loop. In a manner to be explained hereinafter the perforations in the I tape may be automatically repeated a number of times equivalent to the number of values of the argument (the unknown) which it is wished to compute. This will make the automatic operations strictly equivalent to the use of an endless loop. The operator now prepares the H tape by depressing the following keys in order.

| Operation number | Key depressed | Code perforated | Function |
| --- | --- | --- | --- |
| 137 | KH | | Operates the relay KH1 resulting in connection of the H tape perforator to the key set. |
| 138 | + | + | This and the operations to and including operation number 139 enters the particular value of the argument for which the solution is sought. |
| 139 | 3 | 3 | |
| 140 | $+i$ | $+i$ | Since these 2 factors constitute factors F and G in a problem in multiplication it is not necessary to record more than 1 digit of the factor G (i.2 herein) as the entry of the next sign will cause 7 ciphers to be automatically entered in the calculator. |
| 141 | 2 | 2 | |
| 142 | CXU | CXU | This will operate relay CXU which will result in the release of relays XH1 and HX1 thereby again rendering the I tape transmitter effective. |
| 143 | + | + | This and the operations to and including operation number 147 enters the coefficient $a_0$ (which equals 1 in the present illustrative example). Since this completely enters the factor in the calculator the operation of the calculator is now suspended pending the entry of either 7 more digits or the equal (=) sign. This delay is used to return the device to control of the I tape for the transmission of instructions to place the H tape perforator under control of the calculator output circuit. |
| 144 | 1 | 1 | |
| 145 | $+i$ | $+i$ | |
| 146 | 0 | 0 | |
| 147 | CXU | CXU | This operates relay CXU resulting in the release of relay HX1 so that the I tape transmitter is now rendered operative. |

It will be noted that in general on the completion of an SWU signal from the I tape as at the end of a group of signals such as SW, XH, HX, SWU or SW, HX, SWU, or SW, CX, XH, =, SWU, the control is shifted from the I tape to the H tape and where the signal CXU occurs in the H tape the control is shifted back to the I tape.

The following codes are perforated in the H tape, not by the operator in preparing the tape but by automatic operation. The only other perforations made by the operator will be new values of the argument and the coefficient $a_0$ as follows:

$$x_2 = 4 + i2 \qquad a_0 = 1 + i0$$
$$x_3 = 5 + i2 \qquad a_0 = 1 + i0$$
$$x_4 = 6 + i2 \qquad a_0 = 1 + i0$$
$$x_5 = 7 + i2 \qquad a_0 = 1 + i0$$

Each of these values will be perforated in the H tape leaving sufficient space between the groups for the automatic perforation of the derived results. The H tape will then be perforated (in time) as follows, the operation numbers now being changed to 1A, 2A etc. to denote automatic operation.

| Operation number | Key depressed | Code perforated | Function |
| --- | --- | --- | --- |
| 1A | + | + | Operations 1A to 5A inclusive represent to recording of the factor X, while it is being transmitted to the calculator. |
| 2A | 3 | 3 | |
| 3A | $+i$ | $+i$ | |
| 4A | 2 | 2 | |
| 5A | CXU | CXU | |
| 6A | SP | SP | Operations 6A to and including operation 30A constitute the recording of the first derived result, the factor $\Phi_1$. |
| 7A | + | + | |
| 8A | 0 | 0 | |
| 9A | . | . | |
| 10A | 0 | 0 | |
| 11A | 4 | 4 | |
| 12A | 3 | 3 | |
| 13A | 1 | 1 | |
| 14A | 7 | 7 | |
| 15A | 6 | 6 | |
| 16A | 4 | 4 | |
| 17A | 7 | 7 | |
| 18A | SP | SP | |
| 19A | $+i$ | $+i$ | |
| 20A | 0 | 0 | |
| 21A | . | . | |
| 22A | 0 | 0 | |
| 23A | 4 | 4 | |
| 24A | 1 | 1 | |
| 25A | 2 | 2 | |
| 26A | 9 | 9 | |
| 27A | 4 | 4 | |
| 28A | 1 | 1 | |
| 29A | 2 | 2 | |
| 30A | CR | CXU | The carriage return signal sent by the calculator is the same code as CXU and results in the operation of relay CXU thereby releasing relays CX1, CX2, XH2 and allowing relay XT2 to reoperate. While the calculator also sends out the code for LF this is not recorded in the H tape since the relay CX2 releases before it can be transmitted over the X trunk. |

It should be noted that the signal for line feed (LF) is also sent out by the printer control circuit, but this is not perforated in the tape as the relay CXU has caused the release of relay CX2.

Operations 1A to 30A inclusive are given by way of example. Other like operations will take place so that the H tape, during the progress of the automatic calculation, will have perforated therein all the derived results with the exception of the last (the fourth, eighth, twelfth, sixteenth and twentieth as shown in Fig. 14) since that result is not used in any further calculation.

*Detailed description*

In the following description the system of designating individual elements of the circuit is based primarily on the engineering specifications for the device. In this specification the various relays are designated by both letters and numerals which have come to have certain significance to the engineers. Thus the two main elements in the present arrangement are the trunks, the K trunk consisting of five code conductors leading from the keys of Figs. 16 and 17 and extending in Fig. 18 through the armatures of relays KP2, KI2 and KH2 to other points in the circuit and in Fig. 19 through the armatures of relay KT2 to the translator relays of Figs. 20 and 21. This set of five conductors is designated the K trunk since it extends from the key-set. Likewise a similar set of five code conductors extends from the two tape transmitters shown in the lower part of Fig. 22 which are known as the X trunk, generally understood as the designation for automatic. Thus the automatic trunk extends into Fig. 24 where through the contacts of relay CX2 it may be connected to the printing transmitter-distributor relays and in Fig. 19 through the contacts of relay XT2 to the translator relays. In a similar manner relay KT2 indicates a means for connecting the K trunk to the translator and the relay XT2 indicates a means for connecting the X trunk to the translator relays. In order to render the specification easier to read by the engineers these designations are used. Where conductors are designated by numerals the number used will be a four-digit number the first two digits of which will be the number of the figure in which the tracing of the conductor was started. For instance, conductor 1700 is a conductor which is grounded at the operator's station in order to place the device as a whole in service. This conductor may be traced through Figs. 18, 23, 24, 25, 26 and 27 to the power relay PWR. The connection of this relay will be described hereinafter.

The apparatus shown in Figs. 16, 17 and 22 represents that part of the device which is located at the operator's station. The remainder of the apparatus and the circuits may be located at any convenient place. This operator's station apparatus consists of a key-set shown in great detail in Figs. 16 and 17, a printer of conventional design indicated by the broken line rectangle 1701, a master switch 1702, a pair of stepping keys 1703 and 1704, a pair of signal lamps 1705 and 1706, two tape perforators of conventional design indicated schematically in Fig. 22 and two tape transmitters also of conventional design and also indicated schematically in Fig. 22.

The keys of the key-set are of a variety which will become locked in operated position under control of a key release magnet which will be energized to restore the operated key to normal position. In the operation of the device the operator in depressing the key will be practically unaware of this locking feature since the action is so swift that the key release magnet will generally be operated before the pressure applied to the key is relieved so that the impression gathered by the operator will be that the key is of the non-locking variety.

The master switch 1702 is employed for placing the device as a whole in operation and is of conventional design. The signal lamp 1705 is in the nature of a pilot lamp and will indicate by its glowing that the device is in operative condition. This signal lamp 1706 is a special apparatus signal to indicate that a certain cycle of operations has been completed. This will be described more in detail hereinafter. The two keys 1703 and 1704 are non-locking keys of the button variety used for stepping the perforators along and causing them to perforate in the tape only the line of sprocket holes.

In general the perforator consists of a punch plate 2200 arranged to cooperate with five punches such as the punch 2201. Each of these punches is controlled by a magnet such as 2202 which interposes on its energization an element 2203 generally spoken of as an interponent in the path of an element 2204 which will cause the punch 2201 to perforate the tape 2205. The perforator is controlled by a relay 2206 which upon energization will cause the element 2204 to move periodically toward the punches. Further details of the perforator will not be given here since these devices and their mode of operation are well known. It will only be indicated that the perforator here is controlled by five selector magnets, such as 2202, and one master magnet, such as 2206, and that the action of these magnets is sequential, the selector magnets operating first and the master or trip magnet operating subsequently.

The tape transmitters are also of conventional design. These consist of a set of five sensing fingers such as the finger 2207 which, when it extends through a perforation in the tape 2205, will close a contact, such as 2208 to ground one of the conductors of the X trunk. When the transmitter is to become active its magnet 2209 is released at which time the sensing fingers will operate to ground the conductors of the X trunk. When the function provided by this operation has been completed the magnet 2209 will be operated whereupon the sensing fingers will be withdrawn from the tape, all of the contacts controlled thereby opened and the tape advanced to its next code position.

The tape perforator controlled by the magnet 2206 and the tape transmitter controlled by the magnet 2209 are here known as the I tape perforator and I tape transmitter. A switch 2210 is known as a taut tape switch and is arranged to close its contact and thereby ground the winding of magnet 2206 when the slack in the tape between the perforator and the transmitter has been taken up. Thus if the transmitter is in operation and it begins to exhaust the slack in the tape between itself and its associated perforator the switch 2210 will be closed and by grounding magnet 2206 the tape in the perforator will be issued with only the sprocket holes perforated therein.

A similar arrangement of perforator and transmitter is shown in the right-hand portion of Fig. 22. This perforator and transmitter is associated with the H or auxiliary tape.

In Figs. 18, 19, 23, 24 and 25 there are shown a number of switching relays. These are generally in pairs such as the relays KP1 and KP2. In other instances where interlocking means are provided and timing functions are to be performed such as those hereinbefore described in connection with the schematics a larger number of relays is employed. Thus the relay XI2 which is employed to connect the X trunk to the I tape perforator has associated with it the relays XI1, XIW and XIP. Relay XIP is a preparation relay. Relay XIW is a waiting relay and the relay XI1 is that which controls the circuit of relay XI2. The general manner of operation of these relays has been described hereinbefore.

The translator shown in Figs. 20 and 21 consists generally of five relays responsive to the five conductors of either the K trunk or the X trunk. Thus relay TR1 will respond to a ground on the first place code conductor and in like manner relay TR5 will respond to a ground on the fifth place code conductor. By means of this translator a coded signal from either the keys or the tape transmitters will be translated into a ground on a single conductor for the purpose of simulating the operation of the complex computer used herein as a calculator. As fully disclosed in my previously filed application the entry of instructional or numerical matter into the calculator is done by means of a key-set each key of which has a particular conductor to cause a particular action in the calculator. Thus in general there are ten conductors entering the calculator for the registration therein of the digits 0 to 9 inclusive. In the present application the numerical keys will operate the translator relays and as a result will ground some one of the ten conductors grouped at the extreme right portion of Fig. 21 and entering the calculator through the group conductor 2100. Other functional leads are grounded in a similar manner.

Fig. 26 shows certain relays which would also be classed as part of the translator since they respond to paths set up by the translator and eventually ground certain functional leads extending into the calculator itself.

The device is placed in operation through the movement of the power switch 1702 to its closed position. This power switch will close a circuit including a source of local power 1707 to the motor within the printer 1701. The power switch will also ground conductor 1700 which, as previously mentioned, extends to the power relay PWR in Fig. 27. It will be understood that throughout the drawings the battery connections to the various relays and banks is supplied actually over lead 2700 from the source shown in broken line rectangle 2701. Thus through the operation of the power switch 1702 the device as a whole is enabled. A branch of conductor 2700 extends to the signal lamp 1705 and causes this lamp to glow continuously as an indication that the power is properly connected to the apparatus.

Operation of non-coded key

Let it be assumed that the device will be operated in the manner hereinbefore outlined. The first act of the operator after placing the device in operation is to depress the key KI (Fig. 16). This will close the circuit from ground, back contact and armature 6 of relay XT1 (Fig. 19), conductor 1900, contact of key KI conductor 1600, armature 4 and back contact of relay XI1 to the normal contacts of armature 4 of relay KI1 and thence through the winding of relay KI1 to battery. This will cause the operation of relay KI1 which will immediately lock through its front contact and armature 4 to conductor 2300 which may be traced to ground at the back contact and armature 2 of the master ground relay KU (Fig. 19). The ground from the back contact of armature 4 of relay XI1 supplied through the key KI is now extended through the front contact and armature 5 of relay KI1 to a branch of the K7 conductor and which may be traced through Fig. 18 through armature 5 and back contact of relay KP1 to the back contact and armature 1 of relay KM2, thence through the normal contacts of armature 1 of relay KM1, the winding of relay KM1 to battery. Relay KM1 now locks through its front contact and armature 1 to conductor K6A which is common to all the thirty keys of the key-set and which at this time is grounded through the operation of the key KI. With relay KM1 operated a circuit is established from ground, front contact and armature 2 of relay KM1, winding of relay KM2 to battery. Another circuit is established from ground, front contact and armature 3 of relay KM1, armature 4 and front contact of relay KM2, conductor 1901 which may be traced through Figs. 18, 17 and 16 to the windings of the three key release magnets KM3. This will release the key KI to normal thereby removing the ground from conductor K6A and releasing relays KM1 and KM2 and thereby in turn the release magnet KM3 and removing the ground from conductor 1600 used for the original energization of relay KI1. Thus the depression of the non-coded key KI results in the operation and locking of relay KI1 and this in turn places relay KI2 in condition to respond momentarily each time a coded key is operated to transfer the code set up by such key to the selector magnets, such as 2202, of the perforator.

Operation of coded keys

It will be remembered in the example given as an illustration that the first coded key to be operated was the key A. The operation of this key will ground the conductor K6A and also the K1, K3 and K5 coded conductors leading to the front contacts and armatures 1, 3 and 5 of relay KI2. The operation now to be described may also be followed through the time sequence chart, Fig. 38. In this the top line represents the depression of key A and it will be noted that this is for a comparatively long period of time representing the actual depression by the operator which generally extends beyond the point in time where the key release magnet KM3 is operated.

As a result of the grounding of conductor K6A a circuit is traced over armature 2 and back contact of relay KM2, conductor K6A to the winding of relay K6. Relay K6 operates as represented on the time sequence chart slightly after the application of ground to conductor K6A, this small delay representing the time which elapses between the application of current to the winding of the relay and the response of its armature. As the result of the operation of relay K6 the winding of the normally operated relay K6' is opened but due to the characteristics of this relay its armatures do not apply ground to conductors K8 and 1902 for a short period. Upon the application of ground to conductor 1902 a circuit is established over armature 8 and front contact of relay KI1, the normal contacts of armature 1 of relay IR1, the front contact and armature 2 of relay KI1, winding of relay KI2 to battery. Thus relay KI2 is shown as operating slightly after the armatures of relay K6' have become released. Upon the operation of relay KI2 the code set up by the key A is transferred to the selector magnets of the perforator through the armatures 1, 3 and 5 of relay KI2. At this time relay KI2 also establishes a circuit from ground, its front contact and armature 6, armature 1 and front contact of relay KI1, the winding of relay IR1 to battery and ground. Relay IR1 operates and locks over its front contact and armature 1 to the ground on the conductor 1902 supplied by armature 2 and back contact of relay K6'. Through the action of this relay also the circuit for relay KI2 is opened so that this relay now becomes deenergized. When its armatures are restored to their normal position a circuit is therefore established from the ground which is being supplied from conductor 1902 to hold relay IR1 operated over the front contact and armature 1 of relay KI1, armature 6 and back contact of relay KI2, normal contacts of armature 3 of relay IR3 to conductor 2302 leading in parallel through the winding of relay IR2 and the winding of trip magnet 2206 of the perforator. The trip magnet of the perforator will cause the code just previously signaled to this perforator to be punched in the I tape in the conventional manner. The operation of relay IR2 in parallel with the trip magnet 2206 will cause the operation of relay IR3 and IR3 will open the circuit for the operation of relay IR2 and magnet 2206, relay IR3 locking to the ground heretofore supplied for the purpose. Relay IR2 therefore becomes deenergized shortly after the operation of relay IR3. Upon the release of relay IR2 a circuit will be established from ground, armature 2 and front contact of relay IR1, front contact and armature 6 of relay KI1, back contact and armature 4 of relay IR2, front contact and armature 4 of relay IR3, conductor K7, back contact and armature 1 of relay KM2, normal contacts of the armature 1 of relay KM1, winding of relay KM1 to battery. Relay KM1 operates and locks over its armature 1 and front contact to the ground on conductor K6A. Upon the operation of relay KM1, relay KM2 will operate and lock to the ground supplied by the armature 2 and front contact of relay IR1. With relays KM1 and KM2 operated a circuit will be established from ground, front contact and armature 3 of relay KM1, armature 4 and front contact of relay KM2, conductor 1991 to the key release magnets KM3 to battery so that these magnets now operate to release the key and the release of the key were it not still under pressure by the operator would open the holding circuit of relay KM1. It is assumed, however, that the key is held manually depressed by the operator beyond this time so that although the IR relays may now restore, the KM relays will be held operated under control of the K6A lead.

From the chart of Fig. 38 it will be noted that shortly after the operation of relay KM2 relay K6 will be released due to the fact that its circuit will be opened at the armature 2 of relay KM2. Therefore shortly after the release of relay K6 relay K6' will again become operated and its armatures being fast to operate will very shortly remove ground from conductors K6 and 1902. Upon the removal of ground from conductor 1902 relay IR1 will release and by so doing will remove the ground from the front contact of armature 3 of relay IR3 and this relay also will release. The release of relay IR1 will remove the ground from conductors K7 which caused the original operation of relay KM1 but this relay is still held operated under control of the depressed key so that KM1 will not release until the key is released. KM2 releases upon the release of relay KM1 and the key release magnets KM3 are also released at this time thus restoring the circuit to normal shortly after the relief of the pressure on this key by the operator. In the chart of Fig. 38 it will therefore appear that the actual sequence of operations is completed at the time indicated for the release of relays IR1 and IR3 and that at any time thereafter when the operated coded key is released the circuit will restore to normal.

On the other hand, if it were possible for an operator to operate one of these coded keys and get her finger off prior to the release of IR1 then the release of the KM relays would follow immediately after the release of relays IR1 and IR3.

It should be noted that this time sequence chart will hold good for any operation by any one of the coded keys hereafter during the preparation of the I tape as well as during the later preparation of the H tape. In this manner the tape may be perforated as outlined hereinbefore through the various operations to and including operation No. 133. At the end of this series of operations which constitute the preparation of the I or master tape the key KU is operated. This will result in the operation of relay KU and hence the release of ground from conductor 2300 whereby the relay KI1 is released and returned to normal.

Upon the operation of relay KU a connection is established from ground, armature 2 and front contact of relay KU, back contact and armature 5 of relay XT1, back contact and armature 7 of relay KT1, conductor 1903, back contact and armature 3 of relay KH1, back contact and armature 3 of relay KI1, conductor 2303, armature 3 and back contact of relay KP1 to conductor K7 whence it causes the operation of relay KM1 to start the chain of events hereinbefore described to release the operated key KU and return the circuit entirely to normal.

In the same manner the key KH may now be operated to cause the operation of relay KH1 so that relay KH2 will thereafter respond momentarily to the depression of each one of the coded keys to transfer the code established thereby to the magnets of the right-hand or H tape perforator. At the end of this operation the key KU is depressed as before and this results in the release of relay KH1.

Automatic operation

Assuming that the master tape and the auxiliary tape have now been properly prepared and that it is desired to place the device in automatic operation, the ends of the I tape may be joined to form an endless loop operating now merely through the I tape transmitter. When the master tape has been prepared and adjusted so that the sensing fingers are associated with blank codes before the first perforated code, the device is started by the operation of the key XT.

Figure 18:
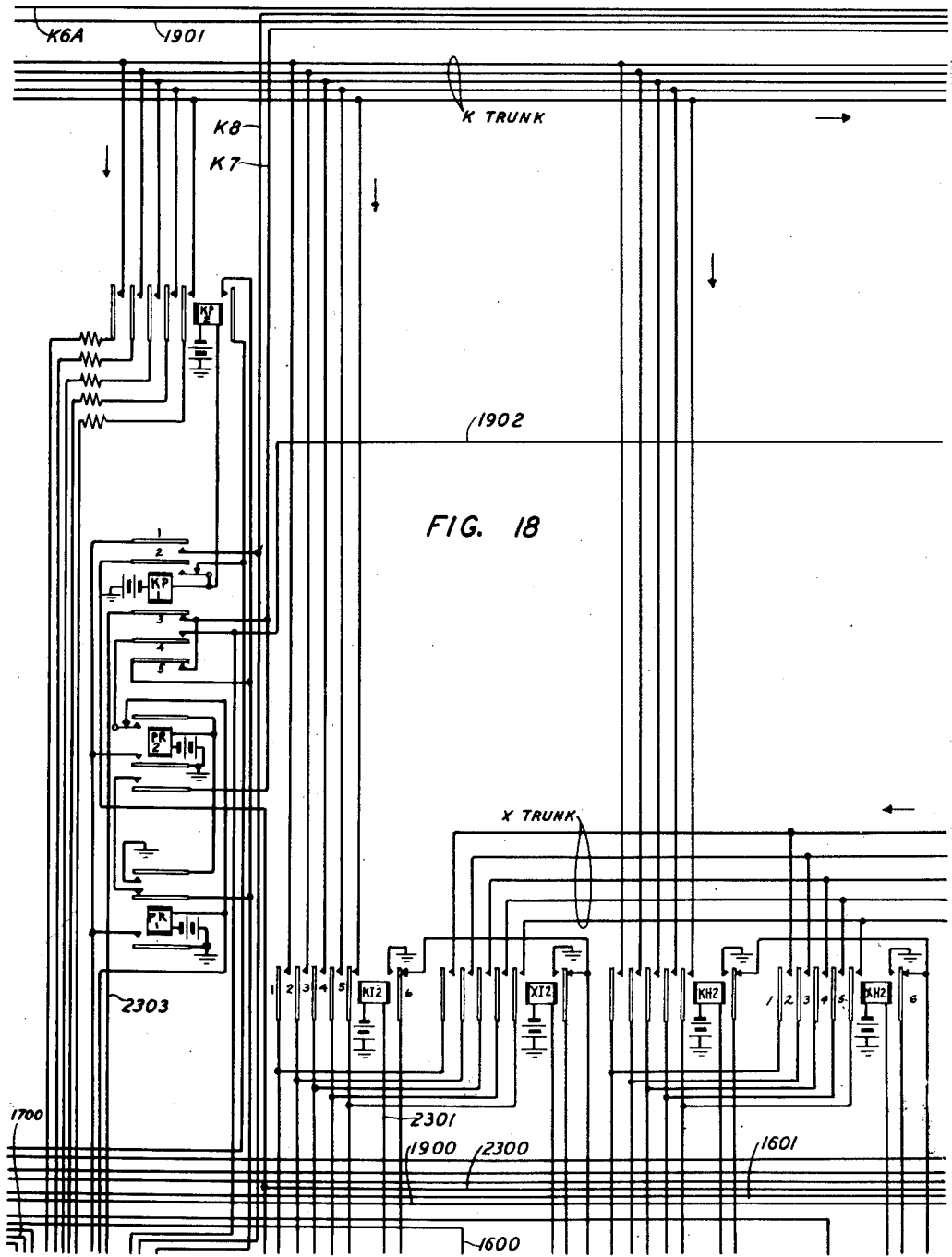
Figure 19:
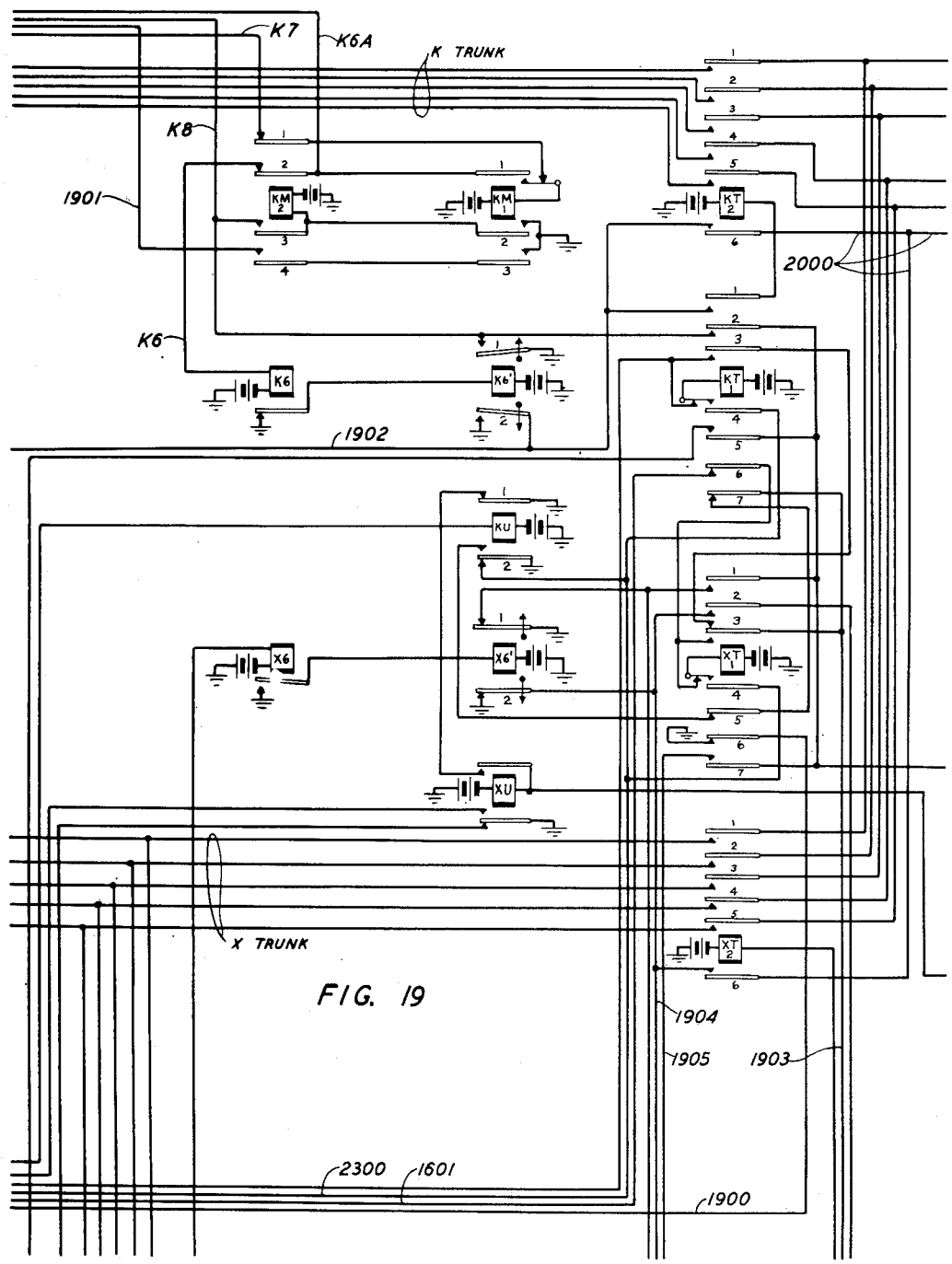

Key XT places a ground on conductor 1601 which may be traced through Figs. 17, 18 and 19, the back contact and armature 6 of relay KT1, the normal contacts of the armature 4 of relay XT1 through the winding of relay XT1 to battery and ground. Relay XT1 operates and through its front contact and armature 3, places a ground on conductor 1903 which may be traced through Figs. 24 and 25 to the back contact and armature 3 of relay KH1, the back contact and armature 3 of relay KI1, conductor 2303, armature 3 and back contact of relay KP1, conductor K7, the back contact and armature 1 of relay KM2, the normal contacts of armature 1 of relay KM1 through the winding of relay KM1 to battery thereby starting the chain of events heretofore described which will result in the release of the key XT to normal.

The operation of relay XT1 is now followed by the operation of relay XT2 assuming relay CX2 to be released. If relay IX3 is normal, then ground from its armature and back contact will maintain the operation of relay X6 and therefore the release of relay X6' whereby ground is held on conductor 1904 and extended therefrom over the front contact and armature 2 of relay XT1, the back contact and armature 10 of relay CX2, the winding of relay XT2 to battery. Therefore, relay XT2 will become operated and remain in this condition as long as relay XT1 is operated and ground is not removed from conductor 1904 by relay X6'. Relay XT2 connects the X trunk to the translator and since the transmitter magnet 2209 is released at this time the sensing fingers will be in contact with the tape. However, it has been pointed out that the I tape is placed in the transmitter so that the first few codes will be blanks and hence no one of the conductors going through the first five armatures of the relay XT2 will ground any one of the five conductors going into the translator. Therefore at that time ground will be extended from conductor 1904 through the front contact and armature 6 of relay XT2 to the signal transmitting lead 2000.

It is arranged that with all five of the translator relays in their normal positions the spacing relay SP in Fig. 26 will be operated. The circuit for this relay may be traced from battery, the winding of relay SP, the back contact and armature 1 of relay Z, conductor 2600, back contact and armature 5 of relay TR2, back contact and armature 8 of relay TR4, back contact and armature 7 of relay TR3, back contact and armature 3 of relay TR1, back contact and armature 1 of relay TR2, conductor 2000 and thence through armature 6 and front contact of relay XT2 to the ground supplied by armature 2 and back contact of relay X6'. Relay SP operates and through its armature 3 places a ground on the KM lead which may now be traced through Figs. 26, 21, 20 and 19 to armature 7 and front contact of relay XT1, conductor 1905, armature 3 and back contact of relay XH1, armature 3 and back contact of relay X11, conductor 2304, back contact and armature 1 of relay HX1, back contact and armature 1 of relay CX1, conductor 2509, normal contacts of armature 3 of relay CXUW, winding of relay IX2 to battery.

Relay IX2 operates and places ground on conductor 2400 which besides operating relay IX3 also extends to the winding of the transmitter magnet 2209 thus operating this magnet and lifting the sensing fingers off the tape and at the same time advancing the tape to the next position. The operation of relay IX3 releases relay X6 so that this relay in turn causes the operation of relay X6' and relay X6' removes ground from conductor 1904 thereby releasing the spacing relay SP. Relay SP restores its armatures and removes the ground from the KM conductor and this in turn releases relay IX2 and opens the circuit for the transmitter magnet 2209. In this manner the tape in the transmitter will be automatically stepped along until the sensing fingers encounter a perforated code.

The first actual code transmitted from the I tape transmitter will be that for A. This as heretofore pointed out will ground the Nos. 1, 3 and 5 conductors of the X trunk and therefore will cause the operation in the translator of relays TR1, TR3 and TR5. After the magnet 2209 is released as above described the sensing fingers of the transmitter will therefore cause the closing of contacts to ground in these conductors 1, 3 and 5 with the result that through the operation of relay XT2 the translator relays just mentioned will be operated. Thereupon a circuit will be established upon the deenergization of relay X6' from ground, back contact and armature 2 of relay X6', front contact and armature 6 of relay XT2, conductor 2000, armature 1 and front contact of relay TR5, front contact and armature 1 of relay TR1, armature 2 and front contact of relay TR3, armature 3 and back contact of relay TR4, armature 2 and back contact of relay TR2, conductor 2101, winding of relay A to battery and ground. Relay A will ground conductors 2601 and 2602 and will establish a connection between conductors 2603 and 2604. Conductor 2602 may be traced into the circuit of the F factor entry register in Fig. 28 where it will be extended through armature 10 and back contact of the multicontact relay FM2 and thence through the winding of relay FM1 to battery. Relay FM1 becomes operated in this circuit and therefore establishes a circuit from the master ground of conductor 2702 through the armature 4 and front contact of relay FM1, armature 3 and back contact of relay F1, conductor 2604 through the front contact and armature 1 of relay A to conductor 2603.

Upon the energization of relay FM1 this relay in accordance with the fully detailed circuits shown in my copending application referred to will become locked at this time. The effort herein is to show a general outline of the operation of the computer without confusion through the inclusion of all the details of the calculator. Therefore, it is sufficient to show the manner in which the relay FM1 is operated. Hence upon the operation of relay FM1 the ground found on the master ground lead 2702 is extended through the armature 2 and front contact of relay FM1 to the winding of the multicontact relay FM2. Thereupon a circuit is established from the ground on conductor 2702 through the armature 4 and front contact of relay FM1, armature 3 and back contact of relay F1, conductor 2604, front contact and armature 1 of relay A, conductor 2603 to the No. 1 numerical conductor forming a part of the group 2100 and leading in orderly manner through the No. 1 armature of relay FM2 to the No. 1 select magnet of the factor F register cross bar switch. Therefore, this No. 1 select magnet will operate and will close a contact similar to those controlled by the select magnets 0 and 9 shown which may be traced from the ground on conductor 2602 through the armature 11 and front contact of relay FM2, back contact and armature 4 of relay F1, front contact and armature 5 of relay FM1, conductor 2600, the contact controlled by the No. 1 select magnet, conductor 2801, the winding of relay FT to battery and ground. Relay FT becomes operated in this circuit and by closing its lower contact extends a circuit from ground on conductor 2702 through armature 2 and front contact of relay FT, armature 2 and back contact of relay F1, the hold magnet 2802 to battery. Relay F1 is one of the relays in the progress circuit and hold magnet 2802 will now extend a circuit from ground on conductor 2702 through its front contact and armature, the back contact and armature 1 of relay F1, the front contact and armature 3 of relay FM1 to the KM conductor. Through the operation of the select magnet 1 and the hold magnet 2802 a particular set of contacts in the F register cross bar switch will be operated to register therein the information that the problem now to be undertaken by the calculator is one in addition (indicated by the letter A for add).

Conductor 2601 also grounded by the relay A may be traced through Figs. 32, 33, 34 and 37 to the winding of relay CO and thence to battery. Relay CO, as fully explained in my copending application, operates and locks to a control ground to condition the calculator circuits for performing a problem in addition.

The ground placed on conductor KM may be traced through Figs. 28, 32, 35, 27 and 26 to the back contact and armature 3 of the spacing relay SP and thence through Figs. 26, 21, 20 and 19 to armature 7 and front contact of relay XT1, thence over conductor 1905 through armature 3 and back contact of relay XH1, armature 3 and back contact of relay X11, conductor 2304, back contact and armature 1 of relay HX1, back contact and armature 1 of relay CX1, conductor 2509, normal contacts of armature 3 of relay CXU, the winding of relay IX2 to battery. Relay IX2, as heretofore described, causes the operation of relay IX3 and this relay in turn releases relay X6. Relay X6 upon release closes the circuit for relay X6' which now removes the ground from conductor 2000 and thus releases relay A. Relay IX2 in addition to operating relay IX3 also grounds conductor 2400 extending to the winding of the transmitter magnet 2209 and thus moves the sensing fingers of contact with the tape to release the translator relays TR1, TR3 and TR5.

Through the release of relay A the ground is removed from conductor 2603 thus releasing the No. 1 select magnet and allowing relay FT to release. Relay FT upon release removes the ground from the progress circuit whereupon the relay F1 will become operated in series with the holding magnet 2002 in accordance with the full description in my prior application and in accordance with the description of the schematic Fig. 7 herein. Through the operation of relay F1 the ground is removed from the conductor KM to allow the release of the transmitter magnet 2209.

Thus through the sending of the code for A the calculator is conditioned to perform a problem in addition.

The next code which will be encountered by the I tape transmitter will be that for the numerical sign +. . This will cause the grounding of code conductors 2, 3 and 4 whereupon the translator relays TR2, TR4 and TR5 will be operated. It will be noted at this time that in the absence of the operation of relay SW that two other relays are operated in parallel with relay TR2, viz., TR2' and TR2''. Therefore upon the release of relay X6' a circuit will be established from ground, back contact and armature 2 of relay X6', front contact and armature 6 of relay XT2, conductor 2000, armature 6 and front contact of relay TR2, armature 2 and back contact of relay TR1, armature 1 and front contact of relay TR4, armature 1 and front contact of relay TR3, armature 2 and back contact of relay TR5, conductor 2001, armature 10 and front contact of relay TR2'', upper winding of the + relay (Fig. 26) to battery. The + relay will now ground conductor 2605 and will connect conductor 2606 to conductors 2607 and 2608. A circuit may now be traced from ground on conductor 2702, through armature 4 and front contact of relay FM1, armature 3 and front contact of relay F1, armature 3 and back contact of relay F2, conductor 2606 thence back over conductor 2607, back contact and armature 4 of relay F2, front contact and armature 4 of relay F1, front contact and armature 5 of relay FM1 to conductor 2800. This ground will also extend over conductor 2608 which, it will be seen from Fig. 21, connects with the No. 3 numerical conductor included in the group 2100 and this ground will therefore be extended over the No. 3 armature of relay FM2 to the No. 3 select magnet of the F factor register cross bar switch. This select magnet now operating closes a contact to extend conductor 2800 through to conductor 2801 and thus operate relay FT. In this manner the sign of the first factor may be registered in the manner hereinbefore described and particularly in the manner fully described in my copending application. In like manner, the hold magnet associated with the relay F2 will become operated and through its contact will ground the KM lead with the same effect as heretofore, that is, the operation of the transmitter magnet 2209, the operation of the relay X6 and the release of relay X6' whereby the translator relays are returned to normal and the ground is removed from the control conductor 2000.

Upon the release of the transmitter magnet 2209 the sensing fingers will now encounter a perforation for the code for the numeral 1 which, according to Table 1, will ground only the fifth code conductor K5. In the manner hereinbefore described the translator relay TR5 only will be operated whereby a connection may be traced from ground on the common conductor 2702 within the computer, through armature 4 and front contact of relay FM1, armature 3 and front contact of relay F1, armature 3 and front contact of relay F2, conductor 2803, front contact and armature 10 of relay TR2', armature 2 and back contact of relay TR1, armature 1 and back contact of relay TR4, armature 7 and front contact of relay TR5, normal contacts of armature 8 of relay TR3, armature 1 of relay TR2' to the No. 1 numerical conductor of the group represented by the number 2100 going through the armatures of the multicontact relay FM2 and thence to the No. 1 select magnet of the factor F register cross bar switch. At the same time this ground coming in over conductor 2803 may be traced through the back contact and armature 11 of relay TR2', back contact and armature 2 of relay SW, armature 4 and back contact of relay TR1, armature 6 and front contact of relay TR5, conductor 2002 which may be traced through Figs. 21 and 22 to the front contact and armature 4 of relay F2, the front contact and armature 4 of relay F1, the front contact and armature 5 of relay FM1 to conductor 2800 whereby it is connected by the now operated No. 1 select magnet to conductor 2801 and thence through the winding of relay FT to battery. Thus the code for the numeral 1 will cause the registration of the numeral 1 on the third vertical of the F factor cross bar switch. This will be followed in the usual manner by the grounding of the KM lead when the hold magnet for this third vertical operates whereby the chain of events hereinbefore described will take place culminating in the operation of the transmitter magnet 2209 and the operation in their cycle of the relays IX2, IX3, X6 and X6'. In this example, however, there is a slight difference. Heretofore the removal of ground from the signal translating lead 2000 was the means by which the ground was taken from the progress circuit leading through armature 2 and front contact of relay F2 and the corresponding armature and back contact of relay F3 whereby the circuit is caused to progress. In this instance this function is performed by the lifting of the sensing fingers from the top in the tape transmitter so that now the ground is broken from the progress circuit through the release of TR5 whereby the ground coming in on the conductor 2803 and again going out on the No. 1 conductor is interrupted at armature 7 of TR5 when this armature leaves its front contact. In the same manner the ground coming in on conductor 2803 is interrupted through the movement of armature 6 of relay TR5 as well as at an armature of relay F3.

Figure 28:
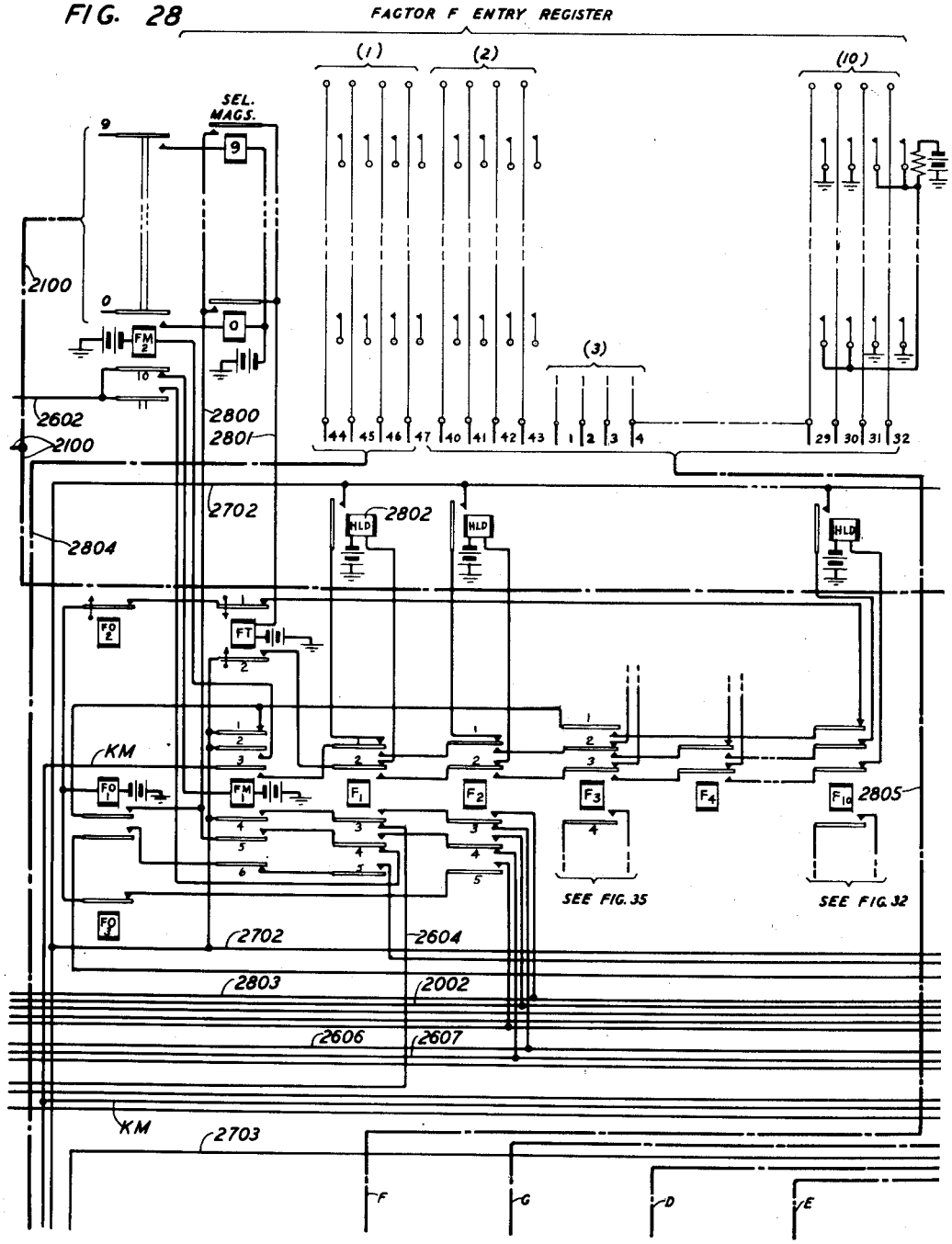
Figure 29:
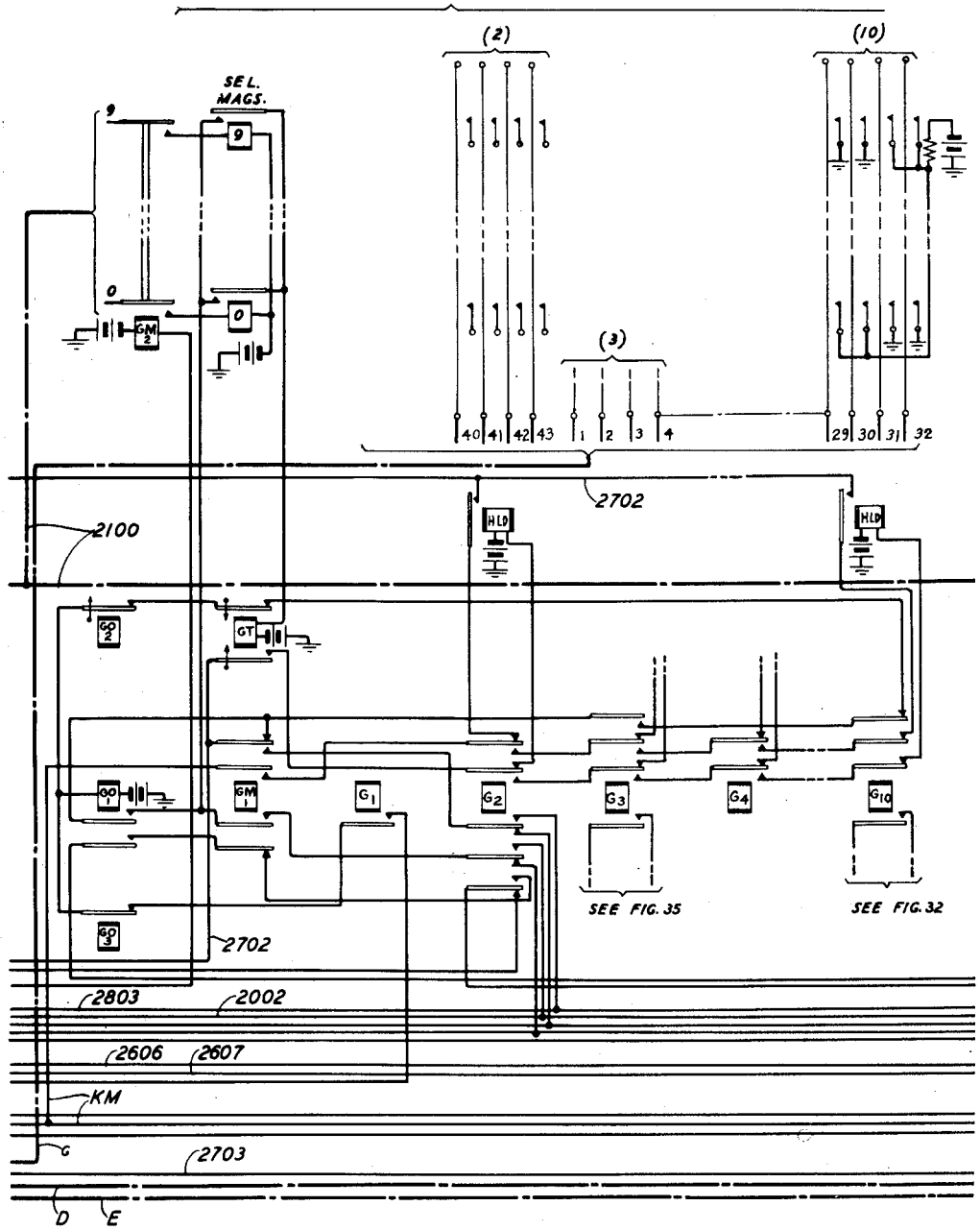
Figure 30:
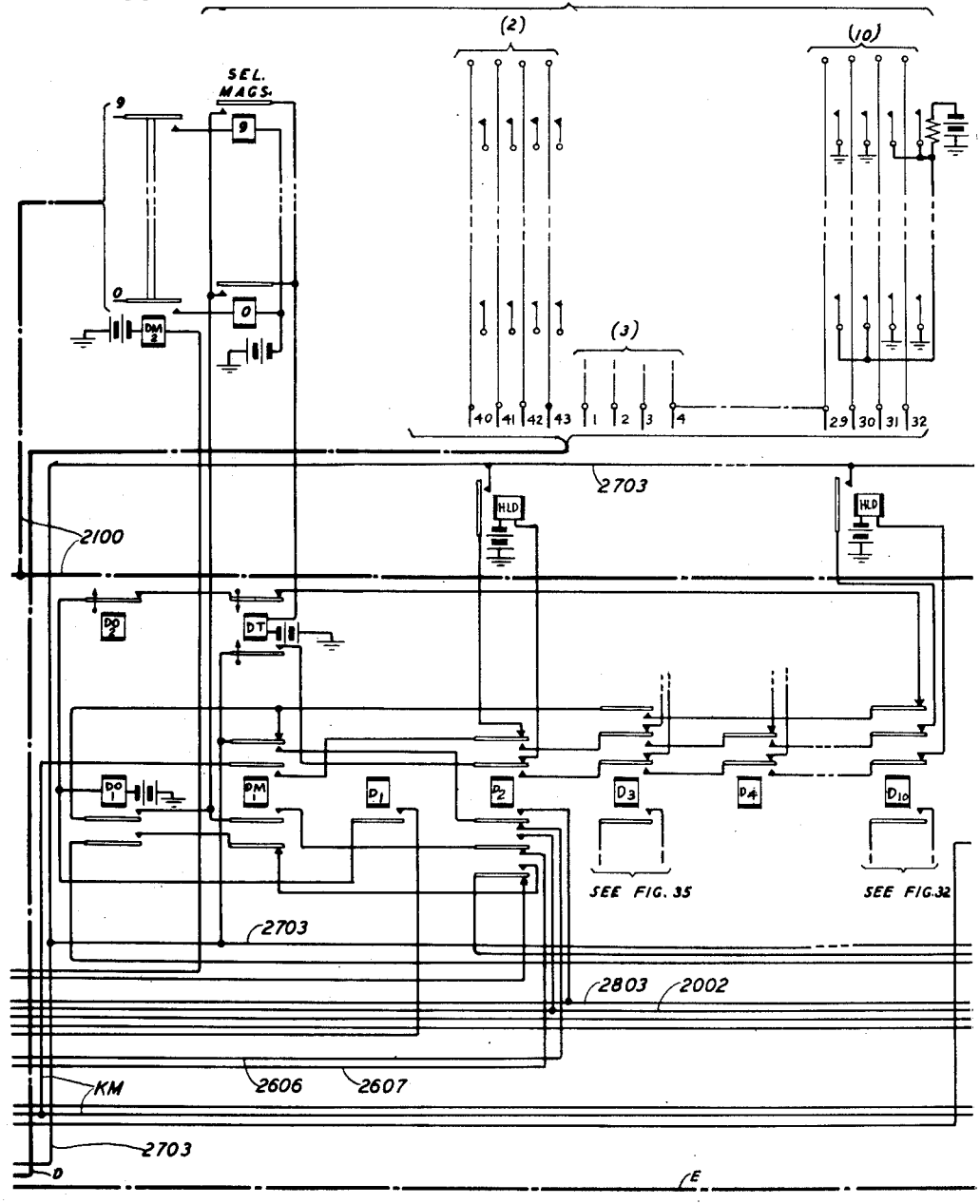
Figure 31:
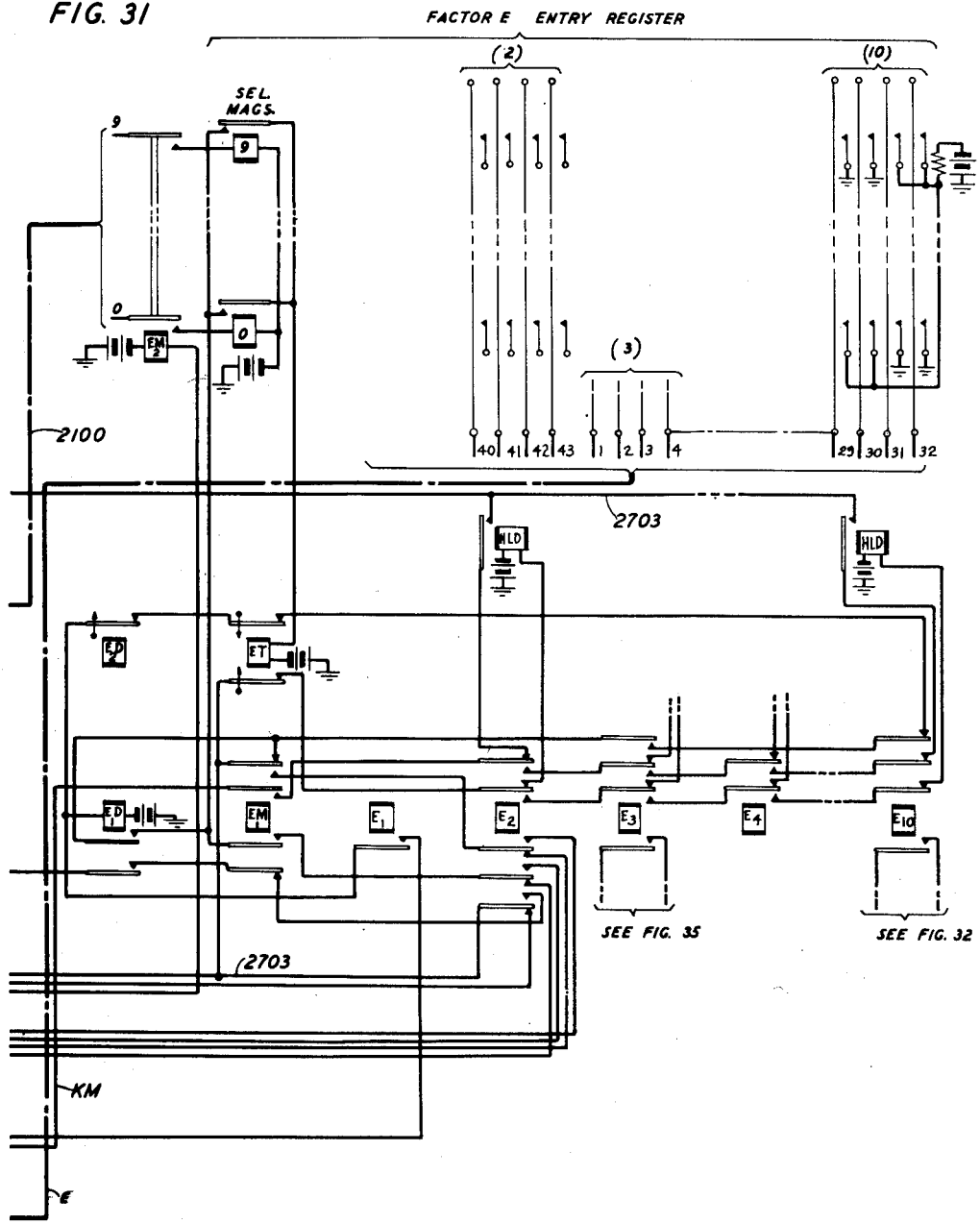

In a similar manner the two factors of the coefficient which are now in process of being registered are entered in the F and G registers of the calculator shown in Figs. 28 and 29. In accordance with the full and complete disclosure in my previously filed application and through the operation of the CO relay in Fig. 27 hereof, the calculator action will now take place to register the value of these factors set forth in detail as operations 3 to 19, inclusive, in the augend relays.

*Short description of calculator*

The calculator chosen as one which is suitable to use in the present system is shown in Figs. 27 to 37 inclusive. Figs. 28 to 31, inclusive, show the four factor registers and their progress circuit. Each register consists of a conventional cross bar switch having one hundred sets of contacts coordinately arranged in ten vertical rows and ten horizontal rows. In the F factor register shown in Fig. 28 all ten verticals are used. Vertical No. 1 is used to register therein the fact that the problem will be one in addition, multiplication or division. The vertical No. 2 is used to register the sign of the F factor and verticals 3 to 10, inclusive, are used to register eight numerical values of the factor. The three other registers shown in Figs. 29, 30 and 31 use only verticals 2 to 10, inclusive. In each case No. 2 vertical is used to register the sign of the factor and verticals 3 to 10, inclusive, are used to register the eight numerical values of the factor.

Each register is equipped with a multicontact relay such as FM2, GM2, etc. which becomes operated during the registration of the values therein to extend the ten numerical conductors to the ten select magnets of the switch. Each factor is also provided with the progress circuit consisting essentially of the relays such as F1 to F10 in the F factor register and relays G1 to G10 in the G factor register. Upon the completion and the registration of the value in each vertical the corresponding F relay becomes operated and extends the progress circuit to the next relay.

Each set of contacts comprises four contacts which will electrically characterize four corresponding conductors to transmit the value registered therein in code to other parts of the calculator. In the F factor register by way of example the group conductor 2804 will transmit the information regarding the type of problem registered therein to the printing cross bar switch shown in Fig. 35 so that when the problem registered is printed the proper numerical operation sign X or \ will be printed at the appropriate place. This may be seen in Fig. 14 where the X sign appears in each case between the second and third factors in the second line of each calculation. In like manner the particular sign of the factor and the numerical values thereof are transmitted over the group of conductors 2805 to the multiplier digit switch shown as the first vertical of the cross bar switch in Fig. 32, to the factor shift switching device consisting of relays M and D1 shown in Fig. 34 and to the printing switch shown in Fig. 35. Through the factor register shifting means consisting of the relays M and D1 in Fig. 34 the factors are extended to the column shift switches in Figs. 33 and 34. The column shift switch of Fig. 33 is for the real component and the column shift switch of Fig. 34 is for the imaginary component of the values entering into the calculation. In accordance with the description of the invention up to this point the relay CO in Fig. 37 has been operated and locked to indicate that the problem now to be calculated is one in addition. In accordance with this established condition the factor F will be placed on the real column shift switch of Fig. 33 and the factor G will be placed on the imaginary column shift switch in Fig. 34.

Beneath the vertical of each column shift switch there is shown in broken line rectangles a schematic representation of the summing relays. The values are now transmitted from the column shift switch verticals to the addend relays of the summing relays and at the same time the set of contacts in the multiplier digit switch of Fig. 32 controlled by the select magnet No. 1 and the hold magnet of No. 2 vertical is operated. The operation of this particular set of contacts now transmits the code for 1 to the counting relays herein represented by the relays BSa, BSb, BSc and BSd. These counting relays will cause the summing cycle control to operate once whereby the values in the addend relays are added to the value 0 represented by the augend relays to operate the summing relays and through the summing cycle control to reoperate the augend relays in accordance with this sum so that the factors entered in the registers of Figs. 28 and 29 are now multiplied by 1 and registered on the augend relays. Thereupon these values will be transferred over the group conductors 3300 and 3400 to the printing switch shown in Fig. 36.

In accordance with the full description of this calculator printing of the problem will commence as soon as the first digit of the first numerical factor has been properly registered. This is indicated by the conductors leading from the armature 4 and contact of relay F3 shown in Fig. 28 and indicated therein as extending to Fig. 35. This contact made at this time is indicated in Fig. 35 as an armature in broken lines marked F3 between the winding of relay FP1 and a back contact of relay FP2 and this indicates that as soon as the first digit of the factor F has been properly registered the circuit of FP1 is completed so that the progress circuit of the printing switch is enabled. In accordance with the full description of this calculator the conductor 3600 will now be grounded through the action of a hold magnet 3500 which controls the first vertical of the printing switch (not shown) and one of whose sets of contacts is operated for each printing operation. The ground of conductor 3600 will extend through the contacts of certain relays in Fig. 27 and be extended to the conductor 2704 which leads into the relay circuits in Fig. 24 and returns over conductor 2401 to operate the PT7 relay. The PT7 relay operates and extends a ground from the armature 2 and back contact of relay PT6 to the clutch magnet CL. This allows the distributor arm of the transmitter to make one complete revolution during which the code taken from the first operated set of contacts in vertical 2 of the printing cross bar switch is transmitted to the printer. In like manner and as each digit of the factor becomes registered it will be transferred to the printing switch and thereafter forwarded by the distributor transmitter of Fig. 27 to the printer. In this manner a record such as that contained in the first line of figures in Fig. 14 will be printed, the first two columns being the factors as registered and the factors of the third and fourth columns being the result attained. Of course in this case since these factors have been multiplied by 1 the result will be identical with the factors as registered. This means that the coefficient $a_1$ has been properly placed in the accumulator of the calculator. It may be noted at this point that since the relay $\Sigma$ (Fig. 28) has been left deenergized during the registration of these factors, the calculator will have been cleared of any previous accumulation so that only the factor now registered will be held in the accumulator.

We will return to the calculator hereinafter to make certain explanations with regard to a problem in multiplication and at this point we will turn to the operation of the tape transmitter.

Further operation of the automatic control circuit

During the registration of the factor $a_1$ in the calculator comprising operations 1 to 20, inclusive, the printer will record the problem with the exception of the numerical sign = which is not printed in a problem of addition. It should be noted that as the transmitter transmits the code for = the result of this in the calculator will be to operate a relay such as $G0_1$. This relay is the final relay in the progress circuit of the factor G register to be operated and in case less than eight digits have been registered will function to fill in the missing places with ciphers. In case eight digits have been registered then the registration of the = sign is without any effect. It must be pointed out here, however, that following the registration of the eight digits and therefore the starting of the calculating operation within the calculator, the registration of the code for = will only tend to operate an already operated relay and will therefore not interfere with the operation of the calculator. The transmission of the code for equals (=) after the last digit of the factor $a_1$ recorded in the I tape will stop the operation of the I tape transmitter since there is no way at the present time to ground the KM lead for the purpose of operating the magnet 2209 of the tape transmitter. Therefore, further operation of the transmitter will be held up until the calculator has caused the complete printing of the problem and the RR relay, Fig. 27, has become operated. At this time the RR relay in operating will close a circuit from ground, its armature 4 and front contact to the KM lead so that now in accordance with the descriptions previously given the ground on the KM lead will be extended over armature 7 and front contact of relay XT1, conductor 1905, armature 3 and back contact of relay XH1, armature 3 and back contact of relay XI1, conductor 2304, back contact and armature 1 of relay HX1, back contact and armature 1 of relay CCX1, conductor 2500, the normal contact of armature 3 of conductor CXUW, winding of relay IX2 to battery. Relay IX2 starts the train of operations resulting in the operation of the I tape transmitter magnet 2209 whereby the sensing fingers are lifted from the tape and the tape advanced to the next code.

In accordance with the example hereinbefore given, the next code will be that of Σ. This will operate the Σ relay in Fig. 26 through the sending of the proper code by the operation of translator relays TR2 and TR5. In this case the circuit may be traced from the winding of the Σ relay through the normal contacts of armature 2 thereof, conductor 2609, front contact and armature 6 of relay TR2'' (now operated in parallel with relay TR2), normal contacts of armature 8 and relay TR3, front contact and armature 7 of relay TR5, back contact and armature 1 of relay TR4, back contact and armature 2 of relay TR1, front contact and armature 6 of relay TR2 to the signal transmitting lead 2000 which is grounded at this time through armature 6 and front contact of relay XT2 and the armature 2 and back contact of relay X6'. Upon the operation of the Σ relay this relay will lock through its armature 2 to the ground supplied over the armature of the ΣU relay. At the same time the ground extended through the translator relays to conductor 2699 will be further extended through armature 3 and front contact of the Σ relay to the KM conductor whereby the chain of events heretofore described will be repeated. This will result in the operation of relay IX2, the consequent operation of the transmitter magnet 2209, the release of relay X6 and the operation of relay X6' whereby the ground on the signal transmitting lead 2000 is removed to terminate this operation. The Σ relay by its armature 4 now changes the condition in the calculator by switching conductor 2610 from its normal connection to conductor 2611 to an alternate connection to conductor 2612. With conductor 2610 now connected to conductor 2612 the calculator will be in a condition to retain the value now registered in the augend relays (accumulator) and to add thereto the solution to the next problem entered therein.

Now the codes perforated in the I tape through operations 23 to 27, inclusive, will be transmitted so as to operate relays M, SW, XH1, HX1 and then the relay SWU. The operation of this relay will follow the general pattern heretofore set out. The operation of relays XH and HX will be in accordance with the description hereinbefore given in connection with the schematic Fig. 12. In accordance with Table 1 the code for SW will result in the operation of the translator relays TR1, TR2, TR4 and TR5. A circuit may therefore be traced from ground, back contact and armature 2 of relay X6', front contact and armature 6 of relay XT2, signal transmitting lead 2000, armature 1 and front contact of relay TR5, front contact and armature 1 of relay TR1, armature 2 and back contact of relay TR3, armature 2 and front contact of relay TR4, armature 1 and front contact of relay TR2, the normal contacts of armature 4 of relay SW and thence through the winding of relay SW to battery. Relay SW responds and prepares the translator for operating the XH and HX relays by codes which would otherwise cause the registration of the digits 5 and 2 (see Table 1). Armature 4 of relay SW controls continuity contacts and therefore during its movement there is no break in the circuit for the winding of relay SW which involves the transfer from the original operating ground to a holding ground supplied over the armature and back contact of relay SWU.

The original operating ground for relay SW is now extended to the front contact and armature 3 of relay SW and thence to the KM conductor where it causes the I tape transmitter to step forward and cause the transmission of the code for XH. This in accordance with Table 1 will cause the operation of translator relay TR1 only. Therefore a circuit may be traced from ground on the signal transmitting lead 2000 through the front contact and armature 2 of relay SW, armature 2 and front contact of relay TR1, armature 4 and back contact of relay TR5, armature 3 and back contact of relay TR3, armature 4 and back contact of relay TR4, the front contact and armature 5 of relay SW, from whence it will be extended to the winding of relay XHP as will be described hereinafter.

In like manner the code for HX in accordance with Table 1 will result in the operation of relays TR4 and TR5. Therefore a circuit may be traced from ground on the signal transmitting lead 2000, through the front contact and armature 2 of relay SW, armature 2 and back contact of relay TR1, armature 1 and front contact of relay TR4, armature 1 and back contact of relay TR3, front contact and armature 3 of relay TR5, the front contact and armature 8 of relay SW from whence it will be extended to the winding of relay HXP as will be described hereinafter.

Further, the code for SWU in accordance with Table 1 will result in the operation of all five translator relays, so that a circuit may be traced from the signal transmitting lead 2000, through armature 1 and front contact of relay TR5, front contact and armature 1 of relay TR1, armature 2 and front contact of relay TR3, armature 3 and front contact of relay TR4, armature 3 and front contact of relay TR2 to the winding of relay SWU.

Returning now to the transmission of the code for XH, a circuit may be traced from armature 5 of relay SW to the normal contacts of armature 3 of relay XHP and thence to the winding of this relay. Relay XHP operates and locks to the ground, supplied over armature 4 and back contact of relay CXU. Following this, relay HXP is operated in a similar manner upon the transmission of the code HX and this relay likewise locks to the ground supplied over armature 3 and back contact of relay CXU. Now when relay SWU is operated from the code SWU the relay SW is unlocked and the ground for the operation of SWU is extended over the back contact and armature 1 of relay SW, armature 1 and front contact of relay XHP, normal contacts of armature 3 of relay XHW and the winding of relay XHW to battery. This ground also extends through the back contact and armature 5 of relay XH1 to the battery side of the winding of relay XH1 so that this relay is effectively short-circuited until this ground is removed. Relay XHW operates and locks over the ground from the back contact and armature 4 of relay CXU and this ground is extended to the winding of relay XH1, where however it is ineffective at present.

Upon the operation of relay XHW, the ground extended from armature 1 of relay SW to armature 1 of relay XHP may be traced through front contact and armature 1 of relay XHW, normal contacts of armature 5 of relay XI1, armature 1 and front contact of relay HXP, normal contacts of armature 1 of relay HXW the winding of relay HXW to battery. In a similar manner this ground is also extended to armature 3 and back contact of relay HX1 to the battery side of the winding of relay HX1 so that this relay like relay XH1 will not operate until the ground on its back contact is removed. Relays XHP, HXP, XHW, and HXW are now operated and are all locked to the grounds supplied by relay CXU.

Now upon the operation of relay HXW the ground for its operation is extended over the front contact and armature 2 of relay HXW, armature 1 and back contact of relay CXP to the KM conductor and since the KM conductor is at this time extended to relay IX2 the magnet 2209 will cause the I tape to advance and to thus release the SWU relay.

When relay SWU releases the ground extended over the back contact and armature 5 of relay HX1 and over the back contact and armature 3 of relay XH1 is removed and therefore these two relays operate at once. Upon the operation of relay SWU the I tape transmitter will be disabled and the H tape transmitter will be enabled. Upon the operation of relay HX1 the conductor 2304, heretofore extended over the back contact and armature 1 of relay HX1, the back contact and armature 1 of relay CX1, conductor 2500, normal contacts of armature 3 of relay CXUW to the winding of relay IX2 is transferred over armature 4 and front contact of relay HX1 to the winding of relay HX2. Thus relay HX2 is freed to control the H tape transmitter and relay IX2 is firmly locked at the front contact and armature 1 of relay HX1 to prevent the operation of the I tape transmitter. The circuits will now be arranged so that the value of the unknown X placed on the H tape in accordance with operations 138 through 142 will be simultaneously transmitted to the calculator and reperforated in the H tape through the operation of the H tape perforator.

A certain interlocking arrangement must now be noted. The operation of relay XH2 to connect the five conductors of the X trunk through its contacts to the H tape perforator select magnets will be similar to the operation of the relay K12 heretofore described. Relay XH2 is now operated over a circuit from ground back contact and armature of relay X6', conductor 1994, armature 8 and front contact of relay XH1, armature 4 and front contact of relay XHW, normal contacts of armature 1 of relay HR1, front contact and armature 2 of relay XH1, winding of relay XH2 to battery. Relay XH2 operates and connects the H tape perforator magnets to the five conductors of the X trunk and sets this perforator to the same code as that sensed by the fingers of the H tape transmitter. Upon the operation of relay XH2 a circuit is established from ground front contact and armature 6 of relay XH2, armature 1 and front contact of relay XH1, winding of relay HR1 to battery and ground. Relay HR1 operates and locks through its armature and front contact, the front contact and armature 4 of relay XHW, the front contact and armature 8 of relay XH1 to conductor 1994 which is grounded at the armature of relay X6'. Now when relay XH2 releases because its circuit has been opened by the operation of relay HR1 it will establish a circuit from ground, just traced for holding HR1, the front contact and armature of relay HR1, the front contact and armature 1 of relay XH1, armature 6 and back contact of relay XH2, the normal contacts of armature 3 of relay HR3 and thence in parallel to the winding of relay HR2 and the perforator magnet 2212. The perforator magnet will cause the H tape to be perforated with the same code now being transmitted therefrom by the H tape transmitter. Relay HR2 will operate and cause the operation of relay HR3 which will lock to the ground just used to cause the operation of HR2 and the perforator magnet 2212. Relay HR2 opens this latter circuit and relay HR2 and magnet 2212 release. Upon the release of relay HR2 a circuit is established from the KM conductor through armature 7 and front contact of relay XT1, conductor 1495, front contact and armature 1 of relay HR3, back contact and armature 2 of relay HR2, armature 3 and back contact of relay XI1, conductor 2394, armature 4 and front contact of relay HX1 to the winding of relay HX2, so that when the code now being transmitted over the X trunk is properly registered in the calculator and the KM signal is returned the relay HX2 will be operated. This results in the operation of the transmitter magnet 2211 whereupon the tape is advanced.

Upon the operation of relay HX2 relay HX3 will operate and this will remove ground from the winding of relay X6 allowing this relay to release momentarily. Relay X6' is therefore operated momentarily to remove ground from conductor 1994, thus releasing relay HR1 and in turn relay HR3 so that the circuit is now restored and ready for another cycle during which the next code to which the H tape transmitter has moved will be perforated in the H tape. The KM signal coming from the calculator which indicates that the sign or digital value has been properly registered therein will follow the path heretofore described including conductor 1905 but this path through the armature 3 and back contact of relay XH1 will be opened so that the KM signal cannot be forwarded except through some alternate route. This alternate route is provided by the relays HR3 and HR2 so that when these relays of the group HR1 to HR3 have operated in the same manner as the group IR1 to IR3 heretofore described then the ground on conductor 1905 will be extended through the front contact and armature 1 of relay HR3, the back contact and armature 2 of relay HR2 to armature 3 of relay XI1 where it will be extended over the back contact thereof, conductor 2304, now through armature 4 and front contact of relay HX1 to relay HX2 so that in this case it will be the relays HX2 and HX3 which operate instead of the relays IX2 and IX3 as heretofore. The operation of relays HX2 at this time grounds the lead 2501 which may be traced to magnet 2211 of the H tape transmitter thereby momentarily operating this transmitter to lift the sensing fingers from the H tape and to advance the tape to its next transmitting position. The trip magnet 2212 controlling the H tape perforator will have been operated during the cycle of operation of the relays HR1, HR2 and HR3 in the usual manner so that it is upon the return of the KM signal from the calculator that the transmitter is caused to step forward but this cannot happen until after the perforator has previously made its forward step.

At the end of the registration in the calculator of the numerical value of the factor X the H tape will transmit the code CXU (operation No. 142). The code for CXU will result in the operation of only the translator code relay TR4. Therefore a ground may be traced from the signal transmitting lead 2006 through armature 1 and back contact of relay TR5, back contact and armature 3 of relay TR1, armature 7 and back contact of relay TR3, armature 8 and front contact of relay TR4, armature 4 and back contact of relay TR2, conductor 2102, the normal contacts of armature 1 of relay CXUW and the winding of this relay to battery. Relay CXUW will operate in this circuit and lock to a ground supplied to conductor 2502 by the armature 5 and front contact of relay HX1. A ground on conductor 2502 will be extended to the winding of relay CXU but since the ground on conductor 2102 also is connected to the other side of the winding of relay CXU this relay will not immediately operate. However, relay CXUW in operating will cause the operation of relay IX2 and this relay in turn will, by causing the operation of relay IX3, open the circuit for relay X6 whereby this relay releases and causes the operation of relay X6' to take the ground off the signal transmitting lead 2000. Therefore relay CXU now becomes operated to release the HX and XH relays. It may be noted that the HX relays are controlled by armature 3 of relay CXU and the XH relays are likewise controlled by armature 4 of this relay. With the HX and XH relays released the H tape transmitter and the H tape perforator will be disengaged from the X trunk and the I tape perforator will again come into operation. Therefore upon the operation of relay IX2 just described the I tape transmitter magnet 2209 will be operated to step the tape off the code SWU (operation No. 27) and to step it forward to the next code. This in accordance with operation 28 is the code for SW and this will be followed by the code for HX and then SWU again so that now the H tape transmitter will again be enabled to transmit over the X trunk but the H tape perforator will not now be rendered operative.

It should be noted that upon the energization of relay HX1 upon the transmission of the code SWU of the I tape transmitter, the relay IX2 is energized and held in this condition throughout the ensuing operation of the H tape transmitter. The circuit for this operation may be traced from ground, the front contact and armature 1 of relay HX1, the back contact and armature 1 of relay CX1, conductor 2500, the normal contacts of armature 3 of relay CXUW to the winding of relay IX2. Relay IX2 in operating causes the operation of the magnet 2209 and this is held operated thereafter. It should also be noted in this connection that means are provided whenever the device as a whole is energized through the operation of the master switch 1702 to hold either magnet 2209 or magnet 2211 energized. Magnet 2211 for the H tape transmitter, as well as its controlling relay HX2, the circuit for which may be traced to the normal contacts of armature 4 of relay HX1, is shown as normally energized. Thus, as the H tape transmitter is enabled, the I tape transmitter magnet is energized and lifts its sensing fingers off the tape ready upon its de-energization to transmit the next code perforated therein.

Therefore, the factor $a_0$ will be transmitted to the calculator in accordance with operations 143 to 147, inclusive. The energization of relay HX1 transfers the connection of relay HX2 from ground to conductor 2304 so that now the relay HX2 is placed under control of the KM conductor. The last code perforated in the H tape after the numerical values of the factor $a_0$ is the code for CXU which will have the same effect as that heretofore described, that is, it will terminate the operation of the H tape transmitter and transfer the control back to the I tape transmitter.

The I tape will now transmit the codes SW, CX, XH, = and SWU. This will result in the operation of relay CXP followed by relay CXW and later by relay CX1. The operation of relay CX1 will connect conductor 2705 coming from the printer relays PT1 to PT5, inclusive, through the front contact and armature 2 of relay CX1, to the winding of relay CX2W, resulting in the operation of relay CX2W, so that relay CX2 is put in condition to respond at the proper time and connect the X trunk to the H tape perforator. Relay CX2 is likewise made ready to operate and connect the output of the printer to the X trunk so that the printer control circuit may cause the H tape to be perforated with the result of the problem now entered into the calculator. Upon the operation of relay CX1, the relay IX2 is operated so that now both the tape transmitter magnets 2209 and 2211 are held operated, thus freeing the X trunk from any code connections through the tapes. At this time, the I tape will be ready upon resuming operations to send the code for ΣU operation No. 36, and the H tape transmitter will be on a blank code one or more steps before the first code for the unknown X. The H tape perforator will be ready to perforate the value $\varphi_1$ now being calculated by the calculator.

In this last series of codes transmitted by the I tape there was one for the = sign. If the last set of numerical values for the coefficient $a_0$ had had eight digits transmitted into the entry register, then the calculator would have been operating during the sending of the codes SW, CX, XH, = and SWU by the I tape transmitter but could not have completed the calculation before the I tape transmitter could have sent these codes. If, on the other hand, the last factor entry into the calculator had had less than eight digits, its operation would have been held up until the = sign was entered therein. Therefore, the entry of the = sign at this time will operate to cause the calculator to automatically insert a sufficient number of ciphers to make up the eight places of the last factor. When these eight places are filled then the KM signal will be sent back to advance the I tape transmitter so that it will then go on to transmit the code SWU. As this code is then transmitted the relay action just described will take place and the device will be ready for the perforation of the H tape with the result of the calculation representing the factor $\varphi_1$.

The problem as entered into the calculator will be printed by the printer but it is not until the code for the = sign is transmitted from the printing cross bar switch of Figs. 35 and 36 that any action in the automatic control relay circuit will take place. Now upon the sending of the code for = it will be noted that relays PT1, PT2, PT3 and PT5 will be operated (in accordance with the code for = shown in Table 1) so that a circuit is established from the ground which will at this time appear on conductor 2704 through the armatures 3 and front contacts of each of the printing relays PT1 to PT5, conductor 2705, front contact and armature 2 of relay CX1, normal contacts of armature 2 of relay CX2W, winding of relay CX2W to battery. Relay CX2W will now operate and lock through its armature 2 and front contact to the ground provided at armature 5 and back contact of relay CXU. The ground for the energization of relay CX2W will also be extended to the winding of relay CX2, but since this ground for the original energization of relay CX2W is now also extended to armature 6 and back contact of relay CX2, then relay CX2 will not become energized until the ground from conductor 2704 is eliminated. Thus, after the transmitter distributor arm of Fig. 27 has made its revolution and come back to its stop contact, so that the code for the = sign has been properly transmitted to the printer, the printing relays PT1 to PT5 will become deenergized awaiting their connection to another printing switch contact set. At this time, relay CX2 becomes energized. Relay XT2 is now deenergized since its circuit passes through armature 10 and back contact of relay CX2. This is an interlocking measure to insure that the codes for the factor $\varphi_1$ now about to be transmitted from the calculator to the H tape perforator, will not be transmitted through the translator and sent back to the calculator.

We may now return for a short time to the operation of the calculator.

*Operation of calculator for problem in multiplication*

It may be noted that by operation No. 23 the code for M was sent by the I tape transmitter just prior to the entry into the calculator of the factors F and G representing the unknown X and D and E representing the first coefficient $a_0$. These four factors now being completely entered into the four entry registers of the calculator and the relay MR having been operated through the code M, the calculator will operate in accordance with the full and complete description given in my previously filed application. With the Σ relay now operated so that conductor 2610 is now connected to conductor 2612, the value accumulated in the augend relays will be left undisturbed so that the value now being calculated will be added thereto.

The mode of operation of the calculator will now be to transmit the factor F through the contacts of the relays M and DI, Fig. 34, to the real column shift switch of Fig. 33, and the factor G through the contacts of relays M and DI, Fig. 34, into the imaginary column shift switch of Fig. 34, and to multiply these factors by the factor D. The progress circuit of the multiplier digit switch will under control of relay MR be entered so as to operate the hold magnet of the third vertical thus using the factor D as a multiplier. Therefore, the complete set of summing relays will be operated a number of times corresponding to the various digits of the factor D under control of the counting relays BS$a$ to BS$d$, inclusive. Thus, the values held by the augend relays will be subject to a gradual accumulation of further values until the operation of multiplying factors F and G by the factor D is completed. At this time, the progress circuit of the multiplier digit switch will be advanced and the relay M in the factor shifting means of Fig. 34 will be operated so that now the factor F will be transferred to the imaginary column shift switch and the factor G will be transferred to the real column shift switch. Through certain sign control, not shown, circuit changes will be made whereby the values now accumulated and added to the accumulation on the augend relays will be —EG in the real part of the accumulator and +EF in the imaginary operation thus conforming to the algebraic operation in multiplying together two complex numbers. When the fourth vertical of the multiplier digit switch of Fig. 32 has been completely used, thus indicating the completion of the multiplication of the factors in the real and imaginary column shift switches by the factor E, the calculation will be complete and the values now held by the augend relays will be transmitted to the printing cross bar switch of Fig. 36. Upon this transfer of values the progress circuit of the printing cross bar switch will be advanced and the printing of the result will now begin.

It may be noted by an inspection of Fig. 14 that whereas a number is entered in the calculator, for instance as +.131, etc., it will be transmitted from the calculator as +0.1317, etc. (note first line). Thus, there are two forms of the sign +, one with a decimal point and one without a decimal point, and in the case where the one without a decimal point is transmitted from the calculator, it will be followed by a whole number. Since invariably in the type of problem which it is now proposed to solve by the automatic action of the present device this whole number will be 0, it must be eliminated so that when the factor is transmitted to the calculator, this 0 will not displace the factor entered toward the right. The means for doing this will be explained shortly hereinafter. At the present time, it is to be noted that the = sign having been transmitted by the calculator the relay actions described as taking place in the H tape perforator are ready to perforate the codes now transmitted by the calculator. These codes, by way of example, will be for the factors +0.1617470, +i0.23294117. While not shown in this example, several other codes will also be perforated in the tape. For instance, a space code consisting of one mark signal in the third place will be perforated before the code for + and again before the code for +i. After the last digit of the second component of this complex number is perforated in the tape, there will be perforated therein also the code for carriage return which, it will be seen from the Table 1, is the same as the code for CXU. This code will immediately release the CX and XH relays so as to return the X trunk to connection with the I tape transmitter, since the operation of relay CXU removes the holding grounds for the various relays heretofore operated such as XHP, XHW, XHI, HXP, HXW, HXI and so forth. Previously, the operation of relays CXU was controlled over the conductor 2102 coming from the translator, but now it will be found that a branch of this conductor 2102 extends into the printing control circuit and is controlled over the No. 4 armatures of the printing relays PT1 to PT7 so that in accordance with this code a mark signal in the fourth place is set up. One circuit for the operation of relay CXU may be traced from ground on the signal transmitting lead 2600, through armature 1 and back contact of relay TR5, back contact and armature 3 of relay TR1, armature 7 and back contact of relay TR3, armature 8 and front contact of relay TR4, armature 4 and back contact of relay TR2, conductor 2102, normal contacts of armature 1 of relay CXUW and thence through the winding of relay CXUW to battery. This results in the operation of relay CXUW which then locks in to a ground on conductor 2502 which may be derived from any one of several relays, such as CXI, CXW, HXI, HXW, CX2, HXP, XHW or XHI, some one of which will be in operated condition when the H tape transmitter is operating. This ground will be extended to the winding of relay CXU, but since the ground on conductor 2102 now extends through armature 2 and back contact of relay CXU to the other side of this winding, relay CXU is effectively short-circuited and it will not operate. As relay CXUW operates the ground on conductor 2102 is extended through the armature 2 and front contact of relay CXUW, conductor 2402, armature 2 and back contact of relay XIP to the KM conductor, resulting in the stepping of the H tape and consequently the removal of ground from conductor 2102. As ground is thus removed from conductor 2102, the short circuit is removed from about the winding of relay CXU and this relay now operates whereupon the holding grounds supplied over its armatures 3, 4 and 5 are opened with the result that control is shifted back to the I tape. In like manner as set forth above when the calculator has completed a calculation one of the last acts is the automatic transmission to the printer of the code for carriage return and this being the same code as that for CXU a circuit is established from ground armature 1 and front contact of relay PT7, armature 4 and back contact of relay PT5, armature 4 and front contact of relay PT4, armature 4 and back contact of relay PT3, armature 4 and back contact of relay PT2, armature 4 and back contact of relay PT1 to conductor 2102 with the same results as hereinbefore set forth. Then upon the operation of the printing relay PT7, the conductor 2102 will be grounded and relay CXU will be operated as before. The relay CX2 will therefore be released before the code for LF is sent out from the printing control circuit so that this last code transmitted by the calculator will not be perforated in the H tape.

Through the release of the CX and XH relays the I tape transmitter now goes into action again and this time the code for ΣU is transmitted. The code for ΣU causes relay TR2 to operate so that a circuit may be traced from the signal transmitting lead 2600 over armature 1 and back contact of relay TR5, back contact and armature 3 of relay TR1, armature 7 and back contact of relay TR3, armature 8 and back contact of relay TR4, armature 5 and front contact of relay TR2, winding of relay ΣU to battery and ground. This causes the unlocking of the Σ relay and is equivalent to operating the NC key of the complex computer to the position where the entry of a new problem will wipe out any accumulation heretofore made. That is, conductor 2610 will now be disconnected from conductor 2612 and connected instead to conductor 2611 so that upon the entry of the coefficient $a_2$ as shown in the first line of the second group in Fig. 14, this coefficient will be added to 0 rather than to the value $\varphi_1$ just calculated. This forms a complete cycle of operation so that the complete operation of the device may now be followed by repeating these various operations any number of times desired.

*Elimination of the whole number of the calculated result*

For the purpose of eliminating the whole number 0 of the calculated result, it should be noted that conductor 2600 connected to armature 1 of relay Z may be grounded under three different conditions, that is, when the code for "step" consisting of five spacing signals is sent, second, when the code for "period" consisting of mark signals in the second and fourth places is sent, and third, when the code for "space" consisting of a mark signal in the third place is transmitted. Therefore, after the receipt of the signal set up by the = sign, the H tape transmitter will begin to operate. The first signal which it sends out is the code for space and this will momentarily ground conductor 2600 with the result that the spacing relay SP is operated and through its armature 3 places a ground on the KM lead to cause the H tape transmitter to advance.

Thereupon, the H tape transmitter will transmit the code for +, the first numerical sign in the calculated factor $\varphi_1$. Each of the four sign relays in the upper part of Fig. 26 is provided with two windings, the top winding being marked with the sign followed by the decimal point and the bottom winding being marked with the sign without the decimal point. In the example hereinbefore given, the + relay was energized over its top winding and therefore one particular type of circuit change was produced. It will be noted that the code sent from the keys and the code sent from the I tape transmitter which has been perforated by the keys will be one to operate the sign relay through its top winding. However, the sign being perforated in the H tape through the action of the calculator will be the sign without the decimal point and therefore of a different code. This different code will operate the lower winding of the relay. For instance, when the code for + has been perforated in the H tape and then transmitted therefrom to the translator, it will, in accordance with Table 1, consist of mark signals in the first, second, and fourth places and space signals in the third and fifth places. Therefore the translator relays 1, 2 and 4 will be operated and hence upon the release of relay X6' a circuit may be traced from the lower winding of the + relay through the front contact and armature 4 of relay TR2'', front contact and armature 4 of relay TR4, back contact and armature 3 of relay TR3, back contact and armature 4 of relay TR5, front contact and armature 2 of relay TR1, front contact and armature 6 of relay TR2 to the signal transmitting lead 2000, then through the armature 6 and front contact of relay XT2, to armature 2 and back contact of relay X6'. Thus the + relay will operate to enter the + sign in the calculator in the same manner as before. However, the ground for operating the lower winding of the + relay will also be extended over the front contact and armature 4 of the + relay through the normal contacts of armature 2 of relay Z to battery, whereby relay Z becomes operated and locked through the armature 1 and back contact of the spacing relay SP. Now, in accordance with the codes perforated in the H tape, the codes for 0 and then the period will next be transmitted. The code for 0 in accordance with previous descriptions will ground the conductor 2103 leading from the front contact and armature 0 of relay TR2' and eventually connect to the 0 conductor within the group 2100. However, since conductor 2103 leads through armature 3 of relay Z, its circuit toward the calculator will now be open. In place of this, however, the ground on this conductor will be extended over armature 3 and front contact of relay Z to the winding of the spacing relay SP. Relay SP will now become operated and by moving its armature 1 will open the holding circuit for relay Z allowing this relay to release. During the short operation of relay SP, the release conductor KM will be grounded to advance the H tape transmitter. This transmitter will now transmit the code for period and since relay Z is now released, this action will result in the operation of relay SP again. No action will take place in the computer but the H tape transmitter will be advanced by this momentary operation of relay SP.

Thereafter the numerical values of the real component of the coefficient $\varphi_1$ will be transmitted from the H tape to the calculator in the regular manner. When the imaginary component is approached, the first code to be sent will be that for space which will result in the operation of the spacing relay SP as before, thus advancing the H tape transmitter. Then the sign of the imaginary component will be transmitted and this being in the form of $+i$ without any decimal point, the lower winding of the $+i$ relay will be operated and the relay Z will respond in the same manner as hereinbefore described. Therefore when the next code for 0 is transmitted, it will not be sent into the calculator since the conductor 2103 is now open at the armature 3 and back contact of relay Z. Instead, the relay SP will be operated to advance the H tape transmitter. This device now sends out the code for period and the spacing relay SP is again operated. The operation of the spacing relay upon the transmission of the code for 0 releases the relay Z and therefore when the codes for the digits following the decimal point are transmitted, they will be properly entered in the calculator.

At the end of the entry of the factor $\varphi_1$ in the calculator, the H tape transmitter will transmit the code CXU, which it will be remembered was perforated in this tape in response to the carriage return signal sent out by the printer control switch. The transmission of this code will cause the translator relay TR4 to operate whereby conductor 2102 is grounded and this, in the manner hereinbefore described, will cause relay CXUW to operate. This relay operating will maintain relay IX2 operated and prepare for the operation of relay CXU. Upon the operation of relay CXUW, the ground on conductor 2102 will now be extended through armature 2 and front contact of relay CXUW, conductor 2402 armature 2 and back contact of relay XIP to the KM lead with the usual result. The H tape transmitter now moves its sensing fingers away from the tape and therefore removes the ground from conductor 2102 whereupon relay CXU becomes operated and therefore releases the CX and HX relays, previously operated through the transmission of the codes SW, CX, XH, = and SWU by the I tape transmitter.

The control is now shifted back to the I tape and the I tape transmitter will thereupon proceed to send out the code for 2U and will thereafter proceed to carry out operations 3$, etc., which are practically a repetition of the operations hereinbefore described. It is believed that further description of these operations is unnecessary, as they all follow the pattern described so far.

Summary

It will thus be seen that through the use of a master tape prepared with a pattern of operations and by the use of an auxiliary tape in which partial calculated results may be perforated during the automatic operation that extensive calculations may be carried on automatically. The calculations shown in Fig. 14 are given as a short example of what may be done, but it will be realized that this pattern is much simpler than one which might actually be used in the employment of this device. While the calculation of a result through the use of only four coefficients is entirely sufficient to render a description of the operation, it will be realized that a larger number of coefficients will be used to produce the highly accurate results which a device of this nature will allow.

What is claimed is:

1. In a calculating device, a calculator, a master index containing operational and numerical factor indicia, an auxiliary index containing numerical factor indicia, said indices being removable and replaceable by other indices containing different indicia representing different patterns of operation and different numerical factors, means under control of said master index for entering numerical factor signals from said master index and from said auxiliary index into said calculator, and a recorder for recording the result calculated by said calculator in said auxiliary index as additional numerical factor indicia.

2. In a calculating device, a calculator, a master index containing operational and numerical factor indicia, an auxiliary index containing sets of numerical factor indicia, said indices being removable and replaceable by other indices containing different indicia representing different patterns of operation and different numerical factors, means under control of said master index for selectively entering numerical factor signals from said master index and from said auxiliary index into said calculator, means for recording the result calculated by said calculator in said auxiliary index as additional numerical factor indicia in a next succeeding set of said factor indicia, means for using said master index to control said calculator repeatedly a number of times corresponding to the number of sets of indicia originally recorded in said auxiliary index.

3. In a calculating device, a calculator, a master index containing operational and numerical factor indicia consisting of a tape having said indicia punched therein in code, an auxiliary index containing numerical factor indicia consisting of a tape having said indicia punched therein in code, said indices being removable and replaceable by other indices containing different indicia representing different patterns of operation and different numerical factors, means responsive to said operational indicia in said master index for entering signals representing numerical factor data in said calculator in response to said numerical factor indicia in both of said index tapes and a punching device responsive to said calculator for recording calculated results in said auxiliary tape as additional indicia.

4. In a calculating device, a calculator, a master index containing operational and numerical factor indicia consisting of a tape perforated in the manner common in the printing telegraph art in permutation codes each code representing an indicium, an auxiliary index consisting of a similarly perforated tape containing numerical factor indicia, said tapes being removable and replaceable by other tapes containing different indicia representing different patterns of operation and different numerical factors, code responsive means responsive to said numerical indicia in said tapes for selectively entering signals representing numerical factor data in said calculator, other code responsive means controlled by said operational indicia for selectively subjecting said first code responsive means to the numerical indicia of said tapes and perforating means under control of said calculator for perforating code representations of calculated results in said auxiliary tape as additional numerical factor indicia.

5. In a calculating device, a calculator, a master index containing operational and numerical factor indicia, an auxiliary index containing numerical factor indicia, means controlled by said operational indicia in said master index for controlling the time and sequence for entering numerical factors into said calculator in response to indicia contained in both of said indices, a first means controlled by said operational indicia for controlling the recording of indicia in said auxiliary index responsive to indicia in said auxiliary index whereby numerical factors may be copied in said index while being transmitted for control of said calculator and a second means controlled by said operational indicia for controlling the recording of indicia in said auxiliary index responsive to said calculator whereby the results of calculations made thereby may be recorded in said auxiliary index.

6. In a calculating device, a calculator, a master index containing operational and numerical factor indicia consisting of a tape perforated in the manner common in the printing telegraph art in permutation codes each code representing an indicium, an auxiliary index consisting of a similarly perforated tape containing numerical factor indicia, said indices being removable and replaceable by other indices containing different indicia representing different patterns of operation and different numerical factors, a tape perforator for perforating indicia in said auxiliary tape, a first transmitter for transmitting code signals from said auxiliary tape, a second transmitter for transmitting code signals from said master tape, a translator for translating coded signals from said transmitters to signals suitable for operating said calculator and for entering numerical factors therein, said calculator being constructed and arranged and having means for translating calculated results into coded signals and means for recording indicia in said auxiliary tape comprising switching means for alternatively and selectively placing said tape perforator under control of said first transmitter and said calculator.

7. In a calculating device, a calculator, a translator for translating coded signals into calculator operating signals and for entering said operating signals representing operating and numerical factor information into said calculator, a coded signal circuit incoming to said translator, a master tape transmitter, an auxiliary tape transmitter, means for alternatively and operatively connecting said master tape transmitter, and said auxiliary tape transmitter to said translator incoming circuit, a master tape perforated in the manner common in the printing telegraph art by permutation codes representing operational and numerical factor indicia, said means for alternatively and operatively connecting being controlled by said master tape, and an auxiliary tape similarly perforated by permutation codes representing numerical factor indicia, whereby said calculator is responsive to signals representing numerical factor information, and partly from said master tape, partly from said auxiliary tape.

8. In a calculating device, a calculator, a translator for translating coded signals into calculator operating signals and for entering operating and numerical factor information into said calculator, a coded signal circuit incoming to said translator, a master tape transmitter, an auxiliary tape transmitter and an output circuit from said calculator, means for alternatively transmitting electrical signals from said master tape transmitter, and said auxiliary tape transmitter to said translator incoming circuit, a master tape perforated in the manner common in the printing telegraph art by permutation codes representing operational and numerical factor indicia, said means for alternatively transmitting being under control of said master type, an auxiliary tape similarly perforated by permutation codes representing numerical factor indicia, means for isolating said coded signal circuit for said translator, said means being also under control of said master tape, and a perforator for perforating additional indicia in said auxiliary tape whereby said coded signal circuit may be isolated from said translator while said perforator is operated over said coded signal circuit from said calculator output circuit.

9. In a calculating device, a calculator, a translator for translating coded signals into calculator operating signals and for entering operating and numerical factor information into said calculator, said translator having an incoming circuit and an outgoing circuit, said outgoing circuit constituting a permanent connection to said calculator, a first and a second coded signal circuit, means for alternatively connecting said circuits to the said translator incoming circuit, a set of keys connected to said first coded signal circuit for transmitting coded signals thereover, a master tape transmitter, an auxiliary tape transmitter and an output circuit for said calculator, means for alternatively connecting said master tape transmitter, said auxiliary tape transmitter and said calculator output circuit to said second coded signal circuit, a master tape perforated by permutation codes representing operational and numerical factor indicia, an auxiliary tape perforated by permutation codes representing numerical factor indicia, a perforator for perforating indicia in said master tape, a perforator for perforating indicia in said auxiliary tape and means for alternatively connecting said perforators to said coded signal circuits.

10. In a calculating device, a calculator having an input circuit and an output circuit, a first and a second input signal circuit, means for alternatively and selectively connecting said signal circuits to said calculator input circuit, a set of keys connected to said first signal circuit for transmitting operational and numerical factor signals thereover, a master tape transmitter, an auxiliary tape transmitter, means for alternatively and selectively operatively connecting said transmitters and said calculator output circuit to said second signal circuit, a master tape having recorded thereon indicia representing operational and numerical factor signals, an auxiliary tape having recorded thereon indicia representing numerical factor signals, an indicia recorder for recording signals in one of said tapes, a second indicia recorder for recording signals in the other of said tapes, and means for alternatively and selectively connecting said recorders to said signal circuits.

11. In a calculating device, a calculator, a master index containing operational and numerical factor indicia consisting of a tape having said indicia punched therein in code, an auxiliary index containing numerical factor indicia consisting of a tape having said indicia punched therein in code, said tapes being removable and replaceable by similar tapes having different operational and numerical factor indicia for performing different patterns of operation with different numerical factors, means for scanning said tapes forwardly step-by-step for transmitting signals to said calculator one code at a time, means responsive to signals corresponding to said operational indicia in said master index for entering numerical factor data in said calculator by signals corresponding to said numerical factor indicia in both of said tapes and a punching device responsive to said calculator for recording calculated results in said auxiliary tape as additional indicia.

12. In a calculating device, a calculator, a master tape perforated in codes for operational and numerical factor signals, a tape transmitter for scanning said master tape one code at a time and for transmitting into said calculator signals corresponding thereto, an auxiliary tape perforated in codes representing numerical factor signals, a tape transmitter for scanning said auxiliary tape one code at a time and for transmitting into said calculator signals corresponding thereto, means responsive to numerical factor signals for entering numerical factors into said calculator, means responsive to operational signals for controlling the operation of said tape transmitters and perforating means under control of said calculator for perforating numerical factor codes in said auxiliary tape at a location thereon before entrance into said auxiliary tape transmitter, whereby calculated results may be reentered into said calculator as additional numerical factors.

13. In a calculating device, a calculator, a master index containing indicia representing the operations of said device for the pattern of one complete cycle of operations, said index consisting of an endless loop of tape having said indicia punched therein in code, an auxiliary index containing sets of indicia representing sets of numerical factors, one set for each complete cycle of operations, and consisting of a tape having said indicia punched therein in code, said indices being removable and replaceable by other indices containing different indicia representing different patterns of operation and different numerical factors, means for scanning said tapes and transmitting signals to said calculator corresponding to said indicia for the control thereof and for the entry therein of numerical factor signals in accordance with the pattern of operations represented by said master index, and a punching device responsive to said calculator for recording calculated results in said auxiliary tape as additional sets of said indicia.

GEORGE R. STIBITZ.

References Cited in the file of this patent

UNITED STATES PATENTS

| Number | Name | Date |
|---|---|---|
| 1,761,662 | Goldberg | June 3, 1930 |
| 1,813,830 | Weiner | July 7, 1931 |
| 1,838,617 | Goldberg | Dec. 29, 1931 |
| 1,876,294 | Hofgaard | Sept. 6, 1932 |
| 1,927,556 | Nelson | Sept. 19, 1933 |
| 2,062,117 | Bryce | Nov. 24, 1936 |
| 2,176,933 | Smith | Oct. 24, 1939 |
| 2,229,905 | Sundstrand | Jan. 28, 1941 |
| 2,332,304 | Davies | Oct. 19, 1943 |
| 2,346,250 | Bryce | Apr. 11, 1944 |
| 2,357,455 | Bryce | Sept. 5, 1944 |
| 2,390,427 | Dickinson | Dec. 4, 1945 |
| 2,616,626 | Lake et al. | Nov. 4, 1952 |